(12) United States Patent
Ellis et al.

(10) Patent No.: US 8,755,666 B2
(45) Date of Patent: Jun. 17, 2014

(54) INTERACTIVE TELEVISION PROGRAM GUIDE WITH REMOTE ACCESS

(71) Applicant: United Video Properties, Inc., Santa Clara, CA (US)

(72) Inventors: Michael D. Ellis, Boulder, CO (US); William L. Thomas, Evergreen, CO (US); Joel G. Hassell, Arvada, CO (US); Thomas R. Lemmons, Sand Springs, OK (US); David M. Berezowski, Tulsa, OK (US); Robert A. Knee, Lansdale, PA (US); Robert H. McCoy, Broken Arrow, OK (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/952,404

(22) Filed: Jul. 26, 2013

(65) Prior Publication Data

US 2013/0308925 A1 Nov. 21, 2013

Related U.S. Application Data

(63) Continuation of application No. 13/275,565, filed on Oct. 18, 2011, which is a continuation of application No. 10/927,814, filed on Aug. 26, 2004, now Pat. No. 8,046,801, which is a continuation of application No. 09/354,344, filed on Jul. 16, 1999, now abandoned.

(60) Provisional application No. 60/097,527, filed on Aug. 21, 1998, provisional application No. 60/093,292, filed on Jul. 17, 1998.

(51) Int. Cl.
*H04N 5/932* (2006.01)

(52) U.S. Cl.
USPC .......................................... 386/219; 386/200

(58) Field of Classification Search
None
See application file for complete search history.

(56) References Cited

U.S. PATENT DOCUMENTS

| 4,024,401 A | 5/1977 | Bernstein et al. |
| 4,081,753 A | 3/1978 | Miller |

(Continued)

FOREIGN PATENT DOCUMENTS

| CA | 2345161 | 6/1994 |
| CA | 2764753 | 6/1998 |

(Continued)

OTHER PUBLICATIONS

U.S. Appl. No. 60/019,351, filed Jun. 6, 1996, Williams.

(Continued)

*Primary Examiner* — William C Vaughn, Jr.
*Assistant Examiner* — Eileen Adams
(74) *Attorney, Agent, or Firm* — Ropes & Gray LLP

(57) ABSTRACT

An interactive television program guide with remote access is provided. The interactive television program guide is implemented on interactive television program guide equipment. A remote program guide access device is connected to the interactive television program guide equipment by a remote access link to provide a user with remote access to program guide functions. An interactive television program guide system based on multiple user television equipment devices in a single household is provided. The system provides a user with an opportunity to adjust program guide settings with a given one of the interactive television program guides. Program guide setting include features related to setting program reminders, profiles, program recording features, messaging features, favorites features, parental control features, program guide set up features (e.g., audio and video and language settings), etc.

18 Claims, 56 Drawing Sheets

(56) References Cited

U.S. PATENT DOCUMENTS

| | | |
|---|---|---|
| 4,170,782 A | 10/1979 | Miller |
| 4,264,924 A | 4/1981 | Freeman |
| 4,264,925 A | 4/1981 | Freeman et al. |
| 4,271,532 A | 6/1981 | Wine |
| 4,280,148 A | 7/1981 | Saxena |
| 4,300,040 A | 11/1981 | Gould et al. |
| 4,355,415 A | 10/1982 | George et al. |
| 4,367,559 A | 1/1983 | Tults |
| 4,375,651 A | 3/1983 | Templin et al. |
| 4,381,522 A | 4/1983 | Lambert |
| 4,390,901 A | 6/1983 | Keiser et al. |
| 4,422,105 A | 12/1983 | Rodesch et al. |
| 4,425,579 A | 1/1984 | Merrell |
| 4,429,385 A | 1/1984 | Cichelli et al. |
| 4,488,179 A | 12/1984 | Krüger et al. |
| 4,495,654 A | 1/1985 | Deiss |
| 4,527,194 A | 7/1985 | Sirazi |
| 4,573,072 A | 2/1986 | Freeman |
| 4,602,279 A | 7/1986 | Freeman |
| 4,605,964 A | 8/1986 | Chard |
| 4,625,080 A | 11/1986 | Scott |
| 4,630,108 A | 12/1986 | Gomersall |
| 4,641,205 A | 2/1987 | Beyers, Jr. |
| 4,645,873 A | 2/1987 | Chomet |
| 4,689,022 A | 8/1987 | Peers et al. |
| 4,691,351 A | 9/1987 | Hayashi et al. |
| 4,694,490 A | 9/1987 | Harvey et al. |
| 4,706,121 A | 11/1987 | Young |
| 4,718,107 A | 1/1988 | Hayes |
| 4,751,578 A | 6/1988 | Reiter et al. |
| 4,754,326 A | 6/1988 | Kram et al. |
| 4,761,684 A | 8/1988 | Clark et al. |
| 4,787,063 A | 11/1988 | Muguet et al. |
| 4,802,022 A | 1/1989 | Harada |
| 4,841,562 A | 6/1989 | Lem |
| 4,847,698 A | 7/1989 | Freeman |
| 4,847,700 A | 7/1989 | Freeman |
| 4,857,999 A | 8/1989 | Welsh |
| 4,866,434 A | 9/1989 | Keenan |
| 4,882,732 A | 11/1989 | Kaminaga |
| 4,899,370 A | 2/1990 | Kameo et al. |
| 4,908,707 A | 3/1990 | Kinghorn et al. |
| 4,908,713 A | 3/1990 | Levine |
| 4,920,432 A | 4/1990 | Eggers et al. |
| 4,930,158 A | 5/1990 | Vogel |
| 4,945,563 A | 7/1990 | Horton et al. |
| 4,947,244 A | 8/1990 | Fenwick et al. |
| 4,959,719 A | 9/1990 | Strubbe et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,994,908 A | 2/1991 | Kuban et al. |
| 5,001,554 A | 3/1991 | Johnson et al. |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,047,867 A | 9/1991 | Strubbe et al. |
| 5,068,733 A | 11/1991 | Bennett |
| 5,075,771 A | 12/1991 | Hashimoto et al. |
| 5,086,385 A | 2/1992 | Launey et al. |
| 5,089,885 A | 2/1992 | Clark |
| 5,090,049 A | 2/1992 | Chen |
| 5,105,184 A | 4/1992 | Pirani et al. |
| 5,109,279 A | 4/1992 | Ando |
| 5,113,259 A | 5/1992 | Romesburg et al. |
| 5,123,046 A | 6/1992 | Levine |
| 5,126,851 A | 6/1992 | Yoshimura et al. |
| 5,132,992 A | 7/1992 | Yurt et al. |
| 5,134,649 A | 7/1992 | Gutzmer |
| 5,134,719 A | 7/1992 | Mankovitz |
| 5,151,789 A | 9/1992 | Young |
| 5,155,591 A | 10/1992 | Wachob |
| 5,168,353 A | 12/1992 | Walker et al. |
| 5,170,388 A | 12/1992 | Endoh |
| 5,172,413 A | 12/1992 | Bradley et al. |
| 5,179,439 A | 1/1993 | Hashimoto et al. |
| 5,187,589 A | 2/1993 | Kono et al. |
| 5,189,630 A | 2/1993 | Barstow et al. |
| 5,191,423 A | 3/1993 | Yoshida et al. |
| 5,195,134 A | 3/1993 | Inoue et al. |
| 5,200,822 A | 4/1993 | Bronfin et al. |
| 5,202,915 A | 4/1993 | Nishii |
| 5,210,611 A | 5/1993 | Yee et al. |
| 5,216,228 A | 6/1993 | Hashimoto |
| 5,223,924 A | 6/1993 | Strubbe |
| 5,225,902 A | 7/1993 | McMullan, Jr. |
| 5,228,077 A | 7/1993 | Darbee |
| 5,231,494 A | 7/1993 | Wachob |
| 5,233,423 A | 8/1993 | Jernigan et al. |
| 5,241,428 A | 8/1993 | Goldwasser et al. |
| 5,249,043 A | 9/1993 | Grandmougin et al. |
| 5,253,066 A | 10/1993 | Vogel |
| 5,253,275 A | 10/1993 | Yurt et al. |
| 5,262,860 A | 11/1993 | Fitzpatrick et al. |
| 5,283,560 A | 2/1994 | Bartlett |
| 5,283,819 A | 2/1994 | Glick et al. |
| 5,285,284 A | 2/1994 | Takashima et al. |
| 5,296,931 A | 3/1994 | Na et al. |
| 5,307,173 A | 4/1994 | Yuen et al. |
| 5,317,403 A | 5/1994 | Keenan |
| 5,319,445 A | 6/1994 | Fitts |
| 5,323,234 A | 6/1994 | Kawasaki et al. |
| 5,323,240 A | 6/1994 | Amano et al. |
| 5,325,183 A | 6/1994 | Rhee et al. |
| 5,325,423 A | 6/1994 | Lewis |
| 5,335,079 A | 8/1994 | Yuen et al. |
| 5,335,277 A | 8/1994 | Harvey et al. |
| 5,347,632 A | 9/1994 | Filepp et al. |
| 5,351,075 A | 9/1994 | Herz et al. |
| 5,353,121 A | 10/1994 | Young et al. |
| 5,359,367 A | 10/1994 | Stockill et al. |
| 5,371,551 A | 12/1994 | Logan et al. |
| 5,377,317 A | 12/1994 | Bates et al. |
| 5,382,983 A | 1/1995 | Kwoh et al. |
| 5,396,546 A | 3/1995 | Remillard |
| 5,398,074 A | 3/1995 | Duffield et al. |
| 5,398,138 A | 3/1995 | Tomita |
| 5,410,326 A | 4/1995 | Goldstein |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,416,508 A | 5/1995 | Sakuma et al. |
| 5,418,622 A | 5/1995 | Takeuchi |
| 5,432,561 A | 7/1995 | Strubbe |
| 5,440,678 A | 8/1995 | Eisen et al. |
| 5,442,389 A | 8/1995 | Blahut et al. |
| 5,444,499 A | 8/1995 | Saitoh et al. |
| 5,446,919 A | 8/1995 | Wilkins |
| 5,455,570 A | 10/1995 | Cook et al. |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,467,264 A | 11/1995 | Rauch et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo et al. |
| 5,485,221 A | 1/1996 | Banker et al. |
| 5,488,409 A | 1/1996 | Yuen et al. |
| 5,502,504 A | 3/1996 | Marshall et al. |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,517,257 A | 5/1996 | Dunn et al. |

(56) References Cited

U.S. PATENT DOCUMENTS

| | | |
|---|---|---|
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,541,662 A | 7/1996 | Adams et al. |
| 5,543,856 A | 8/1996 | Rosser et al. |
| 5,548,345 A | 8/1996 | Brian et al. |
| 5,550,575 A | 8/1996 | West et al. |
| 5,550,576 A | 8/1996 | Klosterman |
| 5,550,578 A | 8/1996 | Hoarty et al. |
| 5,550,863 A | 8/1996 | Yurt et al. |
| 5,553,123 A | 9/1996 | Chan et al. |
| 5,553,221 A | 9/1996 | Reimer et al. |
| 5,557,338 A | 9/1996 | Maze et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,561,709 A | 10/1996 | Remillard |
| 5,563,665 A | 10/1996 | Chang |
| 5,568,272 A | 10/1996 | Levine |
| 5,570,295 A | 10/1996 | Isenberg et al. |
| 5,570,415 A | 10/1996 | Stretton et al. |
| 5,572,442 A | 11/1996 | Schulhof et al. |
| 5,574,965 A | 11/1996 | Welmer |
| 5,576,755 A | 11/1996 | Davis et al. |
| 5,579,239 A | 11/1996 | Freeman et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,482 A | 1/1997 | Abraham |
| 5,592,551 A | 1/1997 | Lett et al. |
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,596,705 A | 1/1997 | Reimer et al. |
| 5,600,364 A | 2/1997 | Hendricks et al. |
| 5,602,582 A | 2/1997 | Wanderscheid et al. |
| 5,606,374 A | 2/1997 | Bertram |
| 5,606,726 A | 2/1997 | Yoshinobu |
| 5,610,653 A | 3/1997 | Abecassis |
| 5,616,876 A | 4/1997 | Cluts |
| 5,617,526 A | 4/1997 | Oran et al. |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,625,464 A | 4/1997 | Compoint et al. |
| 5,625,693 A | 4/1997 | Rohatgi et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,646,603 A | 7/1997 | Nagata et al. |
| 5,648,813 A | 7/1997 | Tanigawa et al. |
| 5,648,824 A | 7/1997 | Dunn et al. |
| 5,650,826 A | 7/1997 | Eitz et al. |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,655,214 A | 8/1997 | Mullett et al. |
| 5,657,072 A | 8/1997 | Aristides et al. |
| 5,657,414 A | 8/1997 | Lett et al. |
| 5,659,350 A | 8/1997 | Hendricks et al. |
| 5,659,367 A | 8/1997 | Yuen |
| 5,659,742 A | 8/1997 | Beattie et al. |
| 5,661,516 A | 8/1997 | Carles |
| 5,663,757 A | 9/1997 | Morales |
| 5,666,293 A | 9/1997 | Metz et al. |
| 5,666,498 A | 9/1997 | Amro |
| 5,666,645 A | 9/1997 | Thomas et al. |
| 5,671,411 A | 9/1997 | Watts et al. |
| 5,671,607 A | 9/1997 | Clemens et al. |
| 5,675,390 A | 10/1997 | Schindler et al. |
| 5,677,708 A | 10/1997 | Matthews, III et al. |
| 5,677,981 A | 10/1997 | Kato et al. |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,689,663 A | 11/1997 | Williams |
| 5,689,666 A | 11/1997 | Berquist et al. |
| 5,691,476 A | 11/1997 | Madaras |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako et al. |
| 5,696,695 A | 12/1997 | Ehlers et al. |
| 5,696,824 A | 12/1997 | Walsh |
| 5,696,905 A | 12/1997 | Reimer et al. |
| 5,699,052 A | 12/1997 | Miyahara |
| 5,699,107 A | 12/1997 | Lawler et al. |
| 5,706,191 A | 1/1998 | Bassett et al. |
| 5,708,767 A | 1/1998 | Yeo et al. |
| 5,710,601 A | 1/1998 | Marshall et al. |
| 5,710,605 A | 1/1998 | Nelson |
| 5,710,884 A | 1/1998 | Dedrick |
| 5,715,020 A | 2/1998 | Kuroiwa et al. |
| 5,717,452 A | 2/1998 | Janin et al. |
| 5,717,923 A | 2/1998 | Dedrick |
| 5,722,041 A | 2/1998 | Freadman |
| 5,724,091 A | 3/1998 | Freeman et al. |
| 5,724,103 A | 3/1998 | Batchelor |
| 5,724,567 A | 3/1998 | Rose et al. |
| 5,726,702 A | 3/1998 | Hamaguchi et al. |
| 5,727,060 A | 3/1998 | Young |
| 5,731,844 A | 3/1998 | Rauch et al. |
| 5,734,720 A | 3/1998 | Salganicoff |
| 5,734,853 A | 3/1998 | Hendricks et al. |
| 5,734,893 A | 3/1998 | Li et al. |
| 5,742,816 A | 4/1998 | Barr et al. |
| 5,742,905 A | 4/1998 | Pepe et al. |
| 5,745,710 A | 4/1998 | Clanton, III et al. |
| 5,748,191 A | 5/1998 | Rozak et al. |
| 5,748,716 A | 5/1998 | Levine |
| 5,748,732 A | 5/1998 | Le Berre et al. |
| 5,749,081 A | 5/1998 | Whiteis |
| 5,751,282 A | 5/1998 | Girard et al. |
| 5,752,159 A | 5/1998 | Faust et al. |
| 5,752,160 A | 5/1998 | Dunn |
| 5,754,771 A | 5/1998 | Epperson et al. |
| 5,754,938 A | 5/1998 | Herz et al. |
| 5,754,939 A | 5/1998 | Herz et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,606 A | 6/1998 | Wolzien |
| 5,761,662 A | 6/1998 | Dasan |
| 5,768,528 A | 6/1998 | Stumm |
| 5,771,275 A | 6/1998 | Brunner et al. |
| 5,774,357 A | 6/1998 | Hoffberg et al. |
| 5,774,539 A | 6/1998 | Maass et al. |

(56) References Cited

U.S. PATENT DOCUMENTS

| | | |
|---|---|---|
| 5,774,664 A | 6/1998 | Hidary et al. |
| 5,774,666 A | 6/1998 | Portuesi |
| 5,774,859 A | 6/1998 | Houser et al. |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,198 A | 8/1998 | Roop et al. |
| 5,790,201 A | 8/1998 | Antos |
| 5,790,202 A | 8/1998 | Kummer et al. |
| 5,790,753 A | 8/1998 | Krishnamoorthy et al. |
| 5,790,935 A | 8/1998 | Payton |
| 5,793,438 A | 8/1998 | Bedard |
| 5,793,964 A | 8/1998 | Rogers et al. |
| 5,793,972 A | 8/1998 | Shane et al. |
| 5,796,952 A | 8/1998 | Davis et al. |
| 5,798,785 A | 8/1998 | Hendricks et al. |
| 5,801,747 A | 9/1998 | Bedard |
| 5,801,787 A | 9/1998 | Schein et al. |
| 5,802,284 A | 9/1998 | Karlton et al. |
| 5,805,155 A | 9/1998 | Allibhoy et al. |
| 5,805,204 A | 9/1998 | Thompson et al. |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,809,214 A | 9/1998 | Nureki et al. |
| 5,809,471 A | 9/1998 | Brodsky |
| 5,812,123 A | 9/1998 | Rowe et al. |
| 5,812,124 A | 9/1998 | Eick et al. |
| 5,812,205 A | 9/1998 | Milnes et al. |
| 5,812,930 A | 9/1998 | Zavrel |
| 5,812,931 A | 9/1998 | Yuen |
| 5,812,937 A | 9/1998 | Takahisa et al. |
| 5,815,145 A | 9/1998 | Matthews, III |
| 5,818,438 A | 10/1998 | Howe et al. |
| 5,818,441 A | 10/1998 | Throckmorton et al. |
| 5,818,511 A | 10/1998 | Farry et al. |
| 5,818,935 A | 10/1998 | Maa |
| 5,819,019 A | 10/1998 | Nelson |
| 5,819,156 A | 10/1998 | Belmont |
| 5,822,123 A | 10/1998 | Davis et al. |
| 5,822,606 A | 10/1998 | Morton |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| RE35,954 E | 11/1998 | Levine |
| 5,831,664 A | 11/1998 | Wharton et al. |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,844,552 A | 12/1998 | Gaughan et al. |
| 5,844,620 A | 12/1998 | Coleman et al. |
| 5,848,396 A | 12/1998 | Gerace |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,864,704 A | 1/1999 | Battle et al. |
| 5,864,823 A | 1/1999 | Levitan |
| 5,867,223 A | 2/1999 | Schindler et al. |
| 5,867,226 A | 2/1999 | Wehmeyer et al. |
| 5,867,233 A | 2/1999 | Tanaka et al. |
| 5,867,799 A | 2/1999 | Lang et al. |
| 5,870,754 A | 2/1999 | Dimitrova et al. |
| 5,873,660 A | 2/1999 | Walsh et al. |
| 5,875,108 A | 2/1999 | Hoffberg et al. |
| 5,877,906 A | 3/1999 | Nagasawa et al. |
| 5,878,222 A | 3/1999 | Harrison |
| 5,880,720 A | 3/1999 | Iwafune et al. |
| 5,880,768 A | 3/1999 | Lemmons et al. |
| 5,883,621 A | 3/1999 | Iwamura |
| 5,884,298 A | 3/1999 | Smith, II et al. |
| 5,886,732 A | 3/1999 | Humpleman |
| 5,889,950 A | 3/1999 | Kuzma |
| 5,892,536 A | 4/1999 | Logan et al. |
| 5,892,767 A | 4/1999 | Bell et al. |
| 5,901,366 A | 5/1999 | Nakano et al. |
| 5,903,545 A | 5/1999 | Sabourin et al. |
| 5,903,816 A | 5/1999 | Broadwin et al. |
| 5,907,322 A | 5/1999 | Kelly et al. |
| 5,907,323 A | 5/1999 | Lawler et al. |
| 5,914,712 A | 6/1999 | Sartain et al. |
| 5,914,746 A | 6/1999 | Matthews, III et al. |
| 5,915,068 A | 6/1999 | Levine |
| 5,915,250 A | 6/1999 | Jain et al. |
| 5,917,405 A | 6/1999 | Joao |
| 5,923,848 A | 7/1999 | Goodhand et al. |
| 5,926,624 A | 7/1999 | Katz et al. |
| 5,929,849 A | 7/1999 | Kikinis |
| 5,929,932 A | 7/1999 | Otsuki et al. |
| 5,931,905 A | 8/1999 | Hashimoto et al. |
| 5,937,160 A | 8/1999 | Davis et al. |
| 5,940,073 A | 8/1999 | Klosterman et al. |
| 5,940,387 A | 8/1999 | Humpleman |
| 5,940,572 A | 8/1999 | Balaban et al. |
| 5,945,988 A | 8/1999 | Williams et al. |
| 5,946,386 A | 8/1999 | Rogers et al. |
| 5,949,954 A | 9/1999 | Young et al. |
| 5,953,485 A | 9/1999 | Abecassis |
| 5,955,988 A | 9/1999 | Blonstein et al. |
| 5,956,025 A | 9/1999 | Goulden et al. |
| 5,956,716 A | 9/1999 | Kenner et al. |
| 5,959,592 A | 9/1999 | Petruzzelli |
| 5,963,264 A | 10/1999 | Jackson |
| 5,963,645 A | 10/1999 | Kigawa et al. |
| 5,969,748 A | 10/1999 | Casement et al. |
| 5,970,473 A | 10/1999 | Gerszberg et al. |
| 5,973,683 A | 10/1999 | Cragun et al. |
| 5,977,964 A | 11/1999 | Williams et al. |
| 5,982,411 A | 11/1999 | Eyer et al. |
| 5,983,236 A | 11/1999 | Yager et al. |
| 5,987,509 A | 11/1999 | Portuesi |
| 5,988,078 A | 11/1999 | Levine |
| 5,990,885 A | 11/1999 | Gopinath |
| 5,990,890 A | 11/1999 | Etheredge |
| 5,990,927 A | 11/1999 | Hendricks et al. |
| 5,991,799 A | 11/1999 | Yen et al. |
| 5,991,832 A | 11/1999 | Sato et al. |
| 6,002,394 A | 12/1999 | Schein et al. |
| 6,002,443 A | 12/1999 | Iggulden |
| 6,002,444 A | 12/1999 | Marshall et al. |
| 6,002,450 A | 12/1999 | Darbee et al. |
| 6,005,561 A | 12/1999 | Hawkins et al. |
| 6,005,563 A | 12/1999 | White et al. |
| 6,005,565 A | 12/1999 | Legall et al. |
| 6,005,597 A | 12/1999 | Barrett et al. |
| 6,005,631 A | 12/1999 | Anderson et al. |
| 6,006,257 A | 12/1999 | Slezak |
| 6,008,802 A | 12/1999 | Iki et al. |
| 6,008,803 A | 12/1999 | Rowe et al. |
| 6,009,153 A | 12/1999 | Houghton et al. |
| 6,009,465 A | 12/1999 | Decker et al. |
| 6,012,086 A | 1/2000 | Lowell |
| 6,014,184 A | 1/2000 | Knee et al. |
| 6,016,141 A | 1/2000 | Knudson et al. |
| 6,018,372 A | 1/2000 | Etheredge |
| 6,020,880 A | 2/2000 | Naimpally |
| 6,020,883 A | 2/2000 | Herz et al. |
| 6,023,267 A | 2/2000 | Chapuis et al. |
| 6,025,837 A | 2/2000 | Matthews, III et al. |
| 6,025,869 A | 2/2000 | Stas et al. |
| 6,029,195 A | 2/2000 | Herz |
| 6,035,339 A | 3/2000 | Agraharam et al. |

(56) References Cited

U.S. PATENT DOCUMENTS

| | | | |
|---|---|---|---|
| 6,038,367 A | 3/2000 | Abecassis |
| 6,040,829 A | 3/2000 | Croy et al. |
| 6,049,823 A | 4/2000 | Hwang |
| 6,057,872 A | 5/2000 | Candelore |
| 6,057,890 A | 5/2000 | Virden et al. |
| 6,058,238 A | 5/2000 | Ng et al. |
| 6,061,779 A | 5/2000 | Garde |
| 6,064,980 A | 5/2000 | Jacobi et al. |
| 6,065,047 A | 5/2000 | Carpenter et al. |
| 6,067,561 A | 5/2000 | Dillon |
| 6,067,564 A | 5/2000 | Urakoshi et al. |
| 6,072,460 A | 6/2000 | Marshall et al. |
| 6,075,526 A | 6/2000 | Rothmuller |
| 6,075,568 A | 6/2000 | Matsuura |
| 6,081,750 A | 6/2000 | Hoffberg et al. |
| 6,088,722 A | 7/2000 | Herz et al. |
| 6,091,883 A | 7/2000 | Artigalas et al. |
| 6,091,884 A | 7/2000 | Yuen et al. |
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,125,230 A | 9/2000 | Yaginuma et al. |
| 6,130,726 A | 10/2000 | Darbee et al. |
| 6,133,847 A | 10/2000 | Yang |
| 6,133,909 A | 10/2000 | Schein et al. |
| 6,133,910 A | 10/2000 | Stinebruner |
| 6,133,912 A | 10/2000 | Montero |
| 6,139,177 A | 10/2000 | Venkatraman et al. |
| 6,141,488 A | 10/2000 | Knudson et al. |
| 6,144,401 A | 11/2000 | Casement et al. |
| 6,144,702 A | 11/2000 | Yurt et al. |
| 6,151,643 A | 11/2000 | Cheng et al. |
| 6,157,411 A | 12/2000 | Williams et al. |
| 6,157,413 A | 12/2000 | Hanafee et al. |
| 6,160,988 A | 12/2000 | Shroyer |
| 6,163,316 A | 12/2000 | Killian |
| 6,163,345 A | 12/2000 | Noguchi et al. |
| 6,167,188 A | 12/2000 | Young et al. |
| 6,169,543 B1 | 1/2001 | Wehmeyer |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,335 B1 | 1/2001 | Hendricks et al. |
| 6,182,094 B1 | 1/2001 | Humpleman et al. |
| 6,184,877 B1 | 2/2001 | Dodson et al. |
| 6,188,381 B1 | 2/2001 | van der Wal et al. |
| 6,188,397 B1 | 2/2001 | Humpleman |
| 6,192,340 B1 | 2/2001 | Abecassis |
| 6,195,501 B1 | 2/2001 | Perry et al. |
| 6,199,076 B1 | 3/2001 | Logan et al. |
| 6,202,211 B1 | 3/2001 | Williams, Jr. |
| 6,208,335 B1 | 3/2001 | Gordon et al. |
| 6,208,384 B1 | 3/2001 | Schultheiss |
| 6,208,799 B1 | 3/2001 | Marsh et al. |
| 6,212,327 B1 | 4/2001 | Berstis et al. |
| 6,212,553 B1 | 4/2001 | Lee et al. |
| 6,216,264 B1 | 4/2001 | Maze et al. |
| 6,219,839 B1 | 4/2001 | Sampsell |
| 6,233,389 B1 | 5/2001 | Barton et al. |
| 6,233,734 B1 | 5/2001 | Macrae et al. |
| 6,236,978 B1 | 5/2001 | Tuzhilin |
| 6,237,049 B1 | 5/2001 | Ludtke |
| 6,239,794 B1 | 5/2001 | Yuen et al. |
| 6,240,555 B1 | 5/2001 | Shoff et al. |
| 6,260,088 B1 | 7/2001 | Gove et al. |
| 6,262,772 B1 | 7/2001 | Shen et al. |
| 6,263,501 B1 | 7/2001 | Schein et al. |
| 6,263,503 B1 | 7/2001 | Margulis |
| 6,263,507 B1 * | 7/2001 | Ahmad et al. ............... 725/134 |
| 6,266,814 B1 | 7/2001 | Lemmons et al. |
| 6,268,849 B1 | 7/2001 | Boyer et al. |
| 6,275,648 B1 | 8/2001 | Knudson et al. |
| 6,279,029 B1 | 8/2001 | Sampat et al. |
| 6,286,142 B1 | 9/2001 | Ehreth |
| 6,288,716 B1 | 9/2001 | Humpleman et al. |
| 6,292,624 B1 | 9/2001 | Saib et al. |
| 6,298,482 B1 | 10/2001 | Seidman et al. |
| 6,305,018 B1 | 10/2001 | Usui et al. |
| 6,310,886 B1 | 10/2001 | Barton |
| 6,311,011 B1 | 10/2001 | Kuroada |
| 6,317,881 B1 | 11/2001 | Shah-Nazaroff et al. |
| 6,317,884 B1 | 11/2001 | Eames et al. |
| 6,317,885 B1 | 11/2001 | Fries |
| 6,321,318 B1 | 11/2001 | Baltz et al. |
| 6,324,338 B1 | 11/2001 | Wood et al. |
| 6,326,982 B1 | 12/2001 | Wu et al. |
| 6,327,049 B1 | 12/2001 | Ohtsuka |
| 6,327,418 B1 | 12/2001 | Barton |
| 6,331,877 B1 | 12/2001 | Bennington et al. |
| 6,335,963 B1 | 1/2002 | Bosco |
| 6,336,099 B1 | 1/2002 | Barnett et al. |
| 6,337,715 B1 | 1/2002 | Inagaki et al. |
| 6,341,374 B2 | 1/2002 | Schein et al. |
| 6,357,043 B1 | 3/2002 | Ellis et al. |
| 6,359,636 B1 | 3/2002 | Schindler et al. |
| 6,367,080 B1 | 4/2002 | Enomoto et al. |
| 6,373,528 B1 | 4/2002 | Bennington et al. |
| 6,374,406 B2 | 4/2002 | Hirata |
| 6,388,714 B1 | 5/2002 | Schein et al. |
| 6,389,464 B1 | 5/2002 | Krishnamurthy et al. |
| 6,396,544 B1 | 5/2002 | Schindler et al. |
| 6,396,546 B1 | 5/2002 | Alten et al. |
| 6,397,080 B1 | 5/2002 | Viktorsson et al. |
| 6,408,435 B1 | 6/2002 | Sato |
| 6,408,437 B1 | 6/2002 | Hendricks et al. |
| 6,411,696 B1 | 6/2002 | Iverson et al. |
| 6,425,000 B1 | 7/2002 | Carmello et al. |
| 6,434,524 B1 | 8/2002 | Weber |
| 6,437,836 B1 | 8/2002 | Huang et al. |
| 6,441,832 B1 | 8/2002 | Tao et al. |
| 6,442,332 B1 | 8/2002 | Knudson et al. |
| 6,445,398 B1 | 9/2002 | Gerba et al. |
| 6,463,585 B1 | 10/2002 | Hendricks et al. |
| 6,473,559 B1 | 10/2002 | Knudson et al. |
| 6,480,889 B1 | 11/2002 | Saito et al. |
| 6,486,892 B1 | 11/2002 | Stern |
| 6,493,875 B1 | 12/2002 | Eames et al. |
| 6,505,348 B1 | 1/2003 | Knowles et al. |
| 6,509,908 B1 | 1/2003 | Croy et al. |
| 6,516,467 B1 | 2/2003 | Schindler et al. |
| 6,526,577 B1 | 2/2003 | Knudson et al. |
| 6,530,083 B1 | 3/2003 | Liebenow |
| 6,545,578 B2 | 4/2003 | Yoshiyama |
| 6,545,722 B1 * | 4/2003 | Schultheiss et al. ........ 348/552 |
| 6,546,399 B1 | 4/2003 | Reed et al. |
| 6,557,031 B1 | 4/2003 | Mimura et al. |
| 6,564,383 B1 | 5/2003 | Combs et al. |
| 6,571,279 B1 | 5/2003 | Herz et al. |
| 6,603,488 B2 | 8/2003 | Humpleman et al. |
| 6,611,654 B1 | 8/2003 | Shteyn |
| 6,622,304 B1 | 9/2003 | Carhart |
| 6,661,468 B2 | 12/2003 | Alten et al. |
| 6,670,971 B1 | 12/2003 | Oral et al. |
| 6,675,385 B1 | 1/2004 | Wang |
| 6,675,386 B1 | 1/2004 | Hendricks et al. |
| 6,678,004 B1 | 1/2004 | Schultheiss et al. |
| 6,701,523 B1 | 3/2004 | Hancock et al. |
| 6,704,028 B2 | 3/2004 | Wugofski |
| 6,721,954 B1 | 4/2004 | Nickum |
| 6,727,914 B1 | 4/2004 | Gutta |
| 6,732,369 B1 | 5/2004 | Schein et al. |
| 6,732,372 B2 | 5/2004 | Tomita et al. |
| 6,738,978 B1 | 5/2004 | Hendricks et al. |
| 6,744,967 B2 | 6/2004 | Kaminski et al. |
| 6,754,904 B1 | 6/2004 | Cooper et al. |
| 6,760,537 B2 | 7/2004 | Mankovitz |
| 6,772,433 B1 | 8/2004 | LaJoie et al. |
| 6,788,882 B1 | 9/2004 | Geer et al. |
| 6,816,172 B1 | 11/2004 | Iki et al. |
| 6,822,661 B2 | 11/2004 | Sai et al. |
| 6,828,993 B1 | 12/2004 | Hendricks et al. |
| 6,847,686 B2 | 1/2005 | Morad et al. |
| 6,865,746 B1 | 3/2005 | Herrington et al. |

(56) References Cited

U.S. PATENT DOCUMENTS

| | | |
|---|---|---|
| 6,871,146 B1 | 3/2005 | Kelly et al. |
| 6,871,186 B1 | 3/2005 | Tuzhilin et al. |
| 6,882,299 B1 | 4/2005 | Allport |
| 6,898,762 B2 | 5/2005 | Ellis et al. |
| 6,925,567 B1 | 8/2005 | Hirata |
| 6,927,806 B2 | 8/2005 | Chan |
| 6,934,964 B1 | 8/2005 | Schaffer et al. |
| 6,973,669 B2 | 12/2005 | Daniels |
| 6,983,483 B2 | 1/2006 | Maze et al. |
| 7,006,881 B1 | 2/2006 | Hoffberg et al. |
| 7,013,339 B2 | 3/2006 | Schwager et al. |
| 7,013,478 B1 | 3/2006 | Hendricks et al. |
| 7,017,171 B1 | 3/2006 | Horlander et al. |
| 7,050,988 B2 | 5/2006 | Atcheson et al. |
| 7,051,353 B2 | 5/2006 | Yamashita et al. |
| 7,058,635 B1 | 6/2006 | Shah-Nazaroff et al. |
| 7,084,780 B2 | 8/2006 | Nguyen et al. |
| 7,096,486 B1 | 8/2006 | Ukai et al. |
| 7,117,518 B1 | 10/2006 | Takahashi et al. |
| 7,134,131 B1 | 11/2006 | Hendricks et al. |
| 7,152,236 B1 | 12/2006 | Wugofski et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,194,755 B1 | 3/2007 | Nakata et al. |
| 7,224,886 B2 | 5/2007 | Akamatsu et al. |
| 7,328,450 B2 | 2/2008 | Macrae et al. |
| 7,343,614 B1 | 3/2008 | Hendricks et al. |
| 7,343,616 B1 | 3/2008 | Takahashi et al. |
| 7,349,976 B1 | 3/2008 | Glaser et al. |
| 7,363,645 B1 | 4/2008 | Hendricks |
| 7,403,693 B2 | 7/2008 | Shteyn |
| 7,437,751 B2 | 10/2008 | Daniels |
| 7,480,929 B2 | 1/2009 | Klosterman et al. |
| 7,493,641 B2 | 2/2009 | Klosterman et al. |
| 7,665,109 B2 | 2/2010 | Matthews, III et al. |
| 7,721,307 B2 | 5/2010 | Hendricks et al. |
| 7,757,254 B2 | 7/2010 | Shoff et al. |
| 8,073,921 B2 | 12/2011 | Thomas et al. |
| 2001/0026533 A1 | 10/2001 | Schwager |
| 2002/0013941 A1 | 1/2002 | Ward, III et al. |
| 2002/0026496 A1 | 2/2002 | Boyer et al. |
| 2002/0032907 A1* | 3/2002 | Daniels ............... 725/51 |
| 2002/0040475 A1 | 4/2002 | Yap et al. |
| 2002/0057892 A1 | 5/2002 | Mano et al. |
| 2002/0059599 A1 | 5/2002 | Schein et al. |
| 2002/0059610 A1 | 5/2002 | Ellis |
| 2002/0083455 A1 | 6/2002 | Sato |
| 2002/0090203 A1 | 7/2002 | Mankovitz |
| 2002/0095673 A1 | 7/2002 | Leung et al. |
| 2002/0100044 A1 | 7/2002 | Daniels |
| 2002/0100052 A1 | 7/2002 | Daniels |
| 2002/0112249 A1 | 8/2002 | Hendricks et al. |
| 2002/0118676 A1 | 8/2002 | Tonnby et al. |
| 2002/0129368 A1 | 9/2002 | Schlack et al. |
| 2002/0138840 A1 | 9/2002 | Schein et al. |
| 2002/0174424 A1 | 11/2002 | Chang et al. |
| 2002/0184626 A1 | 12/2002 | Darbee et al. |
| 2002/0194596 A1 | 12/2002 | Srivastava |
| 2003/0005445 A1 | 1/2003 | Schein et al. |
| 2003/0012555 A1 | 1/2003 | Yuen et al. |
| 2003/0031465 A1 | 2/2003 | Blake |
| 2003/0037336 A1 | 2/2003 | Leftwich |
| 2003/0040962 A1 | 2/2003 | Lewis |
| 2003/0066085 A1 | 4/2003 | Boyer et al. |
| 2003/0084461 A1 | 5/2003 | Hoang |
| 2003/0093329 A1 | 5/2003 | Gutta |
| 2003/0097227 A1 | 5/2003 | Bloch et al. |
| 2003/0115602 A1 | 6/2003 | Knee et al. |
| 2003/0131356 A1 | 7/2003 | Proehl et al. |
| 2003/0142957 A1 | 7/2003 | Young et al. |
| 2003/0159157 A1 | 8/2003 | Chan |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0198462 A1 | 10/2003 | Bumgardner et al. |
| 2003/0208756 A1 | 11/2003 | Macrae et al. |
| 2003/0208758 A1 | 11/2003 | Schein et al. |
| 2003/0229900 A1 | 12/2003 | Reisman |
| 2004/0031050 A1 | 2/2004 | Klosterman |
| 2004/0078815 A1 | 4/2004 | Lemmons et al. |
| 2004/0078820 A1 | 4/2004 | Nickum |
| 2004/0098744 A1 | 5/2004 | Gutta |
| 2004/0103439 A1 | 5/2004 | Macrae et al. |
| 2004/0139465 A1 | 7/2004 | Matthews et al. |
| 2004/0194138 A1 | 9/2004 | Boylan, III et al. |
| 2004/0210935 A1 | 10/2004 | Schein et al. |
| 2004/0221310 A1 | 11/2004 | Herrington et al. |
| 2005/0015804 A1 | 1/2005 | LaJoie et al. |
| 2005/0015815 A1 | 1/2005 | Shoff et al. |
| 2005/0028208 A1 | 2/2005 | Ellis et al. |
| 2005/0028218 A1 | 2/2005 | Blake |
| 2005/0120003 A1 | 6/2005 | Drury et al. |
| 2005/0138660 A1 | 6/2005 | Boyer et al. |
| 2005/0193414 A1 | 9/2005 | Horvitz et al. |
| 2005/0204388 A1 | 9/2005 | Knudson et al. |
| 2005/0229215 A1 | 10/2005 | Schein et al. |
| 2005/0235320 A1 | 10/2005 | Maze et al. |
| 2005/0240962 A1 | 10/2005 | Cooper et al. |
| 2005/0251822 A1 | 11/2005 | Knowles et al. |
| 2005/0251827 A1 | 11/2005 | Ellis et al. |
| 2005/0265169 A1 | 12/2005 | Yoshimaru et al. |
| 2005/0267819 A1 | 12/2005 | Kaplan |
| 2005/0278741 A1 | 12/2005 | Robarts et al. |
| 2006/0031883 A1 | 2/2006 | Ellis et al. |
| 2006/0037044 A1 | 2/2006 | Daniels |
| 2006/0085825 A1 | 4/2006 | Istvan et al. |
| 2006/0112410 A1 | 5/2006 | Poli et al. |
| 2006/0136966 A1 | 6/2006 | Folk |
| 2007/0157242 A1 | 7/2007 | Cordray et al. |
| 2007/0204308 A1 | 8/2007 | Nicholas et al. |
| 2007/0271582 A1 | 11/2007 | Ellis et al. |
| 2008/0010655 A1 | 1/2008 | Ellis et al. |
| 2008/0013429 A1 | 1/2008 | Chen et al. |
| 2008/0178221 A1 | 7/2008 | Schein et al. |
| 2008/0184304 A1 | 7/2008 | Ellis et al. |
| 2008/0184308 A1 | 7/2008 | Herrington et al. |
| 2008/0184312 A1 | 7/2008 | Schein et al. |
| 2008/0184313 A1 | 7/2008 | Knudson et al. |
| 2008/0184322 A1 | 7/2008 | Blake |
| 2008/0189742 A1 | 8/2008 | Ellis et al. |
| 2008/0189743 A1 | 8/2008 | Ellis et al. |
| 2008/0235725 A1 | 9/2008 | Hendricks |
| 2008/0263600 A1 | 10/2008 | Olague et al. |
| 2008/0288980 A1 | 11/2008 | Schein et al. |
| 2009/0044226 A1 | 2/2009 | Ellis et al. |
| 2009/0070817 A1 | 3/2009 | Ellis et al. |
| 2009/0241144 A1 | 9/2009 | LaJoie et al. |
| 2009/0297124 A1 | 12/2009 | Ng |
| 2010/0115413 A1 | 5/2010 | Schein et al. |
| 2010/0115541 A1 | 5/2010 | Schein et al. |
| 2010/0211969 A1 | 8/2010 | Schein et al. |
| 2011/0030027 A1 | 2/2011 | Nishioka et al. |
| 2011/0173660 A1 | 7/2011 | Schein et al. |
| 2012/0272270 A1 | 10/2012 | Boyer et al. |

FOREIGN PATENT DOCUMENTS

| | | |
|---|---|---|
| CA | 2232003 | 6/2002 |
| CN | 1567986 | 1/2005 |
| DE | 31 51 492 | 7/1983 |
| DE | 36 40 436 | 6/1988 |
| DE | 42 01 031 | 7/1993 |
| DE | 42 17 246 | 12/1993 |
| DE | 42 40 187 | 6/1994 |
| DE | 44 07 701 | 9/1995 |
| DE | 44 31 438 A1 | 3/1996 |
| DE | 44 40 174 | 5/1996 |
| DE | 44 40 419 | 5/1996 |
| DE | 195 02 922 A1 | 8/1996 |
| DE | 195 31 121 | 2/1997 |
| DE | 197 40 079 | 3/1999 |

(56) References Cited

FOREIGN PATENT DOCUMENTS

| | | |
|---|---|---|
| EP | 0 723 369 | 8/1942 |
| EP | 0 276 425 | 8/1988 |
| EP | 0 339 675 | 11/1989 |
| EP | 0 439 281 | 7/1991 |
| EP | 0 560 593 | 9/1993 |
| EP | 0 617 563 B1 | 9/1994 |
| EP | 0 624 040 A2 | 11/1994 |
| EP | 0 627 857 | 12/1994 |
| EP | 0 682 452 | 11/1995 |
| EP | 0 705 036 | 4/1996 |
| EP | 0 721 253 | 7/1996 |
| EP | 0 725 539 | 8/1996 |
| EP | 0 742 669 | 11/1996 |
| EP | 0 744 853 | 11/1996 |
| EP | 0 753 964 | 1/1997 |
| EP | 0 762 756 | 3/1997 |
| EP | 0 774 853 | 5/1997 |
| EP | 0 774 866 | 5/1997 |
| EP | 0 793 225 | 9/1997 |
| EP | 0 795 994 | 9/1997 |
| EP | 0 805 594 | 11/1997 |
| EP | 0 836 320 | 4/1998 |
| EP | 0 836 321 | 4/1998 |
| EP | 0 837 599 | 4/1998 |
| EP | 0 843 468 | 5/1998 |
| EP | 0 852 361 | 7/1998 |
| EP | 0 854 645 | 7/1998 |
| EP | 0 897 242 | 2/1999 |
| EP | 0 940 983 | 9/1999 |
| EP | 0 945 003 | 9/1999 |
| EP | 1 099 339 | 5/2001 |
| EP | 1 099 341 | 5/2001 |
| EP | 1 271 952 | 1/2003 |
| EP | 1 515 549 | 3/2005 |
| EP | 1 538 838 | 6/2005 |
| FR | 2 572 235 | 4/1986 |
| FR | 2 579 397 | 9/1986 |
| GB | 1 554 411 | 10/1979 |
| GB | 2 227 622 | 8/1990 |
| GB | 2 229 595 | 9/1990 |
| GB | 2 256 115 | 11/1992 |
| GB | 2 256 546 | 12/1992 |
| GB | 2 265 792 | 10/1993 |
| GB | 2 275 800 | 9/1994 |
| GB | 2 286 754 | 8/1995 |
| GB | 2 300 551 | 11/1996 |
| GB | 2 325 537 | 11/1998 |
| GB | 2 346 251 | 8/2000 |
| JP | 62-060372 | 3/1987 |
| JP | 63-092177 | 4/1988 |
| JP | 02-045495 | 3/1990 |
| JP | 03-022770 | 1/1991 |
| JP | 03-035451 | 2/1991 |
| JP | 03-059837 | 3/1991 |
| JP | 03-215781 | 9/1991 |
| JP | 04-079053 | 3/1992 |
| JP | 04-227380 | 8/1992 |
| JP | 04-250760 | 9/1992 |
| JP | 04-276342 | 10/1992 |
| JP | 05-260400 | 10/1993 |
| JP | 05-314186 | 11/1993 |
| JP | 06-014129 | 1/1994 |
| JP | 06-021907 | 1/1994 |
| JP | 06-038165 | 2/1994 |
| JP | 06-046345 | 2/1994 |
| JP | 06-121262 | 4/1994 |
| JP | 06-124309 | 5/1994 |
| JP | 06-504165 | 5/1994 |
| JP | 06-208500 | 7/1994 |
| JP | 06-217271 | 8/1994 |
| JP | 06-243539 | 9/1994 |
| JP | 06-261139 | 9/1994 |
| JP | 06-350546 | 12/1994 |
| JP | 07-020254 | 1/1995 |
| JP | 07-021619 | 1/1995 |
| JP | 07-123326 | 5/1995 |
| JP | 07-135621 | 5/1995 |
| JP | 07-147657 | 6/1995 |
| JP | 07-154349 | 6/1995 |
| JP | 07-160732 | 6/1995 |
| JP | 07-162776 | 6/1995 |
| JP | 07-184131 | 7/1995 |
| JP | 07-193762 | 7/1995 |
| JP | 07-193763 | 7/1995 |
| JP | 07-212328 | 8/1995 |
| JP | 07-212331 | 8/1995 |
| JP | 07-212732 | 8/1995 |
| JP | 07-298153 | 11/1995 |
| JP | 08-32528 | 2/1996 |
| JP | 08-032538 | 2/1996 |
| JP | 08-056352 | 2/1996 |
| JP | 08-125497 | 5/1996 |
| JP | 08-180505 | 7/1996 |
| JP | 08-506941 | 7/1996 |
| JP | 08-242313 | 9/1996 |
| JP | 08-242436 | 9/1996 |
| JP | 08-251122 | 9/1996 |
| JP | 08-275077 | 10/1996 |
| JP | 09-009245 | 1/1997 |
| JP | 09-065300 A | 3/1997 |
| JP | 09-102827 | 4/1997 |
| JP | 09-120686 A | 5/1997 |
| JP | 09-148994 A | 6/1997 |
| JP | 09-162818 A | 6/1997 |
| JP | 09-162821 | 6/1997 |
| JP | 09-270965 A | 10/1997 |
| JP | 09-298677 | 11/1997 |
| JP | 10-40057 | 2/1998 |
| JP | 10-42235 | 2/1998 |
| JP | 10-93933 | 4/1998 |
| JP | 10-512420 | 11/1998 |
| JP | 11-177682 | 7/1999 |
| JP | 11-317937 A | 11/1999 |
| JP | 11-512903 | 11/1999 |
| JP | 2002-514797 | 5/2002 |
| JP | 2006-025444 | 1/2006 |
| KR | 1998/025758 | 7/1998 |
| TW | 247388 | 5/1995 |
| WO | WO 86/01359 | 2/1986 |
| WO | WO 87/03766 | 6/1987 |
| WO | WO 88/04507 | 6/1988 |
| WO | WO 89/03085 | 4/1989 |
| WO | WO 90/07844 | 7/1990 |
| WO | WO 91/07050 A1 | 5/1991 |
| WO | WO 91/08629 | 6/1991 |
| WO | WO 92/17027 | 10/1992 |
| WO | WO 92/22983 | 12/1992 |
| WO | WO 94/13107 | 6/1994 |
| WO | WO 94/14282 | 6/1994 |
| WO | WO 94/14284 | 6/1994 |
| WO | WO 94/15284 | 7/1994 |
| WO | WO 95/01056 | 1/1995 |
| WO | WO 95/01058 | 1/1995 |
| WO | WO 95/01059 | 1/1995 |
| WO | WO 95/04431 | 2/1995 |
| WO | WO 95/10910 | 4/1995 |
| WO | WO 95/10916 | 4/1995 |
| WO | WO 95/15657 | 6/1995 |
| WO | WO 95/15658 | 6/1995 |
| WO | WO 95/19092 | 7/1995 |
| WO | WO 95/26608 | 10/1995 |
| WO | WO 95/28055 | 10/1995 |
| WO | WO 95/28799 | 10/1995 |
| WO | WO 95/32583 | 11/1995 |
| WO | WO 95/32585 | 11/1995 |
| WO | WO 95/32587 | 11/1995 |
| WO | WO 96/07270 | 3/1996 |
| WO | WO 96/09721 | 3/1996 |
| WO | WO 96/13013 | 5/1996 |
| WO | WO 96/13124 | 5/1996 |
| WO | WO 96/13932 | 5/1996 |
| WO | WO 96/17467 | 6/1996 |
| WO | WO 96/17473 | 6/1996 |
| WO | WO 96/20555 | 7/1996 |

(56) References Cited

FOREIGN PATENT DOCUMENTS

| | | |
|---|---|---|
| WO | WO 96/21990 | 7/1996 |
| WO | WO 96/26605 | 8/1996 |
| WO | WO 96/27989 | 9/1996 |
| WO | WO 96/31980 | 10/1996 |
| WO | WO 96/34486 | 10/1996 |
| WO | WO 96/34491 | 10/1996 |
| WO | WO 96/36172 | 11/1996 |
| WO | WO 96/37075 | 11/1996 |
| WO | WO 96/37983 | 11/1996 |
| WO | WO 96/37996 | 11/1996 |
| WO | WO 96/38962 | 12/1996 |
| WO | WO 96/41471 | 12/1996 |
| WO | WO 96/41478 | 12/1996 |
| WO | WO 97/12486 A1 | 4/1997 |
| WO | WO 97/13368 | 4/1997 |
| WO | WO 97/19565 | 5/1997 |
| WO | WO 97/22207 A1 | 6/1997 |
| WO | WO 97/23997 | 7/1997 |
| WO | WO 97/31480 | 8/1997 |
| WO | WO 97/33434 A1 | 9/1997 |
| WO | WO 97/34413 | 9/1997 |
| WO | WO 97/35428 | 9/1997 |
| WO | WO 97/36422 | 10/1997 |
| WO | WO 97/42763 | 11/1997 |
| WO | WO 97/45786 | 12/1997 |
| WO | WO 97/46943 | 12/1997 |
| WO | WO 97/47106 | 12/1997 |
| WO | WO 97/47124 | 12/1997 |
| WO | WO 97/47143 | 12/1997 |
| WO | WO 97/48228 | 12/1997 |
| WO | WO 97/48230 | 12/1997 |
| WO | WO 97/49237 | 12/1997 |
| WO | WO 97/49242 | 12/1997 |
| WO | WO 97/50251 | 12/1997 |
| WO | WO 98/06219 | 2/1998 |
| WO | WO 98/10589 | 3/1998 |
| WO | WO 98/10598 | 3/1998 |
| WO | WO 98/13932 | 4/1998 |
| WO | WO 98/16062 | 4/1998 |
| WO | WO 98/17063 | 4/1998 |
| WO | WO 98/17064 | 4/1998 |
| WO | WO 98/21664 | 5/1998 |
| WO | WO 98/21877 | 5/1998 |
| WO | WO 98/26584 | 6/1998 |
| WO | WO 98/37694 | 8/1998 |
| WO | WO 98/43183 | 10/1998 |
| WO | WO 98/43416 | 10/1998 |
| WO | WO 98/48566 | 10/1998 |
| WO | WO 98/56173 | 12/1998 |
| WO | WO 98/56176 | 12/1998 |
| WO | WO 98/59478 | 12/1998 |
| WO | WO 99/01984 | 1/1999 |
| WO | WO 99/03267 | 1/1999 |
| WO | WO 99/04561 | 1/1999 |
| WO | WO 99/04570 | 1/1999 |
| WO | WO 99/14947 | 3/1999 |
| WO | WO 99/30491 | 6/1999 |
| WO | WO 99/45700 | 9/1999 |
| WO | WO 99/45701 | 9/1999 |
| WO | WO 99/52279 | 10/1999 |
| WO | WO 99/57839 | 11/1999 |
| WO | WO 99/60783 | 11/1999 |
| WO | WO 99/66725 | 12/1999 |
| WO | WO 00/04706 | 1/2000 |
| WO | WO 00/04707 | 1/2000 |
| WO | WO 00/04708 | 1/2000 |
| WO | WO 00/04709 | 1/2000 |
| WO | WO 00/05889 | 2/2000 |
| WO | WO 00/07368 | 2/2000 |
| WO | WO 00/08850 | 2/2000 |
| WO | WO 00/08851 | 2/2000 |
| WO | WO 00/08852 | 2/2000 |
| WO | WO 00/16548 | 3/2000 |
| WO | WO 00/28734 | 5/2000 |
| WO | WO 00/28739 | 5/2000 |
| WO | WO 00/58833 | 10/2000 |
| WO | WO 00/58967 | 10/2000 |
| WO | WO 00/59214 | 10/2000 |
| WO | WO 00/59233 | 10/2000 |
| WO | WO 00/62298 | 10/2000 |
| WO | WO 00/62299 | 10/2000 |
| WO | WO 00/62533 | 10/2000 |
| WO | WO 00/67475 | 11/2000 |
| WO | WO 00/79798 | 12/2000 |
| WO | WO 01/22729 | 3/2001 |
| WO | WO 01/46843 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO 01/76239 | 10/2001 |
| WO | WO 01/76248 | 10/2001 |
| WO | WO 02/078317 | 10/2002 |
| WO | WO 03/098932 | 11/2003 |
| WO | WO 2004/054264 | 6/2004 |
| WO | WO 2005/027512 | 3/2005 |
| WO | WO 2005/091626 | 9/2005 |

OTHER PUBLICATIONS

U.S. Appl. No. 60/020,580, filed Jun. 26, 1996, Goldschmidt.
U.S. Appl. No. 60/024,435, filed Aug. 22, 1996, Goldschmidt.
U.S. Appl. No. 60/024,436, filed Aug. 22, 1996, Goldschmidt.
U.S. Appl. No. 60/024,452, filed Aug. 27, 1996, Goldschmidt.
U.S. Appl. No. 60/093,292, filed Jul. 17, 1998, Ellis.
U.S. Appl. No. 60/097,527, filed Aug. 21, 1998, Ellis.
U.S. Appl. No. 08/900,417, filed Jul. 25, 1997, Daniels.
"A Financial Times Survey: Viewdata (Advertisement)," Financial Times, Mar. 20, 1979.
"A Wonderworld of Services," The Sunday Times, Innovation section, p. 4, Jan. 7, 1996.
"Advanced Analog Systems—Addressable Terminals" General Instrument Corp. of Horsham, Pennsylvania (URL:http//www.gi.com/BUSAREA/ANALOG/TERMINAL/WATCH/watch.html) Printed from the Internet on Mar. 4, 1999.
"Description of Digital Audio-Visual Functionalities," Digital Audio-Visual Council, DAVIC 1.3.1 Specification Part 1, Technical Report, 86 pages, 1998.
"Dial M for Movie," Funkschau Nov. 1994, Perspektiven, Video on Demand, pp. 78-79.
"Dialing the printed page," ITT in Europe Profile, 11/Spring 1977.
"DIRECTV Digital Satellite Receiver—Operating Instructions," Sony Electronics Inc. (2001).
"DIRECTV Receiver—Owner's Manual," DIRECTV, Inc. (2002).
"DIRECTV Receiver with TiVo Digital Satellite Receiver/Recorder SAT-T60—Installation Guide," Sony Corporation (2000).
"DIRECTV Receiver with TiVo Installation Guide," Philips (2000).
"DIRECTV Receiver with TiVo Viewer's Guide" (1999, 2000).
"DishPro Satellite System—User's Guide," Dish Network (undated).
"EBU Technical Review," published by European Broadcasting Union, Geneva, Switzerland, No. 275, Spring 1998, pp. 1-54.
"Electronic Program Guide via Internet," Research Disclosure, Kenneth Mason Publications, Hampshire, GB Nr. 385 (May 1996) p. 276, ISSN:0374-4353.
"Electronic Programme Guide (EPG); Protocol for a TV Guide using electronic data transmission," by European Telecommunication Standards Institute, May 1997, Valbonne, France, publication No. ETS 300 707.
"Fall 2001 TiVo Service Update with Dual Tuner!," TiVo Inc. (2001).
"Growing US interest in the impact of viewdata," Computing Weekly, Jul. 20, 1978.
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"JiniTM Architecture Overview," by Jim Waldo, from the Internet at http://Java.sun.com/products/jini/whitepapers/architectureoverview.pdf/ printed on Jan. 25, 1999. The document bears a copyright date of 1998.

(56) References Cited

OTHER PUBLICATIONS

"LISTS> What's on Tonite TV Listings" Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] *the whole document*.

"Neue, Digitale Strategien—Bericht Von Den 5. Dermastaedter Fernsehtagen," FKT Fernseh Und Kinotechnik, vol. 49, No. 3, Mar. 1, 1995, pp. 135-139, XP000507348, Fachverlag Schiele & Schon GmbH., Berlin, DE, ISSN: 1430-9947.

"Open TV für interaktives Fernsehen," Trend & Technik, 9-95 RFE, p. 100.

"Prodigy Launches Interactive TV Listing," Apr. 22, 1994, Public Broadcasting Report.

"PTV Recorder Setup Guide," Philips (2000).

"RCA Satellite Receiver User's Guide," Thomson Multimedia Inc. (2001).

"Reaching your subscribers is a complex and costly process-until now," from the Internet at http://www.evolveproducts.com/info.html, printed on Dec. 28, 1998.

"Set-Top Box for Interactive Services," by R.A. Bissell and A. Eales, Multimedia Telecommunications, Chapman & Hall, London, England, Edited by Bill Whyte, published 1997, Chapter 6, pp. 116-138.

"Start Here," Sony, TiVo and DIRECTV (undated).

"Step Up to the Superhighway," The Sunday Times, Innovation section, p. 6, Jan. 7, 1996.

"Student.Net TV Search & Remind," from the internet at http://web.archive.org/web/19970124213237/http://www.student.net/tv/ and http://web.archive.org/web/19970124214926/www.student.net/tv/search.cgi?searchTerm=Fri . . . , printed on May 12, 2005.

"Sun's Next Steps in Digital Set-Tops," article in Cablevision, p. 56, Nov. 16, 1998.

"Teletext presents the alternative view," Financial Times, Oct. 24, 1977.

"Teletext System," National Technical Report, vol. 27, No. 4, Aug. 1981. (English language translation submitted in parent application.).

"The Evolve EZ Guide. The Remote. Control," from the Internet at http://www.evolveproducts.com/display2.html, printed on Dec. 28, 1998.

"Three men on a Viewdata bike," The Economist, Mar. 25, 1978.

"TV Guide Online Set for Fall," Entertainment Marketing Letter, Aug. 1994.

"Using StarSight 2," published before Apr. 19, 1995.

"UVSG Offers System-Specific Web Site Development for OPS," press release of United Video Satellite Group, Apr. 12, 1996.

"UVSG Teams With Microsoft on Internet Information Server," press release of United Video Satellite Group, Feb. 22, 1996.

"Viewdata and its potential impact in the USA: Final Report/Volume One, The UK Experience," Link and Butler Cox & Partners Limited, Oct. 1978.

"Viewdata moves in US but GEC may lose out," Computing Weekly, Jan. 25, 1978.

"Viewdata Service Terminal Specification," British Post Office, Issue 5, Aug. 1978.

"What is Jini?," from the Internet at http://java.sun.com/products/jini/whitepapers/whatsjini.pdf, printed on Jan. 25, 1999.

"Why Jini Now?," from the internet at http://java.sun.com/products/jini/whitepapers/whyjininow.pdf, printed on Jan. 25, 1999. The document bears a copyright date of 1998.

"Windows 98 Feature Combines TV, Terminal and the Internet," New York Times, Aug. 18, 1998.

"Yearling's Free Personalised TV Guide," from the internet at http://www.yearling.com/, Dec. 30, 1996.

ACM Multimedia 93 Proceedings, A Digital On-Demand Video Service Suporting Content-Based Queries, Little et al. pp. 427-436, Jul. 1993.

Archived Copy of Intel Intercast's Website from Archieve. Org, "How Does It Work?", <http://web.archive.org/web/19990429214537/www.intercast.com/intercast/howitwks.htm>, Acessed on Jul. 8, 2008.

Archived Copy of Intel Intercast's Website from Archieve. Org, "What Is It?", <http://web.archive.org/web/19990422195517/www.intercast.com/intercast/whatisit.htm>, Acessed on Jul. 8, 2008.

Armstrong, Larry, "Channel-Surfing's next wave: Henry Yuen's interactive TV guide takes on TCI and Viacom," BusinessWeek, Jul. 31, 1995.

Arnold, William F., "Britain to get wired city—via telephone," Electronics, Mar. 4, 1976, at 76.

Bach U et al, "Multimediales-TV-Gereat," Radio Fernsehen Electronik, De, Veb, Verlag, Technik, Berlin, vol. 45, No. 9, Aug. 1, 1996, pp. 28, 30-31, XP 000636538, ISSN: 1436-1574 (English language translation, pp. 1-5, submitted in parent application).

Bach U et alk "Multimedia-Terminal ALS Endgeraet," Funkschau, De, Franzis-Verlag K.G. Munchen, vol. 68, No. 6, Mar. 1, 1996, pp. 70-75, XP 000556486, ISSN: 0016-2841 (English language translation, pp. 1-7, submitted in parent application).

Berniker, "TV Guide going online," Broadcasting & Cable, pp. 49-52, Jun. 13, 1994.

Blahut et al., "Interactive Television," Proceedings of the IEEE, Jul. 1995.

Boyd-Merritt, Rick, "Television wires tWO way video," Electronic Engineering Times, Apr. 25, 1994.

Brugliera, Vito, Digital On-Screen Display: A New Technology for the Consumer Interface, Jun. 1993.

Buchholz et al., "Revolution auf dem Bildschirm—Die neuen Medien Videotext und Bildschirmtext," Wilhelm Goldmann Verlag, Munich, Germany, copyright 1979, pp. 24-33 and 36-39.

Compton et al., "Internet CNN Newsroom: A digital video news magazine and library," Proc. of the Intl. Conf. on Multimedia Computing and Systems, Washington, May 15-18, 1995; [Proceedings of the International Conference on Multimedia Computing and Systems], Los Alamitos, IEEE Comp. Soc. Press, U.S., May 15, 1995, pp. 296-301, XP010154611.

Office Actions and Replies from U.S. Appl. No. 12/759,303 filed Apr. 13, 2010.

Office Actions and Replies from U.S. Appl. No. 13/082,857, filed Apr. 8, 2011.

Counterstatement of the Patentee for European Patent EP 1213919B, Sep. 20, 2011.

Counterstatement of the Patentee for European Patent EP-B-1099341, Feb. 23, 2006.

Day, Rebbeca, "The Great PC/TV Debate," OEM Magazine, Jul. 1, 1996.

December, "Presenting Java," Sams.net Publishing, published Sep. 20, 1995.

Defence and Counterclaim of the First and Second Defendants, No. HC11 C 04556, between Starsight Telecast and United Video Properties (Claimants) and Virgin Media, Virgin Media Payments, and TiVo Defendants, pp. 10-11, Mar. 14, 2012.

Digital Video Broadcasting (DVB); Digital Recording Extension to Globally Executable Multimedia Home Platform (GEM), European Telecommunications Standards Institute, ETSI TS 102 817 V1.1.1 (Sep. 2007).

Digital Video Broadcasting (DVB); DVB specification for data broadcasting, European Telecommunications Standards Institute, Draft EN 301 192 V1.2.1 (Jan. 1999).

DIRECTV Plus2 System, Thompson Consumer Electronics, Inc. (1999).

DiRosa, S. "Pinochle's BIGSURF Netguide", Jul. 1995, Volute 3.1, pp. 260-270.

DiRosa, S., "BIGSURF Netguide," Jul. 1995, vol. 3.1 (Sections 18, 21, and 28—renumbered as pp. 1-27).

Eckhoff, "TV Listing Star on the Computer," Central Penn Business Journal, High Beam Research, Mar. 15, 1996.

Eitz, Gerhard, "Zukünftige Informations- Und Datenangebote Beim Digitalen Fernsehen—EPG Und "Lesezeichen"," Rundfunktechnische Mitteilungen, vol. 41, pp. 67-72, Jun. 1997 (English language translation submitted in parent application).

(56) References Cited

OTHER PUBLICATIONS

EPO Opposition Against EP1213919 by Virgin Media Limited, Dec. 16, 2010.
EPO Opposition Statement of Grounds of Appeal for EP1099341 dated Feb. 28, 2011.
EPO Opposition Submission for European Patent EP-B-1099341 dated Mar. 19, 2010.
Gondow et al., "The Architecture of Communication Migration and Media State Management for Distributed Applications on Wearable Networks," Information Processing Society of Japan 61st National Conference, Oct. 3-5, 2000 (English language translation submitted in parent application).
Hauptmann et al., "News on Demand," News-on-Demand: An Application of Informedia® Technology D-Lib Magazine, Sep. 13, 1995, XP002675162, Retrieved from the Internet: URL:http://www.dlib.org/dlib/september95/nod/page3.html [retrieved on May 2, 2012].
Hirtz, Gentlemen et al:, "Open TV: Betriebssystem Fuer Interaktives Fernsehen," Fernseh Und Kinotechnik, de vde Verlag Gmbh, Berlin, vol. 50, No. 3, Mar. 1, 1996, pp. 84-89, XP 000581417, ISSN: 0015-0142 (English language translation, pp. 1-9, submitted in parent application).
Hobbes Internet Timeline, Mar. 22, 2007.
Hofmann, Neumann, Oberlies, and Schadwinkel, "Videotext Programmiert Videorecorder," Rundfunktechnische Mitteilungen, Nov.-Dec. 1982, pp. 254-257. (English language translation submitted in parent application.).
Holland, Gary L., "NAPLPS standard defines graphics and text communications," EDN, Jan. 10, 1985, at 179.
Iizuka, Motohashi, Kuwana. "The Overview of Internet TV Guide Japan," Proceedings of the 53rd Annual Convention, Sep. 6, 1996, p. 3-227-3-230.
Instruction Manual *Using StarSight 2*, StarSight Telecast, Inc., 1994.
International Preliminary Examination Report, International Application No. PCT/US97/18664, Dec. 7, 1998, 10 pages.
Kai et al., Development of a Simulation System for Integrated Services Television, Report from Information Processing Society of Japan, Japan, Sep. 13, 1996, vol. 96, No. 90 p. 13-20.
Karunanithi, et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Keith Lynch's timeline of net related terms and concepts, Mar. 22, 2007.
Khoo et al., "An Expert System Approach to Online Catalog Subject Searching," Information Processing & Management: An International Journal, vol. 30, No. 2, 1994, pp. 223-238.
Large, Peter, "Throw away the books—Viewdata's coming," Guardian, Jan. 10, 1978.
Large, Peter, "Viewdata, the invention that brings boundless advice and information to the home, also sets a test for the Post Office," Financial Guardian, Jun. 29, 1978.
Leftwich, Jim & Schein, Steve, *StarSight Interactive Television Program Guide, Phase III*, Functional/Interactional Architecture Specification Document, Orbit Interaction, Palo Alto, California, undated.
Leftwich, Jim, Lai, Willy & Schein, Steve, *StarSight Interactive Television Program Guide, Phase IV*, Functional/Interactional Architecture Specification Document, Orbit Interaction, Palo Alto, California, published before Apr. 19, 1995.
Lloyd, John, "Impact of technology," Financial Times, Jul. 1978.
Melton, "The Uniden Super 4800," OnSat magazine, Jun. 10-16, 1990, pp. 2-4.
Miller, Matthew D., "A Scenario for the Deployment of Interactive Multimedia Cable Television Systems in the United States in the 1990s," IEEE, 1994.
Money, Steve A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at 57.
Motorola, Inc.; Integrated Datacasting Solutions for Digital Television XP-002204351; Jun. 1999.
Neumann, Andreas, "WDR Online Aufbau Und Perspektiven Automatisierter Online-Dienste Im WDR," Rundfunktechnische Mitteilungen, vol. 41, pp. 56-66, Jun. 1997.
Ochiai et al., "@randomTV: A New TV System," NEC C&C Media Research Laboratories, Mach 17, 1998, pp. 3-302-3-303.
Opposition against EP99935637 by Fast TV Server AG, Aug. 3, 2005.
Opposition against EP99935637 by Velocity 303 Limited, Aug. 3, 2005.
Owen, Kenneth, "How dial-a-fact is coming closer to home," The Times, Sep. 30, 1977.
Owen, Kenneth, "Why the Post Office is so excited by its plans for a TV screen information service," The Times, Sep. 26, 1976.
PCT Notification of Transmittal of International Search Report, International Application No. PCT/US00/05887 (WO 00/52930), Aug. 2000, 2 pages.
Personal Entertainment Guide—User's Guide, Version 1.0, Copyright 1991 by Lookahead Communications Inc.
Piesing, J., "Introduction to the MHP PVR/PDR/DVR Specification," Chair "Technical Aspects of the MHP" Philips Applied Technologies, Redhill, UK, Copyright Digital Video Broadcasting Project DVB, undated.
Poole, James, "Demand for Viewdata grows," Sunday Times, Feb. 10, 1977.
Printout from Google News Archives, Mar. 22, 2007.
Qayyum, Hamid, "Using IVDS and VBI for Interactive Television," IEEE, Jun. 10, 1996.
Rajapakshe et al., "Video on demand," (last modified Jun. 1995) <http://www-dse.doc.ic.ac.uk/~nd/suprise_95 /Journal/vol4/shr/report.html>.
Rath et al., "Set-Top Box Control Software: A Key Component in Digital Video," Philips Journal of Research, vol. 50, No. 1/2, 1996, at 185.
Research Disclosure, No. 329, Sep. 1991, Havant GB, p. 657, XP226205, 32926, "Installation of Consumer Apparatus."
Rewind, replay and unwind with new high-tech TV devices, by Lawrence J. Magid, LA Times. This document was printed from the Internet on Jun. 6, 1999 and bears a date of May 19, 1999.
Rogers, C., "Telcos vs. Cable TV: The Global View," Sep. 1995, Report/Alternative Carriers, Data Communications, No. 13, New York, pp. 75, 76, 78, 80.
Rosch, Gary D., "New data and information system set for commercial market trial," Telephony, Mar. 20, 1978, at 96.
Ruffler et al., "InfoRadio on Demand, WebTV and digiTaz—Telecommerce Case Studies," May 23, 1996.
Ryan, K., "Free Interactive TV Guide," Google Newsgroup, Alleged Date Sep. 29, 1995.
Ryan, Margaret, "Interactive TV Takes a Corporte Twist," Electronic Engineering Times, Jul. 10, 1995.
Saito, Takeshi, et al., "Homenetwork Architecture Considering Digital Home Appliance," Technical Committee meeting of the Institute of Electronics, Information and Communication Engineers (IEICE), Japan, Nov. 6, 1997, vol. 97, No. 368, pp. 57-64. (English language translation submitted in parent application.).
Schauer, Tom: Internet Article, [Online] Sep. 28, 1995, XP002378870, Retrieved from the Internet: URL: www.vision2020.moscow.com/Archives/1995/9509/0058.htlm> [retrieved on Apr. 28, 2006] *the whole document*.
Schepp, Brad et al., "The Complete Guide to CompuServe," Chapter 7, "IQuest and General Information Gathering," pp. 211-258, (McGraw-Hill Osborne Media, Har/Dis edition 1990).
Schmuckler, Eric, "A marriage that's made in cyberspace (television networks pursue links with online information services)," May 16, 1994, Mediaweek, vol. 4, No. 20, p. 22 (3).
Selected pages from the "BBC Online—Schedules" web page. This web page is located at http://www.bbc.co.uk/schedules/ (as printed from the Internet on Oct. 19, 1999 and being dated as early as May 24, 1997).

(56) References Cited

OTHER PUBLICATIONS

Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the PRESTEL show," New Scientist, Jun. 1, 1978, at 586.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ."
Stickland, D.C., "It's a common noun," The Economist, Jun. 5, 1978.
Stokes, Adrian, "The viewdata age: Power to the People," Computing Weekly, Jan. 1979.
Submission by Velocity in European Patent No. 1099341, Mar. 19, 2010.
SuperGuide/Uniden 4800, "A Quick Guide to Programming the Uniden 4800—Dealer Set-Up Manual," undated, 8 pages.
SuperGuide/Uniden 4800, "A User's Guide to SuperGuide's ™ Features," undated, 12 pages.
Supplementary European Search Report, Feb. 25, 2000, Application No. EP 97 91 0985.
The clickTV television program guide website of TVData of Queensbury, New York. This website is located at www.clicktv.com (as printed from the Internet on Sep. 1, 1998).
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
TV Guide movie database Internet web pages printed on Aug. 12, 1999 (9 pages).
Uniden®, UST-4800 Super, Integrated Receiver/Descrambler, Preliminary Reference Manual, Nov. 12, 1991, 80 pages.
Uniden®, UST-4800, Integrated Receiver/Descrambler, Installation Guide, copyright 1990, 60 pages.
Uniden®, UST-4800, Integrated Receiver/Descrambler, Operating Guide, copyright 1990, 24 pages.
User's Guide RCA Color TV with TV Plus + Guide, 1997.
Venditto, Gus, "Prodigy for Dummies," 1995, IDG Books, pp. 57-63 and p. 213.
Verknuepfung von TV mit Internet, Funkschau, De, Franzis—Verlag K.G. Munchen, vol. 68, No. 18, Aug. 16, 1996, pp. 70-71, XP 000631189, ISSN: 0016-2841 (English language translation, pp. 1-3, submitted in parent application).
VideoGuide, Videoguide User's Manual, pp. 1-27, undated.
Web TV and Its Consumer Electronics Licenses debut First Internet Television Network and Set Top Box XP 002113265 Retrieved from the Internet: <URL http://www.webtv.net/company/news/archive/License.html> 'retrieved on Aug. 25, 1999.
Whale, "Identification of Program Similarity in Large Populations," The Computer Journal, vol. 33, No. 2, 1990, pp. 140-146.
Whitehorn, Katharine, "Viewdata and you," Observer, Jul. 30, 1978.
Wikipedia article on CompuServe, Mar. 22, 2007.
Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
Wittig, H. et al.: "Intelligent Media Agents in Interactive Television Systems" Proceedings of the International Conference on Multimedia Computing and Systems, Los Alamitos, CA, US, May 15, 1995-May 18, 1995, pp. 182-189, XP00603484 p. 183, left hand col., paragraph 2, p. 184, right-hand col., paragraph 2 figure 4.
Yoshida, Junko, "Interactive TV a Blur," Electronic Engineering Times, Jan. 30, 1995.
Office Actions and Replies filed in U.S. Appl. No. 08/031,246, filed Mar. 12, 1993.
Office Actions and Replies from U.S. Appl. No. 10/877,950, filed Jun. 25, 2004.
Office Actions and Replies from U.S. Appl. No. 12/759,303, filed Apr. 13, 2010.
Office Actions and/or Replies filed in U.S. Appl. No. 12/773,423, filed May 4, 2010.
Office Actions and Replies filed in U.S. Appl. No. 11/147,802, filed Jun. 7, 2005.
Office Actions and/or Replies filed in U.S. Appl. No. 10/927,582, filed Aug. 26, 2004.
Office Actions and/or Replies filed in U.S. Appl. No. 11/894,741, filed Aug. 20, 2007.
Office Actions and Replies filed in U.S. Appl. No. 11/179,410, filed Jul. 11, 2005.
Office Actions and Replies filed in U.S. Appl. No. 12/780,196, filed May 14, 2010.
Office Actions and Replies filed in U.S. Appl. No. 09/332,244, filed Jun. 11, 1999.
Office Actions and Replies filed in U.S. Appl. No. 12/814,030, filed Jun. 11, 2010.
Office Actions and Replies filed in U.S. Appl. No. 11/246,392, filed Oct. 7, 2005.
Office Actions and Replies filed in U.S. Appl. No. 10/927,814, filed Aug. 26, 2004.
Office Actions and/or Replies filed in U.S. Appl. No. 13/233,655, filed Sep. 15, 2011.
Office Actions and/or Replies filed in U.S. Appl. No. 13/275,565, filed Oct. 18, 2011.
Office Actions and/or Replies filed in U.S. Appl. No. 13/952,381, filed Jul. 26, 2013.
Derwent Abstracts, RD 385002 A, "Electronic Program Guide System via Internet Uses Television Programs Displayed on Internet Pages and Associates it With Program Label and On-Screen Icons to Remotely Program and Control TV Receiver w.r.t. Selected Program," published May 10, 1996.
Tedesco, R., "WebTV Clicks on 'TV Guide'," Broadcasting & Cable, vol. 127, No. 3, Jan. 20, 1997, p. 56.
"The History Behind Broadcatch—SmarTV (1989)," Boradcatch Technologies, from the internet at http://www.broadcatch.com/smartv.html, Jul. 1989, pp. 1-6, printed from the internet on Aug. 31, 2005.

\* cited by examiner

PROGRAMMING 9:30-10:30 PM

<u>170</u>

MOVIES

| | | |
|---|---|---|
| THE BIG RED ONE | CHANNEL 2 (CBS) | 8:30 - 10:30 |
| THE BLUES BROTHERS | CHANNEL 48 (VH-1) | 10:00 - 11:30 — 175 |
| GHOST     171 | CHANNEL 47 (HBO) | 9:30 - 10:00 |
| TERMINATOR | CHANNEL 7 (PPV) | 8:00 - 10:00 |
| TITANIC | CHANNEL 47 (HBO) | 10:00 - 1:30 |
| WHEN HARRY MET SALLY | CHANNEL 4 (NBC) | 9:00 - 11:00 |

SPORTING EVENTS

| | | |
|---|---|---|
| NEW YORK GIANTS | CHANNEL 8 (WXBR) | 8:00 - 10:00 |
| YANKEE BASEBALL | CHANNEL 11 (WLIW) | 8:00 - 11:00 |

NEWS

| | | |
|---|---|---|
| LOCAL NEWS | CHANNEL 17 (WLIR) | 9:30 - 10:00 |
| NEWS EXTRA | CHANNEL 5 (FOX) | 10:00 - 10:30 |

ADULT

| | | | |
|---|---|---|---|
| 310 —🔒 | PAY-PER-VIEW #1 | CHANNEL 49 (ADU) | 10:00 - 10:30 |
| 310 —🔒 | PAY-PER-VIEW #2 | CHANNEL 49 (ADU) | 10:30 - 11:00 |

*FIG. 8*

| | | |
|---|---|---|
| FAVORITE PROGRAMMING 9:30-10:30 PM | | |
| GHOST | CHANNEL 47 (HBO) | 9:30 - 10:00 |
| TERMINATOR | CHANNEL 7 (PPV) | 8:00 - 10:00 |
| THE BIG RED ONE | CHANNEL 2 (CBS) | 8:30 - 10:30 |
| THE BLUES BROTHERS | CHANNEL 48 (VH-1) | 10:00 - 11:30 |
| TITANIC | CHANNEL 47 (HBO) | 10:00 - 1:30 |
| WHEN HARRY MET SALLY | CHANNEL 4 (NBC) | 9:00 - 11:00 |

FIG. 10

STATUS

| | 201 | |
|---|---|---|
| GUIDE | | IN USE |
| CURRENT CHANNEL | | 5 (FOX) |
| CURRENT VOLUME | | 8 |
| RATING | | PG |
| REMOTE ACCESS LINK | | HIGH SPEED |
| AVAILABLE DEVICES | | VIDEOCASSETE RECORDER<br>DIGITAL STORAGE (DVD)<br>SET-TOP BOX WITH CABLE MODEM |

INTERACTIVE TELEVISION PROGRAM GUIDE WITH REMOTE ACCESS

CROSS-REFERENCE TO RELATED APPLICATION(S)

This application is a continuation of U.S. patent application Ser. No. 13/275,565, filed Oct. 18, 2011, which is a continuation of U.S. patent application Ser. No. 10/927,814, filed Aug. 26, 2004 (now U.S. Pat. No. 8,046,801), which is a continuation of U.S. patent application Ser. No. 09/354,344, filed on Jul. 16, 1999 now abandoned, which claims the benefit of the filing date of U.S. Provisional application No. 60/093,292, filed Jul. 17, 1998 (now expired) and U.S. Provisional application No. 60/097,527, filed Aug. 21, 1998 (now expired), all of which are hereby incorporated by reference herein in their entireties.

BACKGROUND OF THE INVENTION

This invention relates to interactive television program guide video systems, and more particularly, to interactive television program guide systems that provide remote access to program guide functionality.

Cable, satellite, and broadcast television systems provide viewers with a large number of television channels. Users have traditionally consulted printed television program schedules to determine the programs being broadcast at a particular time. More recently, interactive electronic television program guides have been developed that allow television program information to be displayed on a user's television.

Interactive television program guides allow the user to navigate through television program listings using a remote control. In a typical program guide, various groups of television program listings are displayed in predefined or user-defined categories. Listings are typically displayed in a grid or table.

Interactive television program guides are typically implemented on set-top boxes located in the homes of users. A typical set-top box is connected to the user's television and videocassette recorder. The program guide system is therefore not portable. As a result, the user cannot use the program guide to adjust program reminder settings, to select programs for recording, to purchase pay-per-view programs, or to perform other program guide functions without that user being physically located in the same room in the home.

On-line program guides allow users to view program listings using a web-browser. However, the on-line program guides that are available on the Internet do not provide the versatility of in-home program guides. For example, on-line program guides do not allow the user to set in-home reminders for programming, to adjust parental control settings, or to select programs for recording on the user's videocassette recorder.

On-line program guides have also been implemented that allow users to order pay-per-view programs. Such systems allow users to order programs via a web server as opposed to via the telephone or using impulse ordering. A third party takes orders via the internet, bills the user, and provides ordering information to the headend. The headend authorizes the user's set-top to view the ordered program using conventional signal denial or signal scrambling systems without coordinating the ordering of the pay-per-view program with an in-home guide. Ordering pay-per-view programs in this manner (i.e., without coordinating the order with an in-home guide), does not provide users with many of the benefits of ordering pay-per-views through an in-home guide, such as upcoming program reminders or missed program reminders. Users are also not prevented from attempting to order a pay-per-view program with a guide after the program has been ordered.

Program guides that run on personal computers are also available. Such programs guides are useful for users who wish to view program listings information, but who cannot readily access their set-top-box-based program guide. For example, another member of the user's household may be watching television and therefore dominating the use of the set-top box and television. Because there is no way for the user of such a personal computer program guide to coordinate the operation of the personal computer program guide with the operation of the set-top box program guide, the user of a personal computer program guide is not able to use the personal computer program guide to set in-home reminders for programming, to adjust parental control settings, to select programs for recording on the user's videocassette recorder, or to purchase pay-per-view programs.

Presently existing program guide systems therefore require that the user be physically present in the home to access important program guide features such as program reminders, parental control, and program recording.

It is therefore an object of the present invention to provide an interactive television program guide system in which the program guide may be remotely accessed by the user. Such a system may allow the user to access important features of the user's in-home program guide from a remote location and set program guide settings for those features.

This invention relates to interactive television program guides, and more particularly, to techniques for providing interactive television program guide functionality on multiple devices within a household.

Families often have multiple televisions and set-top boxes placed throughout the household. A family's household even may include multiple homes. Because there is no coordination between the program guides running on each of the various set-top boxes in the household, if a user adjusts the settings for a program guide on one set-top box, these settings are not communicated to the program guides on any of the other set-top boxes in the household. If a parent wants to restrict access to certain channels on all the televisions in the household, the parent must adjust the parental control settings on each set-top box individually. Reminders and favorite channel settings must similarly be set for each program guide separately if a user desires to have such settings be in effect throughout the household. Messages sent from the cable operator can only be sent to a particular set-top box. Some cable system subscriber management systems can allow a cable operator to manage all cable boxes within a home (i.e. manage billing for individual locations within a home). However, such systems do not allow user interaction with the cable operator.

It is therefore an object of the present invention to provide a program guide system that allows a user to adjust to the user settings of a plurality of program guides at different locations within a household from a single location.

SUMMARY OF THE INVENTION

This and other objects of the present invention are accomplished in accordance with the principles of the present invention by providing an interactive television program guide system with remote access. A local interactive television program guide is implemented on interactive television program guide equipment. The interactive television program guide equipment is connected to one or more remote program guide access devices over a remote access link. A remote access interactive television program guide is implemented on the remote program guide access device. The remote program guide and remote program guide access devices provide users with the opportunity to remotely access features of the interactive television program guide on the interactive television program guide equipment and to remotely set program guide settings.

Any suitable interactive television program guide function or setting may be accessed. The remote access program guide may, for example, provide the user with an opportunity to remotely schedule a reminder for a program, remotely view television program listings, remotely select programming for recordings (storage), remotely play a stored program or a currently broadcasted program on the remote program guide access device, remotely set and navigate through favorites (e.g., favorite channels, program categories, services, etc.), and remotely set parental control settings.

The remote program guide access device may also provide the user with an opportunity to remotely perform additional functions such as sending and playing or displaying messages with the interactive television program guide, polling the interactive program guide for status information, and storing interactive television program guide data at the remote program guide access device.

Providing remote access to these and other features may allow users to control television related activity in ways and in situations in which the users could not do so before. A person who is caught in traffic in an automobile may, for example, access the program guide using appropriate voice commands to access listings for programs that the user anticipates he or she will not arrive home in time to view. The listings may be displayed on a screen, or recited back to the user in synthesized voice listings. The user may select any such programs for recording on their videocassette recorder or other storage device in the home, or on a server at a television distribution facility or other distribution facility. Systems in which users store programs on a remote server are described, for example, in Ellis et al. U.S. patent application Ser. No. 09/332,244, filed Jun. 11, 1999, which is hereby incorporated by reference herein in its entirety.

A parent may, for example, access the program guide while at work to see if a child is watching television. If the child should not be watching television, the parent may cause the program guide to display a message to the child (e.g., "Go do your homework!") and then may prevent viewing via a parental control feature. On the other hand, if television viewing is prevented by default (e.g., prevented until the parent arrives home), then the parent may remotely access the program guide to allow a child to watch television.

A person at work may, for example, receive a call from a spouse or other family member at home who explains to the person at work that the person at home cannot operate home television equipment as desired (e.g., "I can't program the VCR!"). The person at work may remotely access the program guide, poll for equipment status information, and perform the desired function.

If desired, non-program-guide applications may be implemented on the user television equipment. Such non-program-guide applications may include, for example, a web browser application, a home shopping application, a game application, an e-mail application, a chat application, a banking application, etc. These applications may be implemented on a set-top box within the user television equipment. The user may adjust the settings of such a non-program-guide application using a remote access device.

Further features of the invention, its nature and various advantages will be more apparent from the accompanying drawings and the following detailed description of the preferred embodiments.

These and other objects of the present invention are accomplished in accordance with the principles of the present invention by providing an interactive television program guide system for a household in which multiple interactive television program guides within the household are coordinated. In a typical system, various users in the household use various pieces of user television equipment (also called user television equipment devices). An interactive television program guide is implemented on each piece of user television equipment. Typical user television equipment may be a set-top box on which a program guide application and non-program-guide applications run, a videocassette recorder connected to the set-top box for recording television programs, and a television on which the program guide application may display various program guide display screens and the non-program-guide applications may display various non-program-guide display screens. Other suitable types of user television equipment may be based on personal computer televisions (PC/TVs) or advanced television receivers such as high-definition television (HDTV) receivers.

Each piece of user television equipment may be located in a different part of the home. For example, one piece of equipment may be located in the parents' bedroom. Another piece of equipment may be located in a child's bedroom. Additional pieces of equipment may be located in a family room, kitchen, living room, etc.

Typical program guide features that may be provided by the program guides of this invention implemented on the user television equipment include features related to setting program reminders, profiles, program recording features, messaging features, favorites features, parental control features, program guide set up features (e.g., video display settings, language settings, etc.), and other suitable program guide features. The system coordinates operation of the program guides so that, for example, a user may adjust his favorite channel settings on a program guide operating in the living room and those settings will be effective on the program guide operating in the master bedroom and may therefore be used by that program guide.

A parent may adjust parental control settings using the program guide in the parents' room and the system may apply those settings to all program guides in the household. Parents may use the parental control feature to control the viewing of their children even though the children may be viewing television using multiple user television equipment devices. For example, parents may establish parental controls to lock various programs and services from a master location and the system will apply these parental controls to the various pieces of user television equipment throughout the household. The ability to establish favorite channels, to set reminders, and to control other program guide settings at one location and to have those settings applied to multiple locations throughout the household may be used by both the parents and their children.

A user may adjust his favorite settings on a program guide in the family room and may direct the system to apply those settings to the program guides in the family room and the living room. A child may set reminders for certain programs using the program guide in the family room and may direct the system to apply those settings only to the program guide running in that child's bedroom. A user may select a program for recording using a program guide in the living room and may request that the videocassette recorder in the family room be used to record the selected program. A user may receive messages from a cable system operator and may direct the system to make certain types of those messages available to the program guide located in all rooms but the children's room. A user may adjust language or audio settings using one program guide and have those settings apply globally.

As these examples serve to illustrate, the settings for any suitable program guide features may be adjusted using the program guide at one location in a household and applied by the system to selected other program guides in the household.

The program guides may be linked using any suitable topologies and communication protocols. For example, the various pieces of user television equipment may be interconnected using a tree, bus or ring topology. One piece of user television equipment may be designated as a primary device and other pieces of user television equipment may be designated as secondary devices. The primary and secondary devices may be connected in a star arrangement. A remote server may be used to implement certain program guide features and the pieces of user television equipment in the home may act as clients.

If desired, non-program-guide applications may be implemented on the user television equipment. Such non-program-guide applications may include, for example, a web browser application, a home shopping application, a game application, an e-mail application, a chat application, a banking application, etc. These applications may be implemented on a set-top box within the user television equipment. The user may adjust the settings of such a non-program-guide application at one set-top box. The system coordinates the operation of the various set-top boxes so that the adjusted settings may be used by similar applications running on other set-top boxes in the household.

BRIEF DESCRIPTION OF THE DRAWINGS

FIGS. 7 and 8 are illustrative remote program guide access device display screens in accordance with the principles of the present invention.

FIG. 10 is an illustrative favorites screen for display by a remote program guide access device in accordance with the principles of the present invention.

FIG. 11 is an illustrative status display screen for display by a remote program guide access device in accordance with the principles of the present invention.

DETAILED DESCRIPTION OF THE INVENTION

Figure 1:
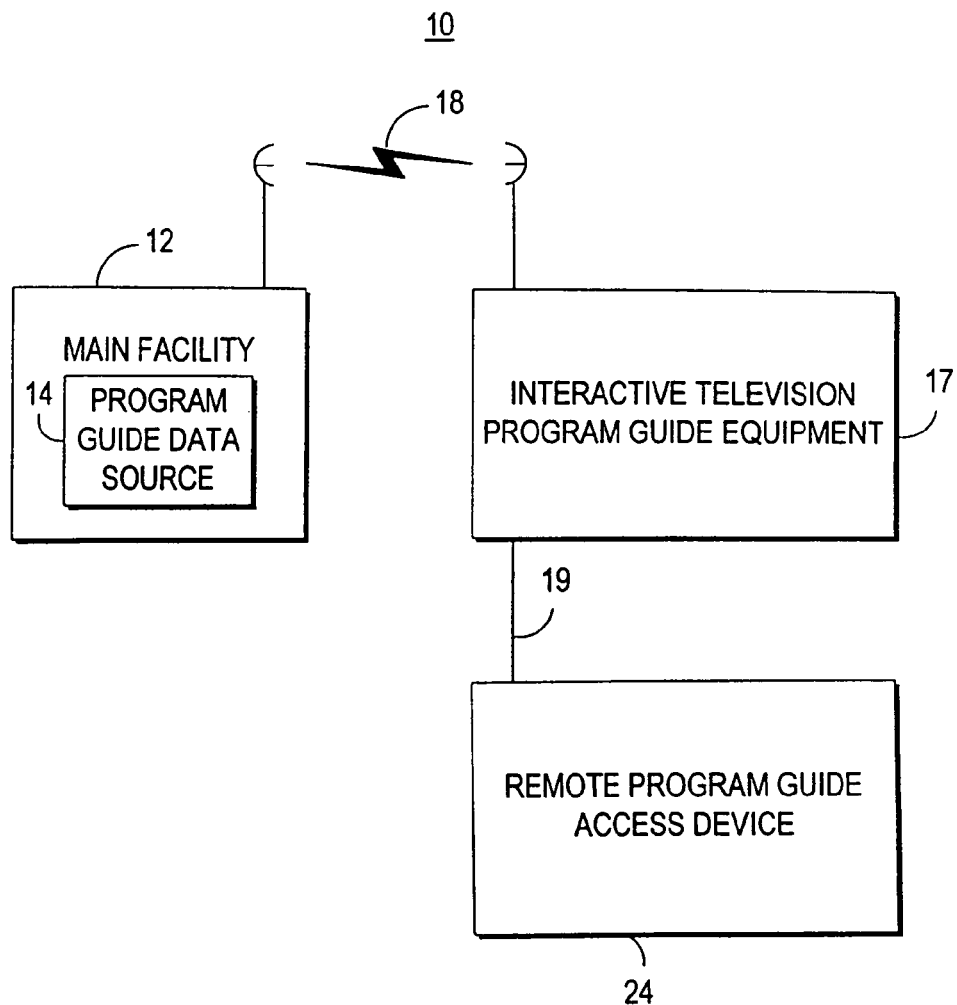
FIG. 1 is a schematic block diagram of an illustrative system in accordance with the present invention.

An illustrative system 10 in accordance with the present invention is shown in FIG. 1. Main facility 12 provides interactive television program guide data from program guide data source 14 to interactive television program guide equipment 17 via communications link 18. There are preferably numerous pieces or installations of interactive television program guide equipment 17, although only one is shown in FIG. 1 to avoid over-complicating the drawing. Link 18 may be a satellite link, a telephone network link, a cable or fiber optic link, a microwave link, a combination of such links, an Internet link, or any other suitable communications path.

The interactive television program guide data transmitted by main facility 12 to interactive television program guide equipment 17 may include television program listings data (e.g., program times, channels, titles, and descriptions) and other program guide data for additional services other than television program listings (e.g., pay-per-view information, weather information, associated Internet web links, computer software, etc.). Interactive television program guide equipment 17 may be connected to remote program guide access device 24 via remote access link 19. Interactive television program guide equipment may have more than one associated remote program guide access device 24, although only one such device 24 is shown in FIG. 1 to avoid overcomplicating the drawing.

An interactive television program guide is implemented on interactive television program guide equipment 17. Four illustrative arrangements for interactive television program guide equipment 17 is shown in FIGS. 2a-2d. As shown in FIGS. 2a-2d interactive television program guide equipment 17 may include program guide distribution equipment 21 located at television distribution facility 16 and user television equipment 22. Television distribution facility 16 may be any suitable distribution facility (e.g., a cable system headend, a broadcast distribution facility, a satellite television distribution facility, or any other suitable type of television distribution facility). Television distribution facility 16 may distribute program guide data that it received from main facility 12 to multiple users via communications path 20.

Program guide distribution equipment 21 may be any equipment suitable for providing program guide data to user television equipment 22. Program guide distribution equipment 21 may include, for example, suitable transmission hardware for distributing program guide data on a television channel sideband, in the vertical blanking interval of a television channel, using an in-band digital channel, using an out-of-band digital signal, or by any other suitable data transmission technique. Video signals (e.g., television programming) may also be provided by program guide distribution equipment 21 to user television equipment 22 over communications paths 20 on multiple television channels.

Figure 2A:
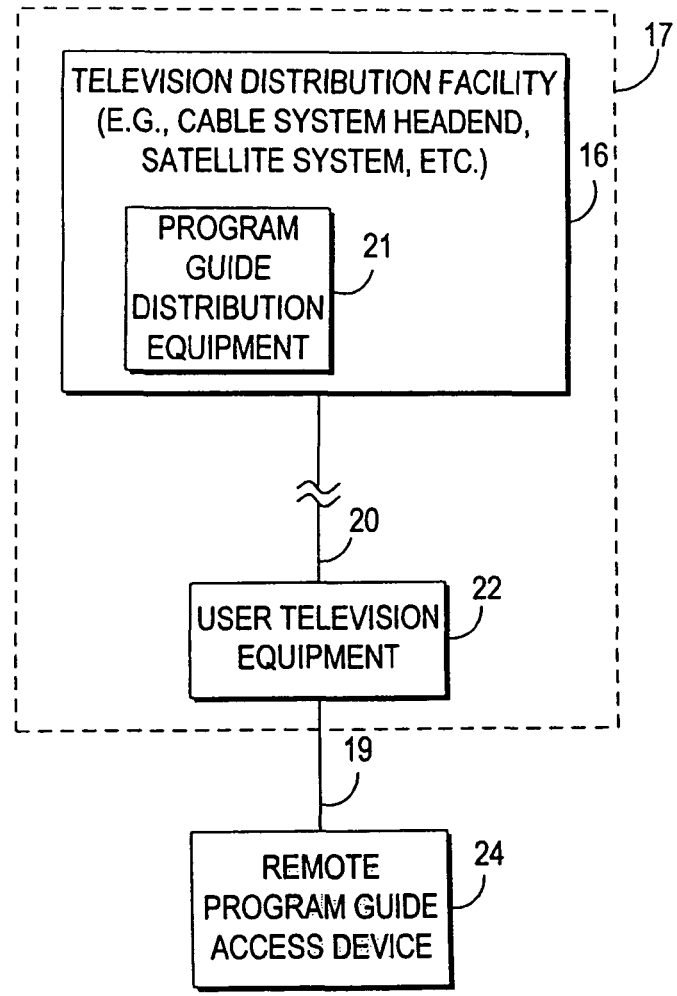
FIGS. 2a-2d show illustrative arrangements for the interactive television program guide equipment and remote program guide access device of FIG. 1 in accordance with the principles of the present invention.
Figure 2B:
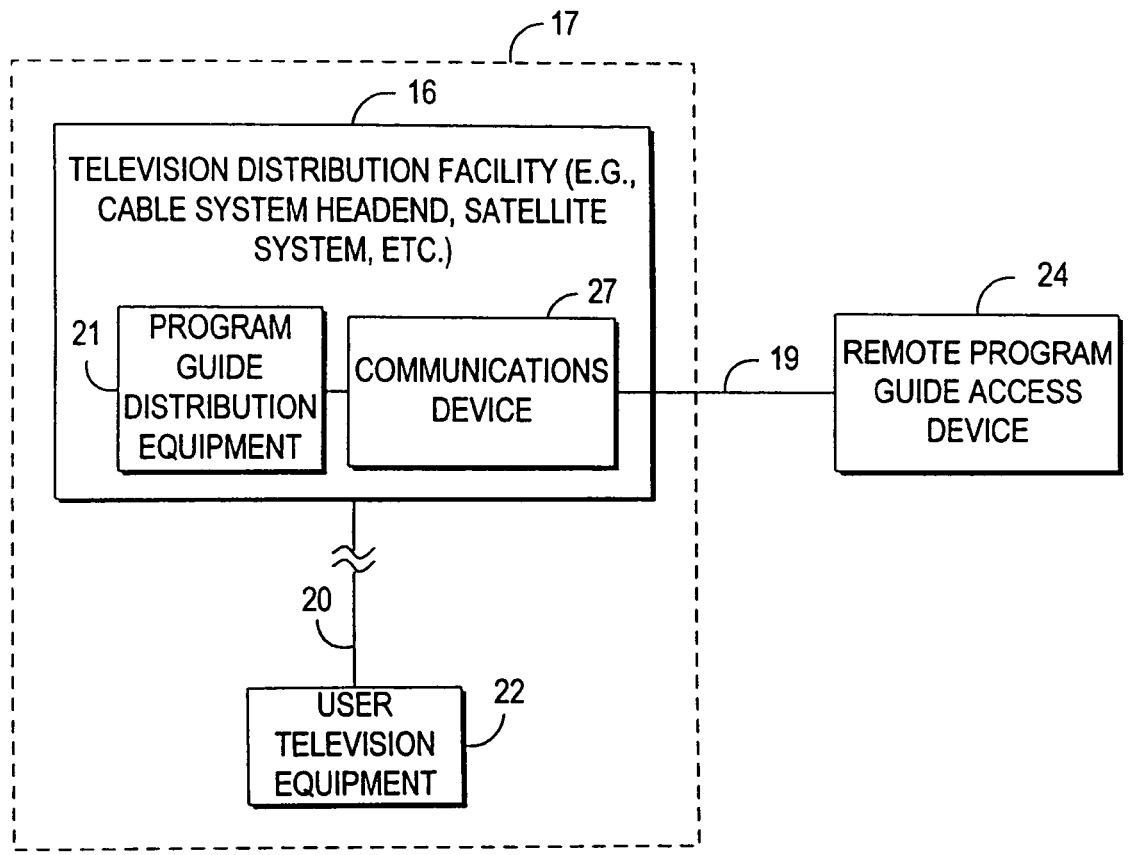

FIGS. 2a and 2b show illustrative arrangements for interactive television program guide equipment 17 and remote program guide access device 24 in systems in which program guide data is provided to user television equipment 22 using a non client-server based approach. For example, program guide data may be provided by television distribution facility 16 to user television equipment 22 in a continuous stream or may be transmitted at a suitable time interval (e.g., once per hour). If transmitted continuously, it may not be necessary to store data locally at user television equipment 22. Rather, user television equipment 22 may extract data "on the fly" as it is needed. If desired, television distribution facility 16 may poll user television equipment 22 periodically for certain information (e.g., pay program account information or information regarding programs that have been purchased and viewed using locally-generated authorization techniques).

In the system configuration of FIG. 2a, remote program guide access device 24 is connected to user television equipment 22. Television distribution facility 16 may distribute program guide data to user television equipment 22. User television equipment 22 may transfer the program guide data to remote program guide access device 24. User television equipment 22 may also transfer additional data that may be necessary for allowing remote program guide access device 24 to access various functions of the interactive program guide (e.g., reminder information, parental control settings, favorite channel settings, user profiles, etc.). Any suitable distribution scheme may be used. For example, user television equipment 22 may provide the data to remote program guide access device 24 continuously, periodically, using a client-server based approach, using a polling scheme, or using any other suitable approach. Remote program guide access device 24 may store the data if suitable for a particular transmission scheme.

In the system configuration of FIG. 2b, remote program guide access device 24 is connected to television distribution facility 16 via communications device 27. In this approach television distribution facility 16 may distribute program guide data to remote program guide access device 24 directly. Television distribution facility 16 may also distribute additional data from user television equipment 22 that may be necessary for allowing remote program guide access device 24 to access various functions of the interactive program guide (e.g., reminder information, parental control settings, favorite channel settings, user profiles, etc.). Television distribution facility 16 may provide the data to remote program guide access device 24 continuously, periodically, using a client-server based approach, using a polling scheme, or using any other suitable approach. Remote program guide access device may store the data if suitable for a particular transmission scheme.

Figure 2C:
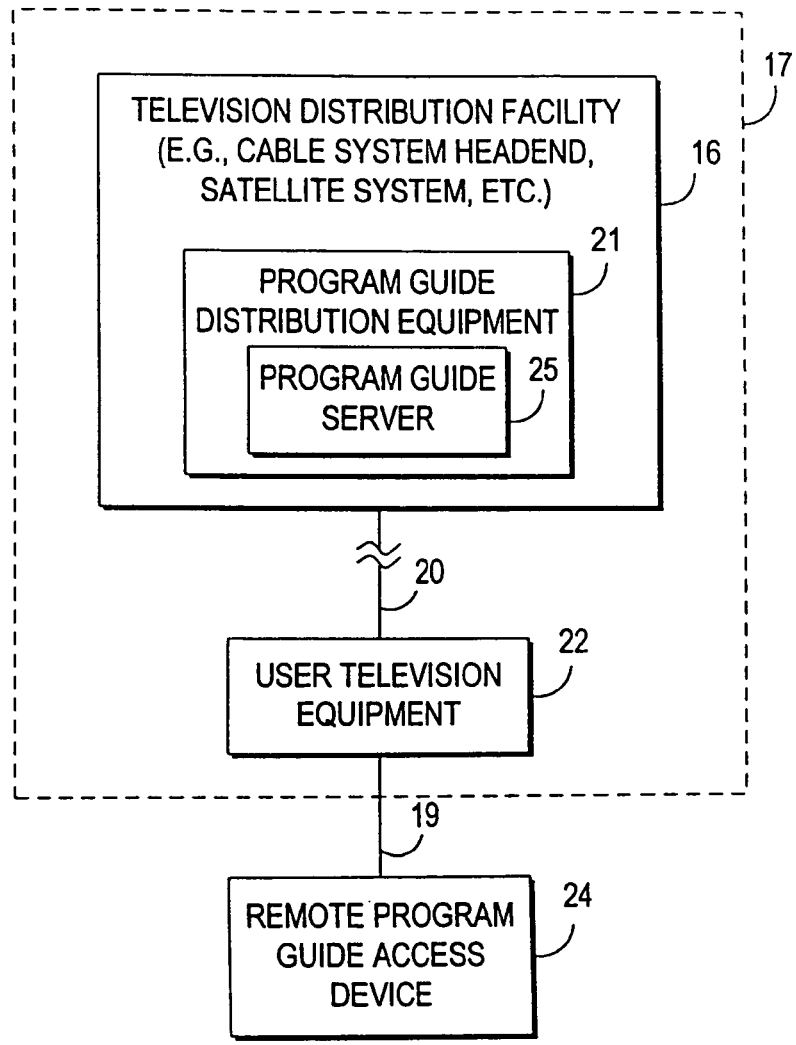
Figure 2D:
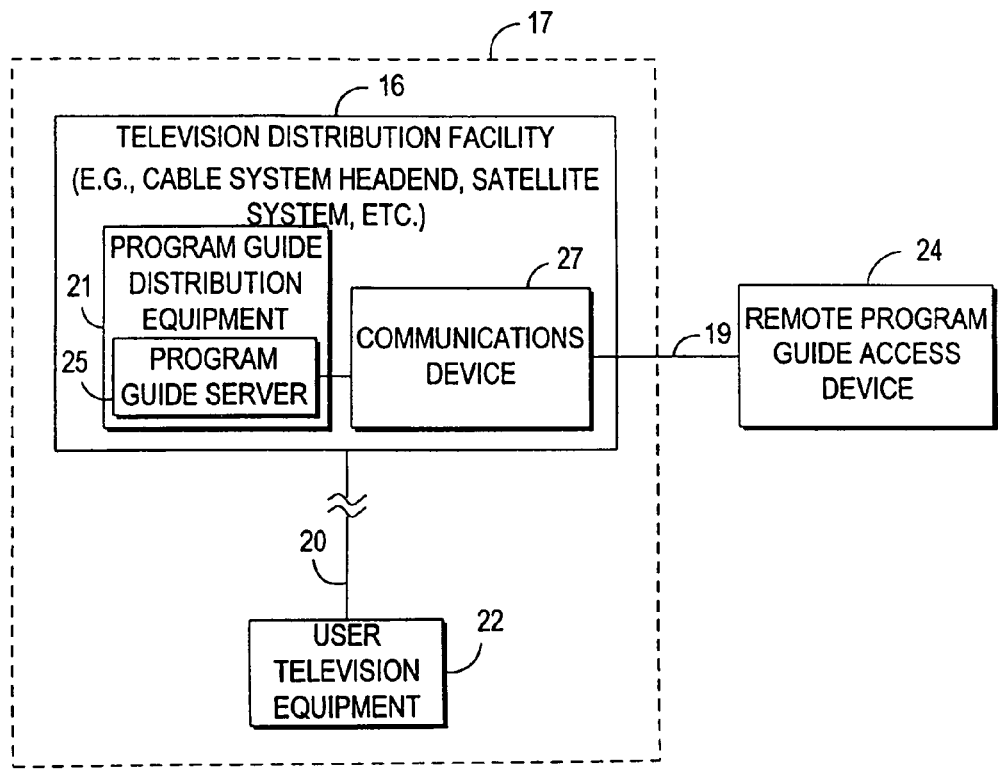

FIGS. 2c and 2d show illustrative arrangements for interactive television program guide equipment 17 and remote program guide access device 24 in client-server based interactive program guide systems. As shown in FIGS. 2c and 2d, program guide distribution equipment 21 may include program guide server 25. Program guide server 25 may be any suitable software, hardware, or combination thereof for providing a client-server based program guide. Program guide server 25 may, for example, generate program guide display screens as digital frames and distribute the frames to user television equipment 22 for display by an interactive program guide client implemented on user television equipment 22. In another suitable approach, program guide server 25 may run a suitable database engine, such a SQL server, and provide program guide data in response to queries generated by user television equipment 22. If desired, program guide server 25 may be located at main facility 12 or at some other facility suitable for providing program guide data via a program guide server (not shown).

Remote program guide access device 24 may, for example, communicate with user television equipment 22 over remote access link 19 as shown in FIG. 2c. Requests, commands, or other suitable communications may be provided by remote program guide access device 24 to user television equipment 22 and then forwarded by user television equipment 22 to program guide server 25. Program guide data or display screens provided by program guide server 25 may be forwarded by user television equipment 22 to remote program guide access device 24.

Alternatively, remote program guide access device 24 may, for example, communicate with program guide server 25 over remote access link 19 via communications device 27 as shown in FIG. 2d. Appropriate commands, requests, or other suitable communications may be transmitted by remote program guide access device 24 for processing by program guide server 25. If any changes to program guide settings are made (e.g., a change to the parental control settings), program guide server may, for example, update a local program guide client running on user television equipment 22 with the necessary information.

In the arrangements illustrated in FIGS. 2b and 2d, television distribution facility 16 may have communications device 27 for communicating with remote program guide access device 24 over remote access link 19. Communications device 27 may be, for example, a communications port (e.g., a serial port, parallel port, universal serial bus (USB) port, etc.), modem (e.g., any suitable analog or digital modem, cellular modem, or cable modem), network interface card (e.g., an Ethernet card, token ring card, etc.), wireless transceiver (e.g., an infrared transceiver or other suitable transceiver), or other suitable communications device.

As shown in FIGS. 1 and 2a-2d, interactive television program guide equipment 17 communicates with remote program guide access device 24 via remote access link 19. In practice, remote program guide access device 24 may be connected to user television equipment 22 (as shown in FIGS. 2a and 2c), television distribution facility 16 (as shown in FIG. 2b), connected to both (as indicated in FIG. 1), or may communicate with remote program guide server 25 (as shown in FIG. 2d) via remote access link 19. Remote access link 19 may be any suitable wired or wireless communications path or paths over which digital or analog communications may take place between interactive television program guide equipment 17 and remote program guide access device 24.

Each user has user television equipment 22 for displaying the television program listings information and other program guide data using a local interactive television program guide. There are typically multiple pieces of user television equipment 22 and multiple associated communications paths 20, although only one piece of user television equipment 22 and communications path 20 are shown in FIGS. 2a-2d to avoid overcomplicating the drawing. Television distribution facility 16 may distribute television programming to user television equipment 22 via communications path 20. If desired, television programming may be provided over separate communications paths (not shown).

For clarity, the present invention is illustrated, unless otherwise indicated, in connection with a system arrangement in which program guide data is distributed from a main facility to an interactive television program guide implemented on user television equipment via a television distribution facility. Other suitable systems involve arrangements in which data is distributed to a program guide on user television equipment using other suitable distribution schemes, such as schemes involving data transmission over the Internet or the like. If desired, the interactive television program guide application may be implemented using a client-server architecture in which the primary processing power for the application is provided by a server located at, for example, the television distribution facility or the main facility (e.g., program guide server 25), and user television equipment 22 acts as a client processor as illustrated by FIGS. 2c and 2d. Alternatively, the interactive television program guide may obtain program guide data from the Internet. On-line program guides are described, for example, in Boyer et al. U.S. patent application Ser. No. 08/938,028, filed Sep. 18, 1997, which is hereby incorporated by reference herein in its entirety.

Figure 3:
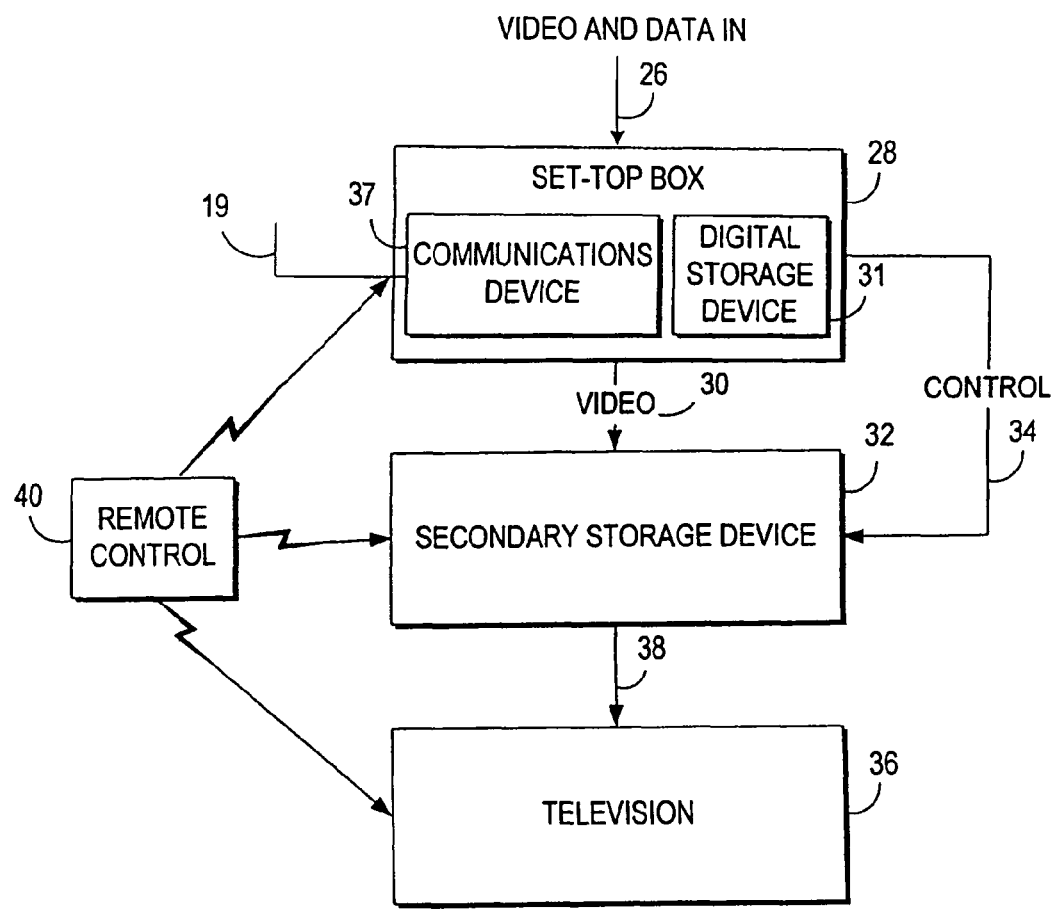
FIG. 3 is an illustrative schematic block diagram of the user television equipment of FIG. 2 in accordance with the principles of the present invention.

An illustrative arrangement for user television equipment 22 is shown in FIG. 3. User television equipment 22 of FIG. 3 receives video and data from television distribution facility 16 (FIG. 1) at input 26. During normal television viewing, the user tunes set top box 28 to a desired television channel. The signal for that television channel is then provided at video output 30. The signal supplied at output 30 is typically either a radio frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32.

Secondary storage device 32 can be any suitable type of analog or digital program storage device or player (e.g., a videocassette recorder, a digital video disc (DVD) player, a hard-disk based storage device, etc.). Program recording and other features may be controlled by set top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set top box 28, secondary storage device 32, and television 36.

The interactive television program guide may run on set-top box 28, on television 36 (if television 36 has suitable processing circuitry and memory), on secondary storage device or on optional digital storage device 31 (if they have suitable processing circuitry and memory) or on a suitable analog or digital receiver connected to television 36. The interactive television program guide may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

If desired, the user may record programs and program data in digital form on optional digital storage device 31. Digital storage device 31 may be a writable optical storage device (such as a DVD player capable of handling recordable DVD discs), a magnetic storage device (such as a disk drive or digital tape), or any other digital storage device.

Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. If necessary, processing circuitry in set-top box 28 formats the received video, audio and data signals into a digital file format. Preferably, the file format is an open file format such as the Motion Pictures Expert Group (MPEG) MPEG-2 standard. The resulting data is streamed to digital storage device 31 via an appropriate bus (e.g., a bus using the Institute Electrical and Electronics Engineers (IEEE) 1394 standard), and is stored on digital storage device 31. Digital storage device 31 and secondary storage device 32 may be integrated into a sophisticated set-top box if desired.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a pre-recorded digital medium, may be passed through from set top box 28, may be provided directly to television 36 from set-top box 28 if secondary storage device 32 is not included in user television equipment 22, or may be received directly by television 36. During normal television viewing, the video signals provided to television 36 correspond to the desired channel to which the user has tuned with set top box 28. Video signals may also be provided to television 36 by set-top box 28 when set-top box 28 is used to play back information stored on digital storage device 31.

Set-top box 28 may have communications device 37 for communicating with remote program guide access device 24 over remote access link 19. Communications device 37 may be, for example, a communications port (e.g., a serial port, parallel port, universal serial bus (USE) port, etc.), modem (e.g., any suitable analog or digital modem, cellular modem, or cable modem), network interface card (e.g., an Ethernet card, token ring card, etc.), wireless transceiver (e.g., an infrared transceiver or other suitable transceiver), or other suitable communications device. Television 36 may also have such a suitable communications device connected to remote access link 19 if desired.

If desired, there may be multiple installations of user television equipment 22 within the home connected via an in-home network. This may provide for coordinating the functionality of multiple guides within the home. Systems in which the functionality of multiple guides are coordinated are described, for example, in concurrently filed Ellis et al. U.S. patent application Ser. No. 09/356,161, filed Jul. 16, 1999, which is hereby incorporated by reference herein in its entirety. In such systems, remote program guide access device 24 may be connected via remote access link 19 to one of the guides and may provide users with the ability to remotely coordinate the functions of all of the guides.

Figure 4:
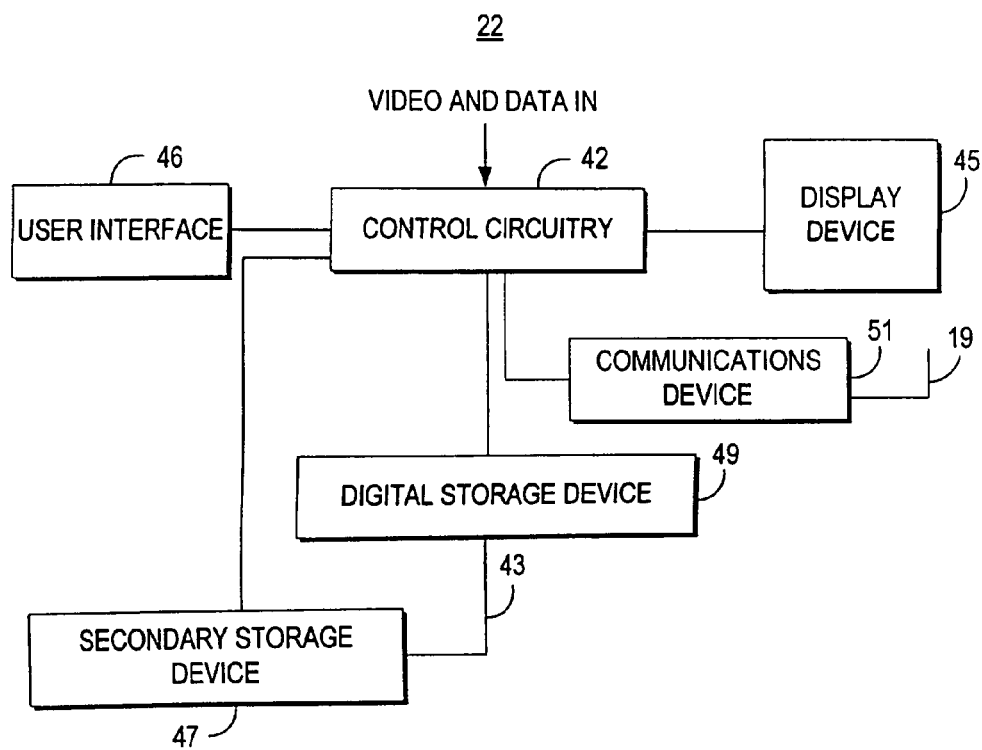
FIG. 4 is a generalized schematic block diagram of portions of the illustrative television equipment of FIG. 3 in accordance with the principles of the present invention.

A more generalized embodiment of user television equipment 22 of FIG. 3 is shown in FIG. 4. As shown in FIG. 4, program guide data from television distribution facility 16 (FIGS. 2a-2d) is received by control circuitry 42 of user television equipment 22. Control circuitry 42 may also send data and commands or requests back to television distribution facility 16. The functions of control circuitry 42 may be provided using the set top box arrangement of FIGS. 2a and 2b. Alternatively, these functions may be integrated into an advanced television receiver, personal computer television (PC/TV), or any other suitable arrangement. If desired, a combination of such arrangements may be used.

The user controls the operation of user television equipment 22 with user interface 46. User interface 46 may be a pointing device, wireless remote control, keyboard, touch-pad, voice recognition system, or any other suitable user input device. To watch television, the user instructs control circuitry 42 to display a desired television channel on display device 45. Display device 45 may be a television, monitor, or other suitable display device. To access the features of the program guide, the user instructs the program guide implemented on interactive television program guide equipment 17 to generate a main menu or other desired program guide display screen for display on display device 45.

User television equipment 22 of FIG. 4 may also have communications device 51 for supporting communications between user television equipment 22 and remote program guide access device 24 over remote access link 19. Communications device 51 may be a communications port (e.g., a serial port, parallel port, universal serial bus (USB) port, etc.), modem (e.g., any suitable analog or digital standard, cellular, or cable modem), network interface card (e.g., an Ethernet card, Token ring card, etc.), wireless transceiver (e.g., an infrared, radio, or other suitable analog or digital transceiver), or other suitable communications device.

User television equipment 22 may also have secondary storage device 47, digital storage device 49, or any suitable combination thereof for recording programming. Secondary storage device 47 can be any suitable type of analog or digital program storage device (e.g., a videocassette recorder, a digital video disc (DVD), etc.). Program recording and other features may be controlled by control circuitry 42. Digital storage device 49 can be, for example, a writable optical storage device (such as a DVD player capable of handling recordable DVD discs), a magnetic storage device (such as a disk drive or digital tape), or any other digital storage device.

Figure 5:
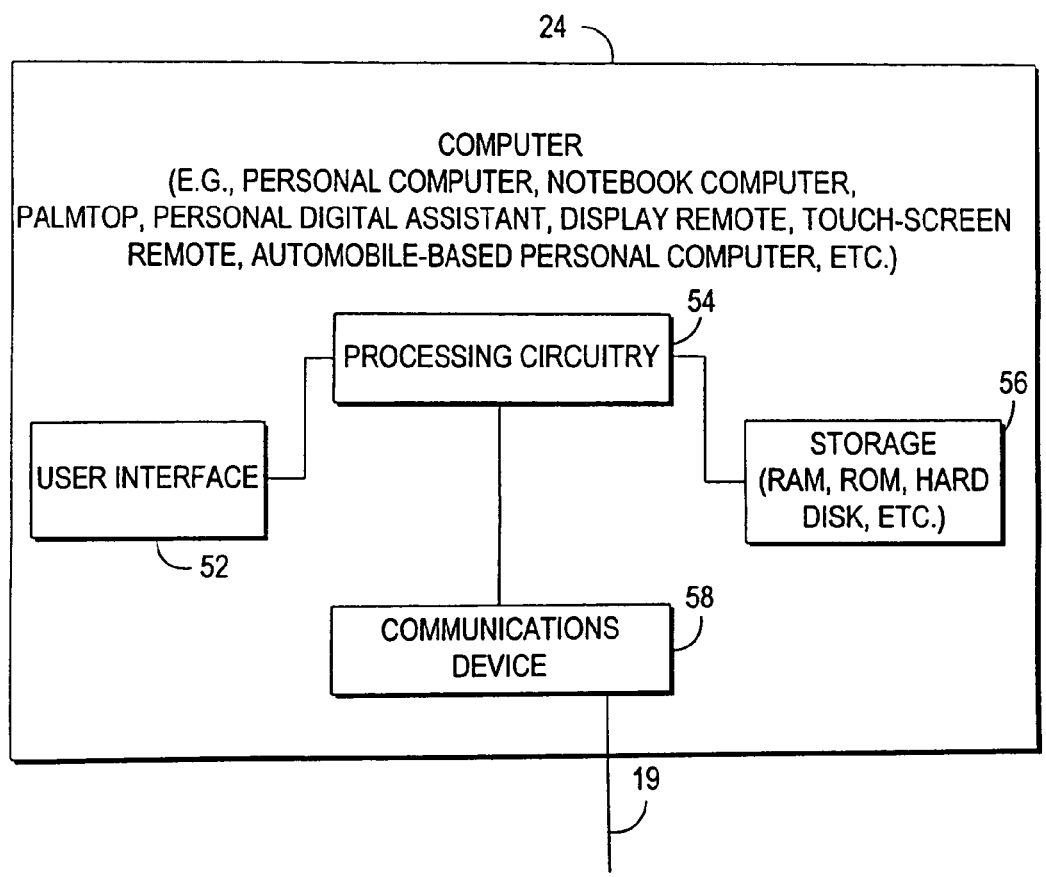
FIG. 5 is a schematic block diagram of an illustrative remote program guide access device in accordance with the principles of the present invention.

An illustrative arrangement for remote program guide access device 24 is shown in FIG. 5. As shown in FIG. 5, remote program guide access device 24 may be any suitable personal computer (PC), portable computer (e.g., a notebook computer), palmtop computer, handheld personal computer (H/PC), display remote, touch-screen remote, automobile PC, personal digital assistant (PDA), or other suitable computer based device. Remote program guide access device 24 may have user interface 52, processing circuitry 54, storage 56, and communications device 58. User interface 52 may be any suitable input or output device or system, and may include a pointing device, keyboard, touch-pad, touch screen, pen stylus, voice recognition system, mouse, trackball, cathode ray tube (CRT) monitor, liquid crystal display (LCD), voice synthesis processor and speaker, or any other suitable user input or output device. Processing circuitry 54 may include any suitable processor, such an Intel 486 or Pentium< microprocessor. Remote program guide access device 24 may also have storage 56. Storage 56 may be any suitable memory or other storage device, such as RAM, ROM, flash memory, a hard disk drive, etc.

Remote program guide access device 24 may also have communications device 58. Communications device 58 may be any device suitable for supporting communications between remote program access device 24 and interactive television program guide equipment 17 over link 19, such as a communications port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, or other suitable analog or digital transceiver), or other suitable communications device.

Remote access link 19 (FIG. 1) may include any suitable transmission medium. Link 19 may include, for example, a serial or parallel cable, a dial-up telephone line, a computer network or Internet link (e.g., 10Base2, 10Base 5, 10BaseT, 100BaseT, 10BaseF, T1, T3, etc.), an in-home network link, an infrared link, a radio frequency link, a satellite link, any other suitable transmission link or suitable combination of such links. Any suitable transmission or access scheme may be used such as standard serial or parallel communications, Ethernet, Token Ring, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), any other suitable transmission or access scheme, or any suitable combination thereof. Preferably remote access link 19 is bidirectional. If desired, however, certain limited program guide functions may be accessed using a unidirectional link. An advantage of using a unidirectional scheme for link 19 is that such schemes are generally less complicated and then less expensive than bidirectional links.

Remote program guide access device 24 and interactive television program guide equipment 17 may communicate over remote access link 19 using any suitable network and transport layer protocols, if desired. Remote program guide access device 24 and interactive television program guide equipment 17 may communicate, for example, using a protocol stack which includes Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, or any other suitable network and transport layer protocols or combination of protocols.

Remote program guide access device 24 may communicate with interactive television program guide equipment 17 using any suitable scheme. Remote program guide access device 24 may, for example, connect to interactive television program guide equipment 17 using a terminal emulation scheme, such as VT100 terminal emulation, and access the interactive television program guide as if it were a "dumb terminal."Remote program guide access device 24 may, for example, run a standard remote access client such as a Windows< Remote Access Services (RAS) client and may connect to a Windows NT< Server process running on interactive television program guide equipment 17. Any suitable combination of hardware and software may be used. In addition to using any of the already mentioned protocols, any number of other access, data-link, network, routing or other protocols may be involved in supporting communications between remote program guide access device 24 and television distribution facility 16 over remote access link 19 (e.g., X.25, Frame Relay, Asynchronous Transfer Mode (ATM), Serial Line Interface (SLIP), point-to-point protocols (PPP), or any other suitable access, data-link, network, routing or other protocol).

Figure 6A:
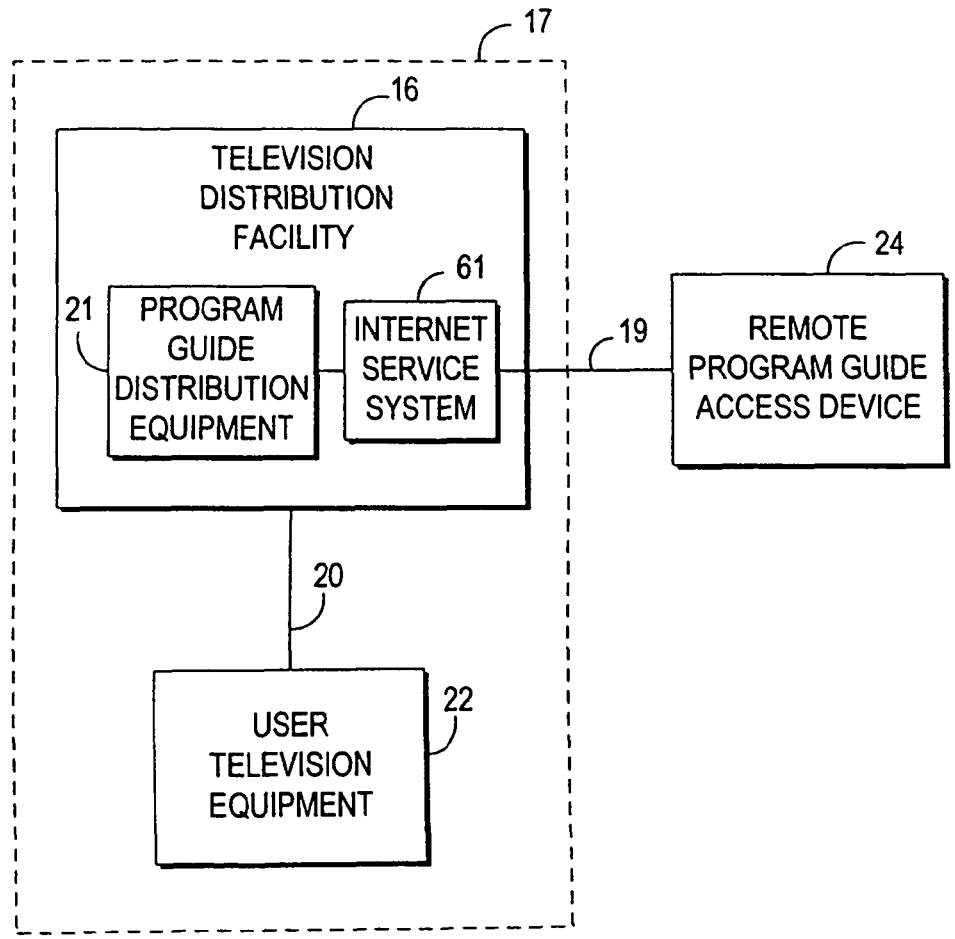
FIGS. 6a, 6b, and 6c are schematic block diagrams of illustrative arrangements for supporting communications between a remote program guide access device and interactive television program guide equipment over an Internet link in accordance with the principles of the present invention.
Figure 6B:
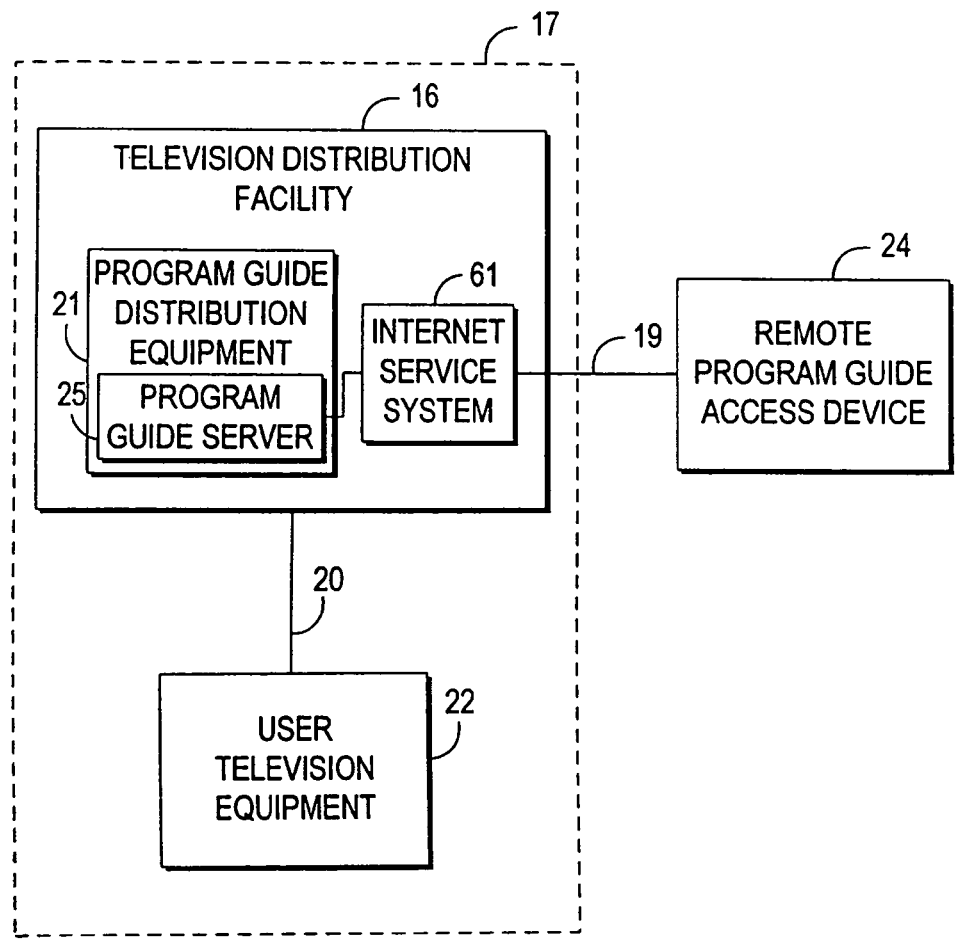

FIGS. 6a and 6b show illustrative arrangements for supporting communications between remote program guide access device 24 and interactive television program guide equipment 17 over an Internet link. Television distribution facility 16 may, for example, include Internet service system 61 for providing Internet-based access to the program guide. Internet service system 61 may be any combination of hardware and software capable of providing an Internet connection to the programming guide. Remote program guide access device 24 may establish an Internet session with Internet service system 61 and thereby obtain program guide data from or set program guide settings with (e.g., set reminders or notifications, view listings, schedule program recording, set favorites, set parental control features, send messages, poll interactive television program guide equipment 17, etc.) the program guide running on interactive program guide equipment 17. If desired, Internet service system 61 may be located at a facility that is separate from television distribution facility 16.

Program guide server 25 may, in turn, interact with the user's client device (e.g., user television equipment 22). If the program guide is implemented on user television equipment 22 of program guide equipment 17 as shown in FIG. 6a, Internet service system 61 (or other suitable equipment at television distribution facility 16 that is connected to Internet service system 61) may interact with user television equipment 22 directly or via program guide distribution equipment 21 when supporting communications between the program guide and the remote program guide access device. If the program guide implemented on interactive television program guide equipment 17 is a client-server guide as shown in FIG. 6b, Internet service system 61 may interact with program guide server 25 when supporting communications between the program guide and the remote program guide access device 24. Alternatively, Internet service system 61 and program guide server 25 may be the same device or system.

In an illustrative system configuration using Internet service system 61, remote program guide access device 24 is a user's personal computer at work, Internet service system 61 is a web server at a cable system headend, and user television equipment 22 at the user's home contains a set-top box on which the user's program guide is implemented. Using this arrangement, the user may access features of the program guide such as setting reminders or notifications, viewing listings, program recording, setting favorites, parental control, sending messages, polling for status, or any other suitable function. For example, if a child in the user's home desires permission to watch a parentally controlled program while the user is a at work, the user may access a suitable web page provided by Internet service system 61 that allows the user to enter a password and adjust the program guide parental control settings. The changed settings allowing the child access to the desired program are then automatically transferred from Internet service system 61 to user television equipment 22, while the user is still at work.

As another example, the user at work may interact with the program guide on user television equipment 22 via Internet service system 61 to select programs for recording on the user's home videocassette recorder, or to schedule program reminders that will appear on the user's home television or remote program guide access device just before a program is broadcast.

Figure 6C:
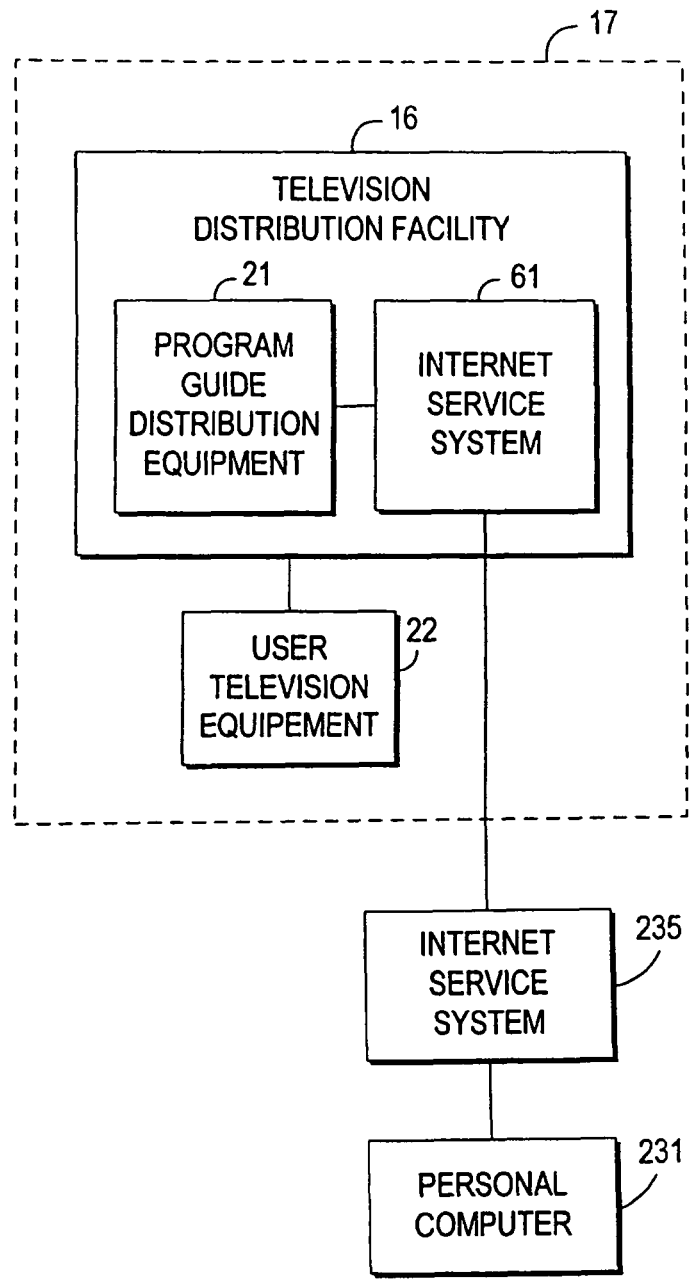

FIG. 6c shows another illustrative arrangement for remote program guide access using the Internet. In the system arrangement of FIG. 6c, users do not directly communicate a local guide via the Internet as with the arrangements of FIGS. 6a and 6b. Instead, users may have personal computer (PC) 231 as their remote access device on which a web browser is implemented for accessing an on-line program guide. On-line program guides are described, for example, in above-mentioned Boyer et al. U.S. patent application Ser. No. 08/938, 028, filed Sep. 18, 1997. Personal computer 231 may be connected to Internet service system 235 via Internet link 233. Internet service system 233 may use any suitable combination of computer hardware and software capable of providing an on-line program guide server application or web site. The user may access a personal web page and set various program guide settings and access various program guide functions. The user may, for example, set favorite channels, set parental control settings, schedule programs for play back or recording by the user's television equipment. After the user has set various program guide settings or accessed various program guide functions via a web page, Internet service system 235 may provide the settings and another program guide information to Internet service system 61 for distribution by program guide server 25 or distribution equipment 21 (as shown) to user television equipment 22. The local guide updates its settings, records programs, plays back programs, or performs any other suitable function accordingly. The local guide may also order pay-per-view programs.

A remote access interactive television program guide may, for example, be implemented on remote program guide access device 24. The remote access interactive television program guide may communicate with the interactive television program guide that is implemented on interactive television program guide equipment 17, herein referred to as a "local" interactive television program guide. The remote access and local guide may, for example, be the same guide but compiled to run on two different platforms and to communicate in a manner or manners discussed herein. Alternatively, the remote access guide may be a client guide that communicates with the local guide (i.e., a server guide). In still another suitable approach, the two guides may be different guides that communicate in a manner or manners discussed disclosed herein. Generally, although not necessarily (e.g., when remote program guide access device 24 is a personal computer as shown in FIG. 6c), the remote access interactive television program guide may have a reduced or limited functionality when compared to the functionality of the local interactive television program guide. Accordingly, the remote access guide may require less processing power and memory of remote program guide access device 24 than the local guide requires of interactive television program guide equipment 17.

Program guide information (e.g., reminder information, listings information, recording information, message information, status information, parental control settings, audio and video, status or polling information, user information, favorites settings, or any other information necessary for remotely providing program guide functionality) may be exchanged, and settings set, between the two interactive television program guides over remote access link 19 using one or more access communications.

Access communications may include, for example, commands, requests, messages, remote procedure calls (e.g., using a proxy-stub pair), or any other suitable client-server or peer-to-peer communication. Access communications may also involve, for example, complex communications between application constructs running on remote program guide access device 24 and interactive television program guide equipment 17. Objects running in the two versions of the program guides, for example, may communicate using an Object Request Broker (ORB). The program guide information may, for example, be encapsulated as component object model (COM) objects and persisted to files that are transmitted over remote access link 19. In another approach, access communications may include HTML formatted markup language documents (e.g., web pages), that are exchanged between remote program guide access device 24 and interactive television program guide equipment via Internet service system 61.

Program guide information may be transferred, and program guide settings set, between remote program guide access device 24 and interactive television program guide equipment 17 using any suitable application layer protocol if desired. If link is an Internet link, for example, program guide functionality may be accessed by, for example, using the Hypertext Transfer Protocol (HTTP). Remote program guide access device 24 and interactive television program guide equipment 17 may, for example, transfer program guide information as files using the File Transfer Protocol (FTP) or Trivial File Transfer Protocol (TFTP), running over a TCP/IP protocol stack. Any suitable file transfer protocol based on any suitable protocol stack may be used.

Remote program guide access device 24 and interactive television program guide equipment 17 may also exchange program guide data and other information as messages using any suitable messaging scheme or messaging application programming interface (API). Program guide data and other information may, for example, be encapsulated into e-mail messages and transferred using the Simple Mail Transfer Protocol (SMTP), Messaging API (MAPI), or other suitable messaging protocol or API.

Remote program guide access device 24 and the interactive television program guide implemented on interactive program guide equipment 17 may exchange access communications to provide the user with access to program guide functionality as if the program guide were running locally on remote program guide access device 24. Remote program guide access device 24 may provide a user with access to any number of program guide functions such as accessing programming information, scheduling reminders for programs, setting and navigating through favorite channels, setting parental control settings, scheduling programming recordings, or any other program guide function to the extent allowed by the resources of remote program guide access device 24. If desired, remote program guide access device 24 may allow the user to perform other program guide functions, such as determining the status of user television equipment 22, sending messages to user television equipment 22, interacting with peripherals connected to user television equipment, and other suitable functions.

When the user wishes to access the features of the program guide via remote program guide access device 24, the user may issue an appropriate command using user interface 52 (FIG. 5). For example, if the user wishes to view programming information, a "guide" key on user interface 52 can be used. If, for example, user interface 52 includes a microphone and uses suitable voice recognition software, the user may speak a predetermined command into the microphone. Such an interface is especially useful in environments where remote program guide access device 24 must be operated without the use of one's hands, as with an automobile PC.

When possible, remote program guide access device 24 may present program guide data and other information to the user as they are normally presented by user television equipment 22. In practice, appropriate differences in presentation may occur depending on the interface devices used in user television equipment 22 and remote program guide access device 24 (e.g., user television equipment 22 may use a television to output listings and remote program guide access device 24 may include a voice recognition and synthesis system to output synthesized voice listings).

When a user indicates a desire to access program guide features by issuing an appropriate command to remote program guide access device 24, remote program guide access device 24 may, for example, access stored program guide information or obtain program guide information from interactive television program guide equipment 17 via remote access link 19 using any of the approaches already described, and generate an appropriate display screen for display using user interface 52. Alternatively, the local interactive television program guide implemented on interactive television program guide equipment 17 may receive one or more access communications from remote program guide access device 24 over link 19, generate the appropriate program guide display screen, and send the program guide display screen back to remote program guide access device 24 for display on user interface 52. In another embodiment, a remote access guide may run on remote program guide access device 24 and issue access communications over remote access link 19 as if it were running as a client locally on interactive television program guide equipment 17. In another embodiment, remote program guide access device 24 may access a web site and view web pages that contain program guide information.

The remote access program guide running on remote program guide access device 24 may provide a user with an opportunity to remotely access program listings. A person driving an automobile, for example, may issue a suitable vocal command that is recognized by interface 52. The remote access program guide may issue one or more access communications to the local program guide, which in turn supplies program listings information back to remote program guide access device 24. User interface 52 may, for example, provide the listings to the user in synthesized voice outputs.

Figure 7:
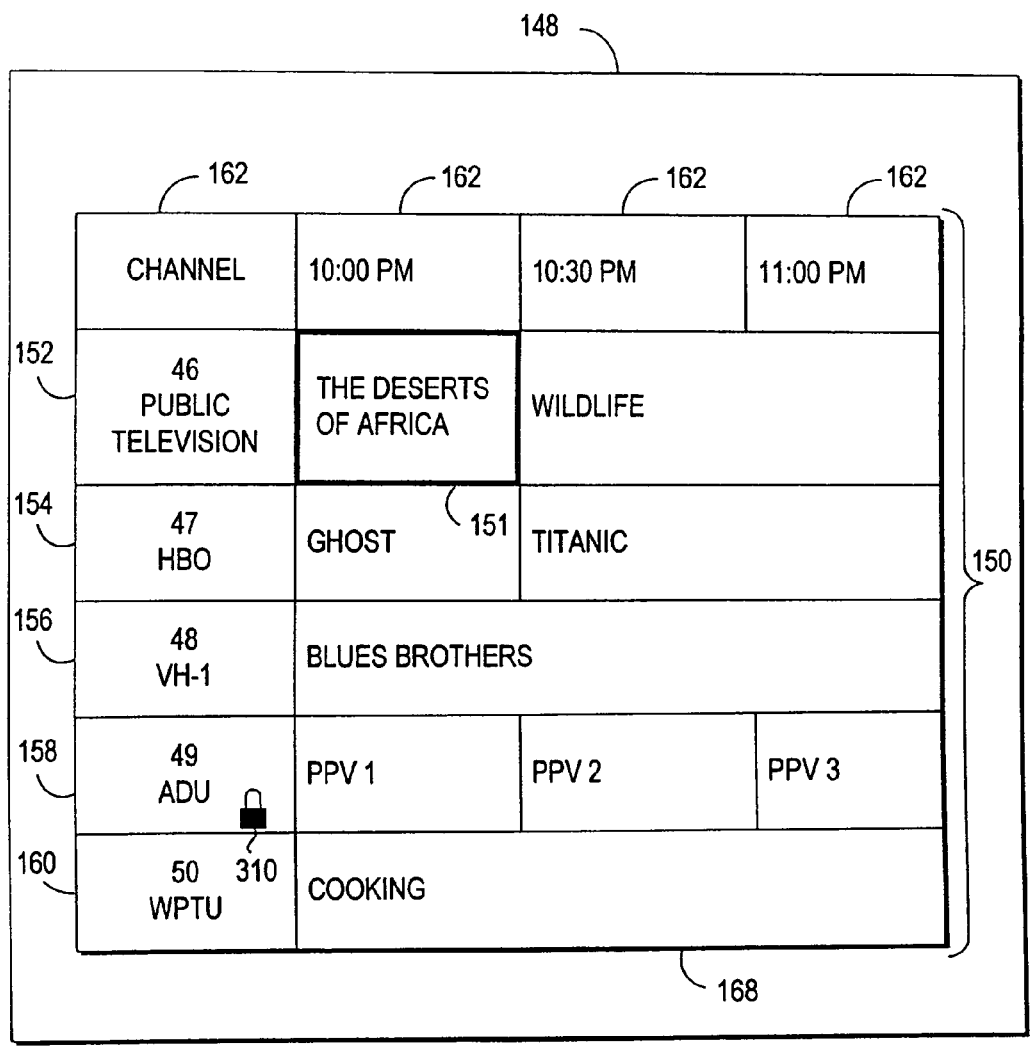

The program listings may also, for example, be displayed in a program listings screen by a suitable display device. A program listings screen may contain one or more lists of programs organized according to one or more organization criteria (e.g., by program type, theme, or any other predefined or user defined and selectable criteria) and sorted in various ways (e.g., alphabetically). One approach is to organize program listings into a program listings grid. As shown in FIG. 7, program listings display screen 148 may contain program listings area 168. Program listings area 168 may display television program listings in any suitable format, such as any suitable list, table, or grid.

FIG. 7 illustrates the display of program listings in program listings grid 150. Program listings grid 150 may be divided into a number of columns 162 which correspond to program broadcast times and which may be equally spaced apart (e.g., in thirty-minute steps). Program listings may be displayed in the grid in sub-sets according to predefined or selectable organization criteria and sorted in various ways. Program listings row 152 contains, for example, selectable program listings for THE DESERTS OF AFRICA and WILDLIFE on channel 46 (Public Television). Program listings row 154 contains, for example, selectable program listings for GHOST and TITANIC on channel 47 (HBO). Program listings row 156 contains, for example, selectable program listings for programs BLUES BROTHERS on channel 48 (VH-1). Program listing row 158 contains selectable program listings for programs, PPV 1, and PPV 2 on channel 49 (ADU). Program listings row 160 contains a selectable program listing for COOKING on channel (WPTU). The programs on each channel are typically different.

Program listings grid 150 may have movable cell highlight region 151, which highlights the current grid cell. The user may position highlight region 151 by entering appropriate commands with user interface 52. For example, if user input interface 52 has a keypad, the user can position highlight region 151 using "up," "down," "left," and "right" cursor keys. Remote program listings may also be panned left, right, up, and down by positioning highlight region 151 using the cursor keys on user interface 52. Alternatively, a touch sensitive screen, trackball, voice commands, or other suitable device may be used to move highlight region 151 or to select program listings without the use of highlight region 151. In still another approach, the user may speak the title of a television program listing into a voice request recognition system which will issue an appropriate command or request to remote program guide access device 24. Any other suitable approach may also be used.

After a user selects a program listing, the remote access program guide may provide the user with the opportunity to access a number of program guide features. For example, the user may access additional information (typically text or graphics, but possibly video if desired) about the listing, schedule an associated program reminder, schedule an associated program for recording by one or more of digital storage device 31 (FIG. 3), secondary storage device 32 (FIG. 3), storage 56 (FIG. 5), or program guide server 25.

Program listings may also be displayed for the user in a list. FIG. 8 illustrates a program listings display screen having a program listings list displayed in accordance with the principles of the present invention. Scrollable program listings lists may display program listings in subsets according to predefined or user-selected organization criteria. Any suitable organization criteria and sorting scheme may be used. Scrollable program listings list 170 of FIG. 8, for example, organizes program listings according to program type and then sorts the listings alphabetically in each subset. The television program listings display screen of FIG. 8 also has movable cell highlight region 171 for moving within the list and selecting listings.

The remote access program guide may also provide a user with the opportunity to remotely schedule program reminders when the user indicates a desire to set a program reminder (e.g., by pressing a "reminder" button on user interface 52, selecting an on screen "reminder" button, issuing an appropriate vocal command, etc.). The remote access program guide may transmit one or more access communications to the local interactive television program guide implemented on interactive television program guide equipment 17 to schedule the reminder. Alternatively, the remote access program guide may, for example, store a reminder locally on storage 56 of remote program guide access device 24 (FIG. 5). Information indicating the user who set the reminder may also be stored on interactive program guide equipment 17 or storage 56. Reminders may also be scheduled by a user with the local guide, transmitted to remote program guide access device 24, and displayed by the remote access guide on remote program guide access device 24.

At an appropriate time before the selected program is scheduled to air (e.g., a predefined user-selectable number of minutes, hours or days), a reminder may be issued by the local or remote interactive television program guides, or both. The reminder may be issued on all remote program guide access devices 24 available to the user, and may be displayed (e.g., in the form of a pop-up window or message) on user television equipment 22. If a reminder for a program is to be displayed on the user's home television, the reminder may be displayed just before the beginning of the program. If a reminder for a program is to be displayed on remote program guide access device 24, the reminder may be displayed much earlier (e.g., several hours before the program).

Figure 9:
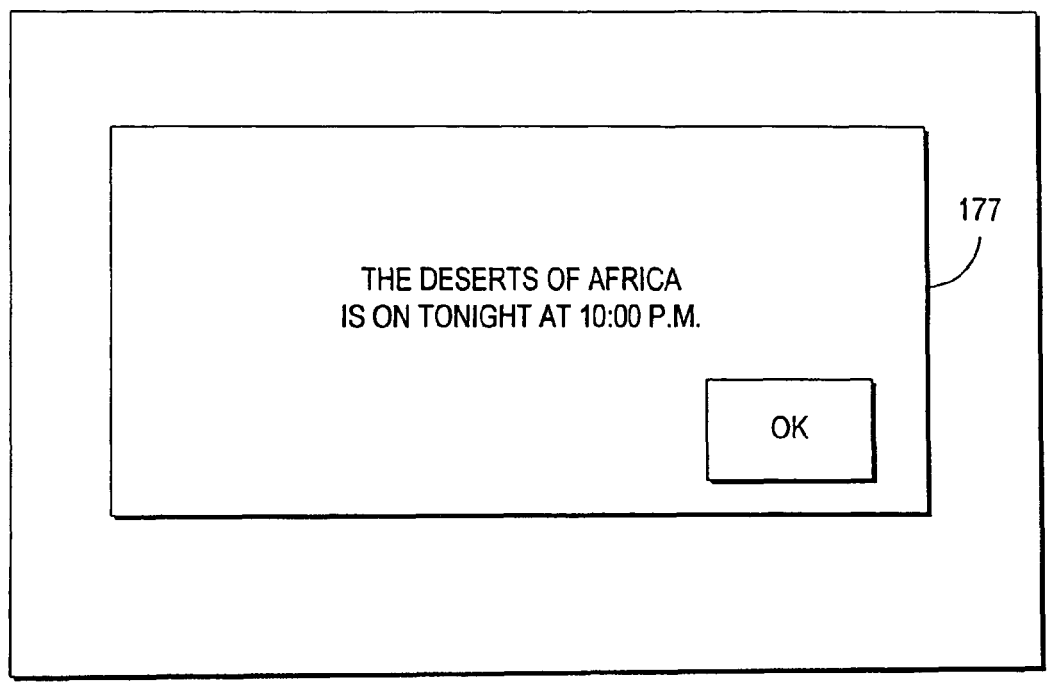
FIG. 9 is an illustrative program reminder for display by interactive television program guide equipment or a remote program guide access device in accordance with the principles of the present invention.

In another approach, reminders may be sent as e-mail messages from the interactive television program guide to remote program guide access device 24. Interactive program guide systems in which reminders are sent to users via e-mail are described, for example, in Boyer et al. U.S. patent application Ser. No. 08/987,740, filed Dec. 9, 1997, which is hereby incorporated by reference herein in its entirety. In still another approach, user interface 52 may include an alphanumeric pager (among other suitable devices for providing bi-directional communications with the program guide via remote access link 19). The interactive program guide implemented on interactive television program guide equipment 17 may phone an automatic paging service (e.g., by using a suitable modem and communications software), and issue a message similar to the one contained in notification 177. An illustrative reminder 177 for display on display device 45 (FIG. 4) or user interface 52 (FIG. 5) is shown in FIG. 9.

The remote access program guide may also provide a user with the opportunity to remotely access and adjust the parental control settings of the local interactive television program guide implemented on interactive television program guide equipment 17. The remote access program guide, for example, may provide users with an opportunity to block potentially objectionable programs or channels using a parental control code (e.g., a personal identification number (PIN) code). Users my also selectively unlock blocked channels or programs. If desired, the user may remotely access parental control settings related to blocking the display of potentially objectionable program listings.

The remote access program guide may obtain parental control information (e.g., which channels, services, programs, genres or types of program listings may be locked, maximum rating information, PIN information, etc.), from the local program guide implemented on interactive television program guide equipment 17 over remote access link 19 in any suitable manner. Remote program guide access device 24 may, if desired, store parental control information on storage 56. Information indicating the user who accessed and adjusted parental control settings may be stored by the program guide or remote program guide access device 24.

Remote program guide access device 24 may provide a user with the opportunity to remotely parentally control television programming by, for example, providing the user with the opportunity to select a television program listing and issue an appropriate command using user interface 52 (e.g., by pressing a displayed "lock" button, using a pointing device or touch sensitive screen, issuing an appropriate vocal command, etc.). Remote program guide access device 24 may indicate to a user that a channel, service, program, or genre is locked by, for example, generating an appropriate notice, icon, synthesized voice response, message, or any other suitable indication. FIGS. 7 and 8 illustrate the use of lock icon 310 for indicating, for example, that television service ADU is locked.

The remote access program guide may also provide users with an opportunity to remotely access interactive television program guide functionality related to user preferences or "favorites" settings. For example, remote program guide access device 24 may access features for setting-up and navigating through favorite channels or programs. Interactive television program guide systems in which program guide data is displayed according to preference profiles are described, for example, in Ellis et al. U.S. patent application Ser. No. 09/034,934, filed Mar. 4, 1998, which is hereby incorporated by reference herein in its entirety.

The remote access program guide may obtain information on the user's preferences (e.g., which channels or programs are favorites, favorite themes, likes and dislikes etc.) from the local interactive television program guide implemented on interactive television program guide equipment 17 in any suitable manner. The remote access program guide may, if desired, store favorites information on storage 56 (FIG. 5), may provide the user with an opportunity to remotely adjust channel settings and other preferences based on the favorites information. Remote program guide access device 24 may transmit changed or new favorites information to interactive television program equipment 17 via remote access link 19 using one or more access communications. Information indicating the user who changed the profiles may also be stored by the local or remote access program guides.

The information on the user's preferences may be used by the local and remote access interactive program guides to navigate through favorite channels and display television program listings. FIG. 10 shows an illustrative program listings display screen that may be displayed by the remote access program guide on remote program guide access device 24 using user interface 52. The display screen includes a number of channels that have been selected as favorites (e.g., channels 2, 4, 7, 47 and 48). Alternatively, remote program guide access device 24 may, for example, display television program listings in a grid, table, or list while highlighting favorite channels or preferred programs. A user may be provided with the opportunity to "scroll" between favorite listings or channels by issuing an appropriate command using user interface 52. In still another suitable approach, remote program guide access device 24 may display program guide data for only those programs or channels that are of interest to users as defined by the profiles.

User preference profiles may also be used to limit the amount of data provided to remote program guide access device 24 and thereby tend to minimize the bandwidth requirements of remote access link 19. Data filtering may be performed, for example, by the local interactive guide according to the user profiles when transferring data to remote program guide access device 24. Only data for those programs or channels that are of interest to the user may be transferred if desired. Alternatively, data filtering may be performed, for example, by program guide server 25 or Internet service system 61.

The remote access program guide may also provide the user with the opportunity to remotely schedule recordings using the local interactive program guide. The user may, for example, select a program listing using user interface 52 (FIG. 5) and issue an appropriate command (e.g., pushing an on-screen "button," issuing an appropriate voice command, etc.). The remote access program guide may respond by sending one or more access communications to the local interactive program guide implemented on interactive television program guide equipment 17 with the remote program guide access device 24 to record the program associated with the selected listing when the program is aired. The local program guide may store the program on secondary storage device 32, digital storage device 31, or on storage 56 of remote program guide access device 24. Information indicating the user who scheduled a program for recording may also be stored by the program guide or remote program guide access device 24. If the programming is stored on storage 56, it may be transmitted to remote program guide access device 24 in any suitable format (e.g., as National Television Standards Committee (NTSC) video, as MPEG-2 files, etc.), and may be converted to a digital format by a suitable analog to digital converter in remote program guide access device 24 if necessary (not shown). Any suitable transmission scheme may be used, such as using FTP if files are transferred, for example, across an Internet link. Programs may also be recorded by program guide server 25. Program guide systems in which user selected programs are stored by a program guide server are described, for example, in above-mentioned Ellis et al. U.S. patent application Ser. No. 09/332,244, filed Jun. 11, 1999.

If desired, program series may be recorded. Interactive television program guide systems in which program series are recorded are described, for example, in Knudson et al. U.S. patent application Ser. No. 09/330,792, filed Jun. 11, 1999, which is hereby incorporated by reference herein in its entirety.

Program guide information may also be stored by the remote access interactive television program guide on storage 56. User settings and profiles, video clips, and detailed descriptive information may also be stored. Storing programming or data on storage 56 may be appropriate in situations, for example, where the data is required to be maintained across a power outage, or if the volume of data that the interactive program guide must store during normal operation is more than interactive television program guide equipment 17 can handle.

The remote access program guide may also provide a user with an opportunity to remotely order pay-per-view programs and packages. The remote access program guide may, for example, provide the user with an opportunity to select a pay-per-view program or package listing using user interface 52 (e.g., by using a pointing device, touch sensitive screen, or issuing a voice command to select a pay-per-view program listing). In response to the user command, remote program guide access device 24 may obtain pay-per-view information (e.g., price, ordering information, time, event code, etc.) from the interactive television program guide running on interactive television program guide equipment 17, via remote access link 19. Alternatively, the pay-per-view information may have been provided to remote program guide access device 24 by the local guide, program guide server 25, or Internet Service system 61.

The remote access program guide may provide the pay-per-view information to the user using user interface 52, and may provide the user with the opportunity to order the pay-per-view selection. Once the user issues an appropriate command to remote program guide access device 24 to order the pay-per-view selection, the remote access guide on remote program guide access device 24 may indicate to the local guide implemented interactive program guide equipment 17 (e.g., via one or more access communications) the program that the user wishes to order. The local interactive program guide may respond by ordering the pay-per-view program from television distribution facilitating 16 or some other distribution facility. Alternatively, the remote access program guide may order the pay-per-view program from television distribution facility 16 (or some other distribution facility) and indicate the ordered pay-pay-view to the local guide so that ordering related functions may be coordinated.

Remotely ordering pay-per-view programs via the local interactive guide as opposed to ordering pay-per-view programs directly from a headend by phone, Internet, or impulse ordering using the remote access guide may allow the local program guide to perform functions that it would not ordinarily be able to perform. Ordering a pay-per-view through the local guide as opposed to directly from television distribution facility 16 may allow the local guide to, for example, parentally control the ordering of a program, inform the user that the program is about to start, inform the user that the user has missed an ordered pay-per-view program, provide the user with an opportunity to reorder the program, or any other suitable function associated with ordering a pay-per-view program.

The remote access program guide may also provide the user with an opportunity to remotely access video and audio (either together or separately) that is being distributed to the local interactive television program guide or which has been stored by the local interactive television program guide on user television equipment 22 or at a remote server. In response to an appropriate user command on user interface device 56, the remote access program guide may, for example, query the interactive television program guide for media directory information stored on digital storage device 31 or secondary storage device 32. Interactive television program guides which store programming using a digital media directory are described, for example, in the previously mentioned Ellis et al. U.S. patent application Ser. No. 09/157,256.

The remote access program guide may provide the user with the opportunity to select a directory entry or may, for example, provide the user with an opportunity to select a program listing of a television program that is being broadcast. In response to either selection, the remote access program guide may issue an appropriate access communication to the interactive television program guide to play back or tune to the selection and transmit it back to remote program guide access device 24 over remote access link 19. Remote program guide access device 24 may play the video or audio for the user. In one approach, for example, remote program guide access device 24 may provide a user with the opportunity to access audio from a digital music channel which is received by interactive television program guide equipment 17, and play the audio on a speaker or by using an audio device that may be contained in user interface 52 (e.g., a car stereo).

Video and audio may be transmitted from interactive television program guide equipment 17 to remote program guide access device 24 over remote access link 19 in any suitable format (e.g., as NTSC video, as MPEG-2 files, using the M-bone, etc.), and may be converted to a digital format if necessary by a suitable analog to digital converter in remote program guide access device 24 (not shown). Any suitable transmission scheme may be used.

The remote access program guide may also provide a user with the opportunity to poll the local interactive television program guide to determine the status of interactive television program guide equipment 17 or, more specifically, user television equipment 22. For example, the remote access program guide may obtain information regarding whether the interactive television program guide is in use, what channel user television equipment 22 is tuned to, the title of the current program, the rating of the current program, the status of remote access link 19, available devices, etc. Any suitable scheme may be used, such as using a Simple Network Management Protocol (SNMP) approach in which a management client process runs as part of the interactive television program guide implemented on interactive television program guide equipment 17, and in which a management server process runs on remote program guide access device 24.

When the user issues an appropriate command using user interface device 56 (e.g., by pressing a button on a key pad, selecting an on-screen option or button, issuing an appropriate voice command, etc.), the remote access program guide may respond by issuing an access communication to the interactive program guide over remote access link 19 using remote program guide access device 24. The interactive program guide may respond by transmitting the desired status information back to remote program guide access device 24 over remote access link 19, or by transmitting a display screen (if appropriate). The remote access program guide may indicate the status of interactive television program guide equipment 17 on remote program guide access device 24 using any suitable indicator (e.g., a display screen, synthesized voice responses, etc.). An illustrative status display screen 200 for display using user interface 52 is shown in FIG. 11.

The remote access program guide may also provide a user with an opportunity to control user television equipment 22 remotely. A user may, for example, position highlight region 201 over a setting, select the setting, and change its value. The user may, for example, change the current channel, the current volume, or control user television equipment 22 in any other suitable manner.

The remote access program guide may also provide a user with the opportunity to send audio, graphical, and text messages to the local interactive program guide for playing or display by user television equipment 22. For example, the remote access program guide may receive a voice message from the user using user interface device 24. That voice message may be converted to a digital signal by an analog-to-digital converter in remote program guide access device 24 if necessary, and sent to the interactive television program guide over remote access link 19. Once received, the local interactive television program guide may play (or display) the message on user television equipment 22. If desired, messages created by a user on the local interactive television program guide or by an operator of television distribution facility 16 may be sent to remote program guide access device 24. The remote access program guide may in turn provide the messages to the user using remote program guide access device 24.

FIGS. 12-24 are illustrative flow charts of steps involved in providing remote access to functions of a local interactive television program guide in accordance with the principles of the present invention. The steps shown in FIGS. 12-24 are illustrative and may be performed in any suitable order. Moreover, in practice it may be desirable to combine or delete various steps or combinations of steps shown in the flow charts.

Figure 12:
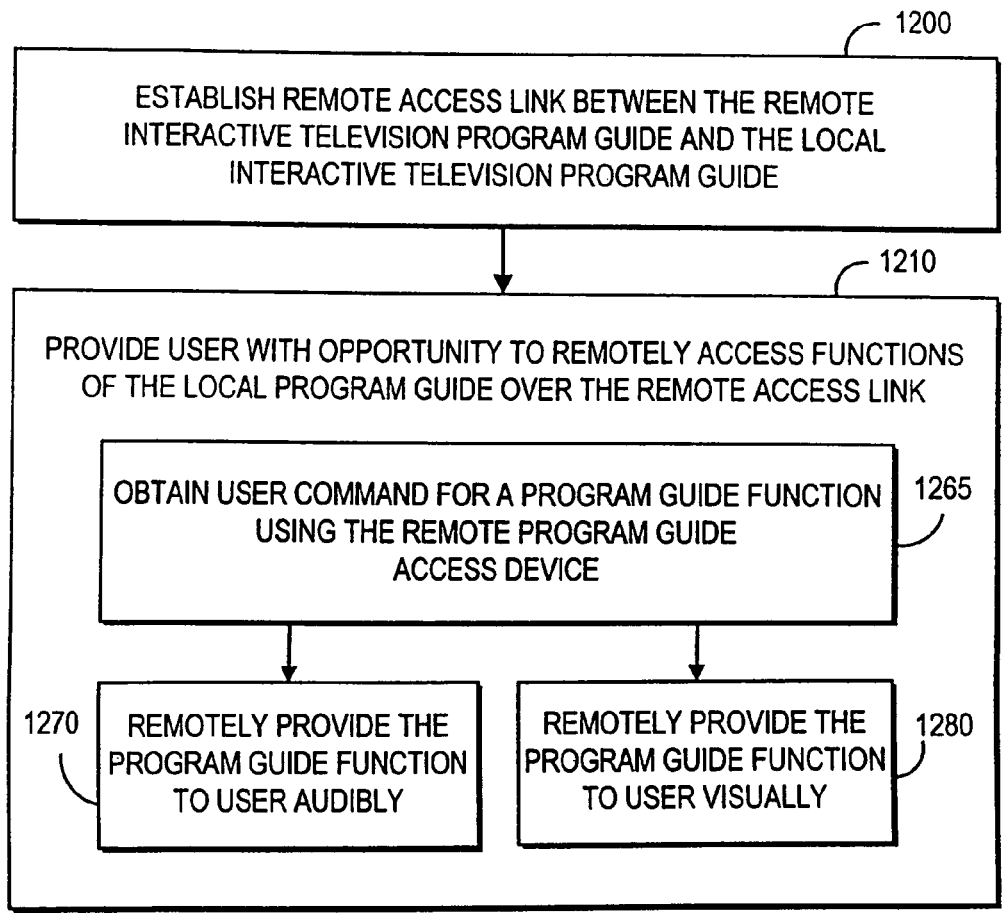
FIGS. 12-23 are illustrative flow charts of steps involved in providing remote access to interactive television program guide features in accordance with the principles of the present invention.

FIG. 12 shows illustrative steps involved in providing remote access to the various program guide functions. At step 1200, a remote access link is established between the remote access program guide implemented on remote program guide access device 24 and the interactive television program guide implemented on interactive television program guide equipment 17 using remote access link 19. At step 1210, the remote access program guide provides the user with the opportunity to remotely access functions of the interactive program guide over the remote access link.

The remote access program guide may, for example, obtain a user command from the user that indicates a desired program guide function using remote program guide access device 24 (substep 1265) and then remotely provide the indicated program guide function to the user. A user may indicate a desired function by entering an appropriate command using user interface 52. The user may, for example, enter a command using a keyboard, speak a command into a microphone, select an on-screen button using a pointing device, or any other suitable approach.

The indicated program guide function may be remotely provided to the user audibly (substep 1270) using, for example, a speaker, car stereo, or other device capable of producing sounds that suitably indicate to the user program guide information. Alternatively, the indicated program guide function may be remotely provided to the user visually (at substep 1280), for example, by using a monitor, LCD, or other display device.

Establishing the remote access link between the remote access program guide and the local interactive television program guide implemented on interactive television program guide equipment 17 as indicated by step 1200 and providing the user with an opportunity to remotely access functions of the local interactive television program guide over remote access link 19 (step 1210) may depend on the configuration of the interactive television program guide system. FIGS. 13a-13e show illustrative variations of steps 1200 and 1210 of FIG. 12 for establishing remote access link 19 and for providing the user with remote access to program guide functions for the illustrative systems 10 of FIGS. 2a-2d and FIGS. 6a-6c.

Figure 13A:
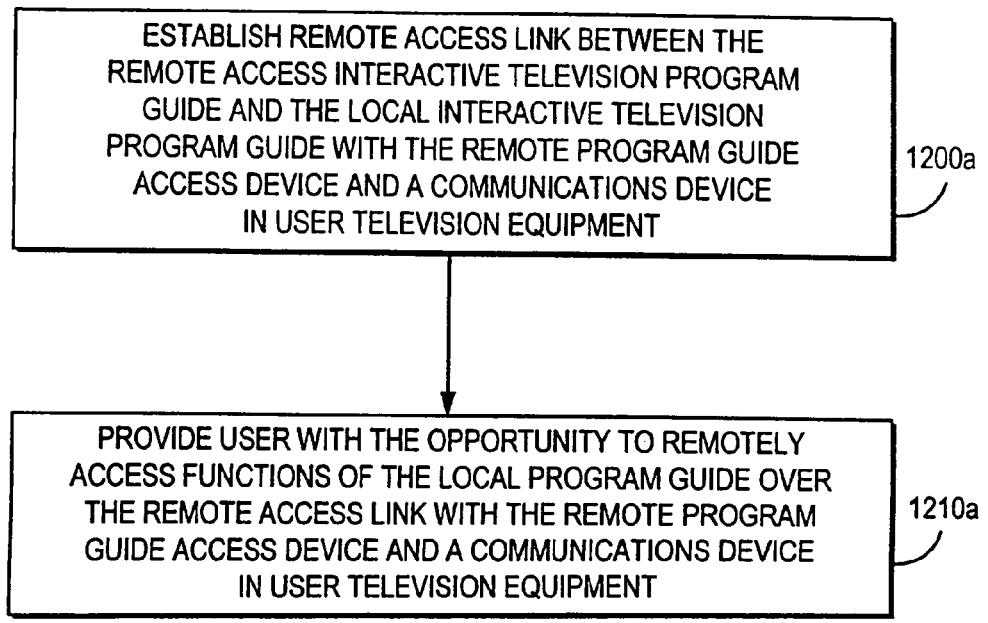
Figure 13B:
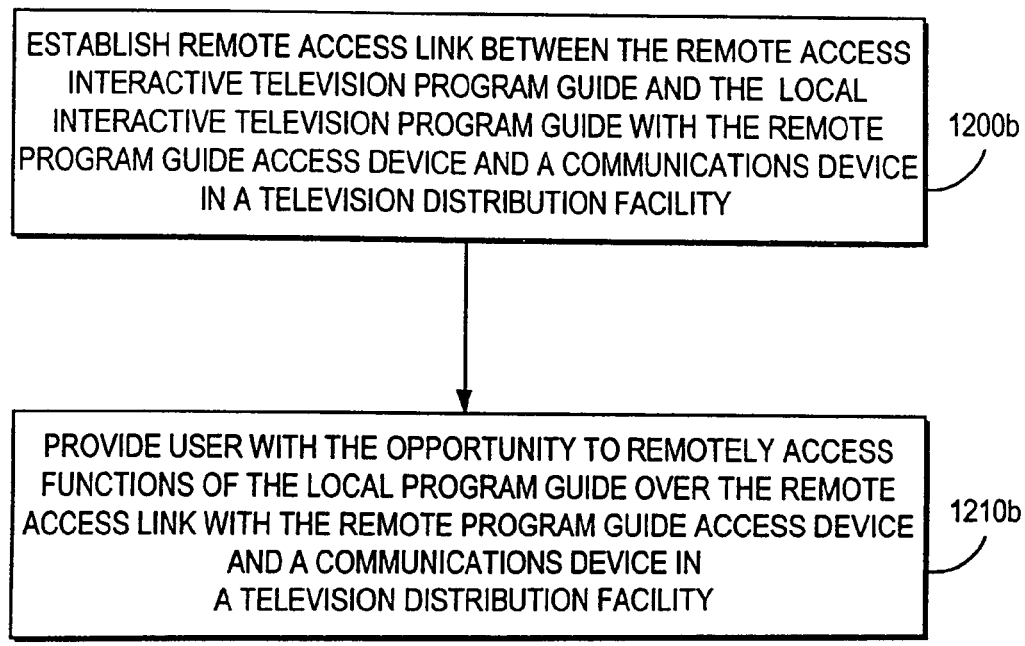

FIG. 13a illustrates steps involved in establishing remote access link 19 and for providing the user with remote access to program guide functions in the systems of FIGS. 2a and 2c. In these systems, remote access link 19 may be established between the remote access program guide and the interactive television program guide via a communications device in user television equipment 22 (Step 1200a). The local interactive television program guide may be wholly implemented on user television 22 as in system 10 of FIG. 2a, or may be partially implemented on user television equipment 22 as, for example, an interactive program guide client, as in system 10 of FIG. 2c. At step 1210a, remote program guide access device 24 may provide the user with the opportunity to remotely access the functions of the local interactive television program guide over the remote access link with a communications device.

Remote access link 19 may be established between the remote access program guide and the interactive television program guide via remote program guide access device 24 and a communications device in television distribution facility 16 or other location for a system configured as shown in FIG. 2d. Providing remote access to the functions of the local interactive television program guide in such a system may, for example, involve the steps shown in FIG. 13b. At step 1200b, for example, remote access link 19 may be established with a communications device in television distribution facility 16. The remote access program guide may, for example, provide the user with the opportunity to remotely access functions of the program guide with a communications device in the television distribution facility 16 at step 1210b.

Figure 13C:
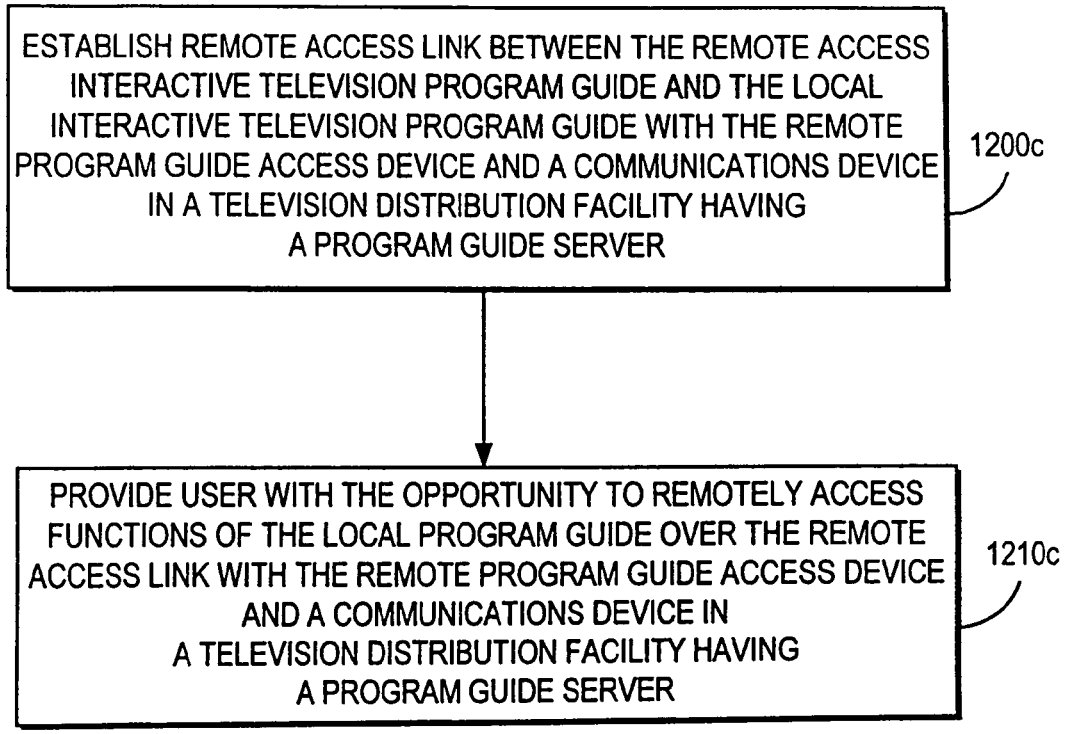

If television distribution facility 16 includes a program guide server as shown in FIG. 2c, remote access link 19 may be established between the remote access program guide and the interactive television program guide via remote program guide access device 24 and a communications device in television distribution facility 16 as indicated by step 1200c of FIG. 13c. At step 1210c remote program guide access device 24 may, for example, provide the user with the opportunity to remotely access the functions of the program guide over remote access link 19 with a communications device in distribution facility 16.

Figure 13D:
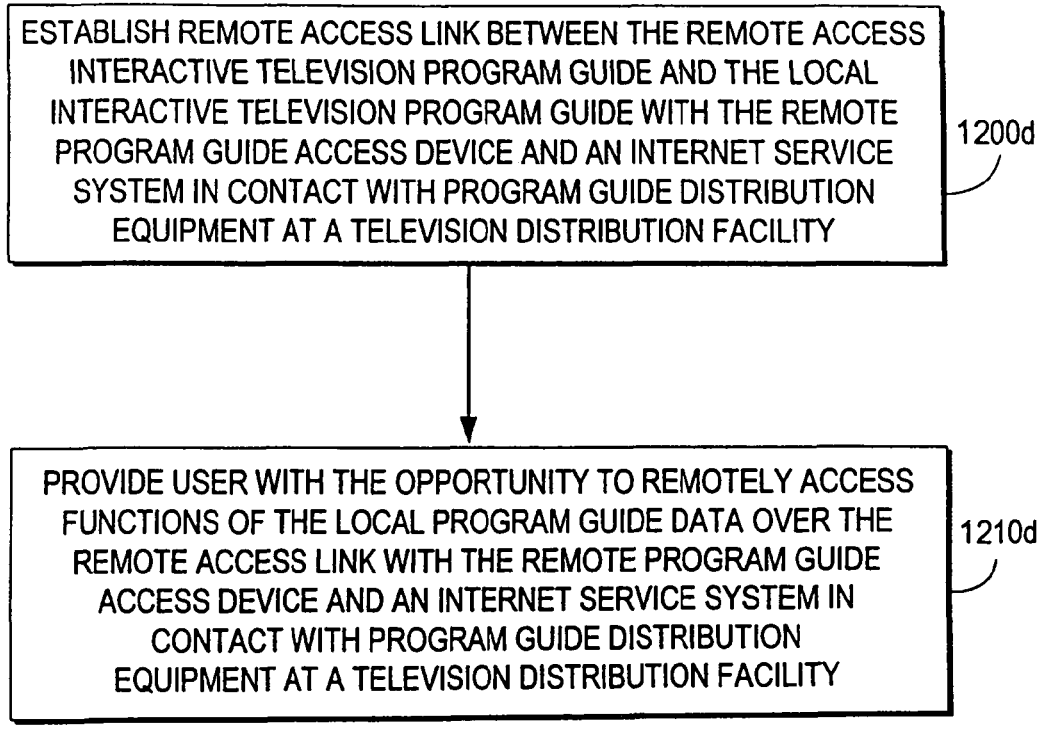
Figure 13E:
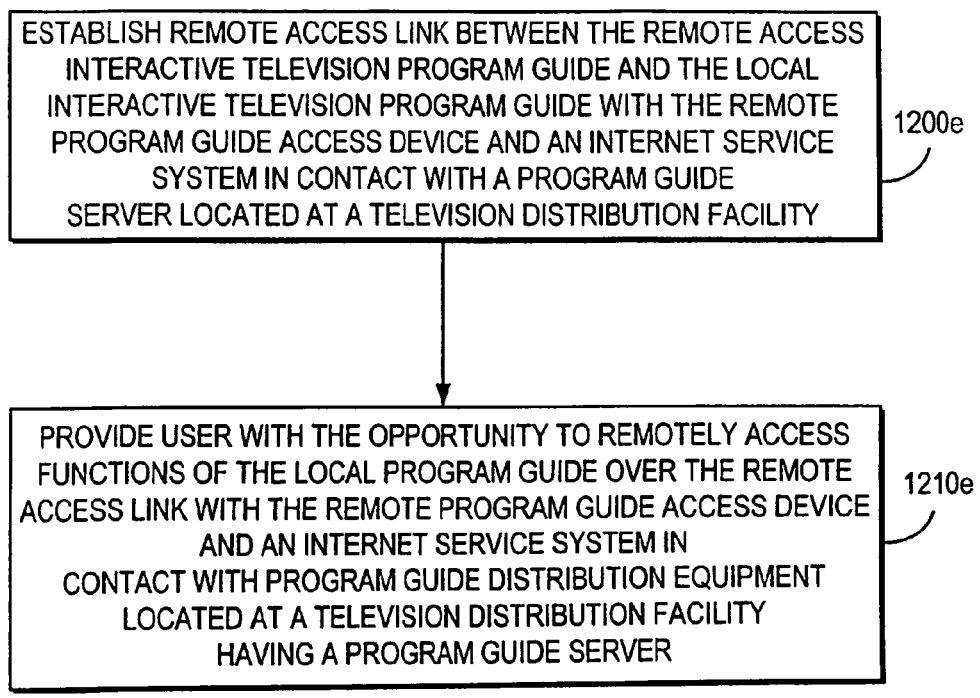

Steps involved in establishing remote access link 19 in on-line program guide systems that communicate with the remote access program guide such as in systems 10 of FIGS. 6a and 6b are shown in FIGS. 13d and 13e. In the on-line program guide system of FIG. 6a, for example, remote access link 19 may be established between the local interactive television program guide and the remote access program guide with Internet service system 61 (step 1200d, FIG. 13d). In the client-server on-line program guide system of FIG. 6b, for example, remote access link 19 may be established between the local interactive television program guide and the remote access program guide with an Internet service system in contact with program guide server 25 (step 1200e, FIG. 13e). The remote access program guide may provide the user with the opportunity to remotely access the functions of the program guide at steps 1210d and 1210e of FIGS. 13d and 13e, respectively.

Figure 14:
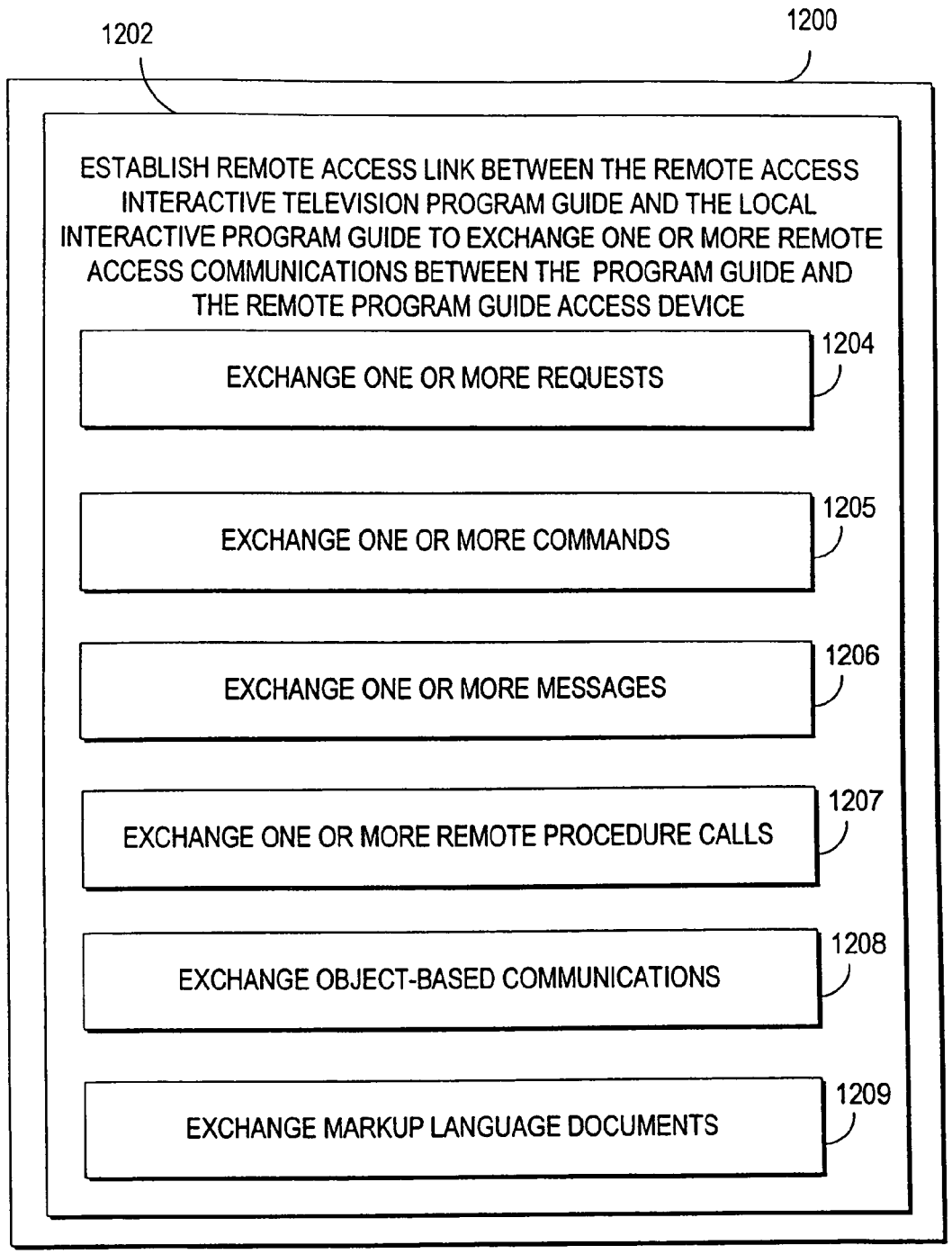

Establishing remote access link 19 at step 1200 of FIG. 12 may also involve exchanging one or more access communications between the interactive television program guide implemented on interactive television program guide equipment 17 and the remote access program guide implemented on remote program guide access device 24, as indicated by substep 1202 of FIG. 14. Access communicators may include any client-server or peer-to-peer communication construct suitable for providing program guide information across remote access link 19. Access communications may include, for example, requests, commands, messages, or remote procedure calls, as indicated by substeps 1204, 1205, 1206, and 1207, respectively.

Access communications may also involve complex communications between application constructs running on remote program guide access device 24 and interactive television program guide equipment 17. Access communications may, for example, be object based, as indicated by substep 1208. Objects running in two program guides, for example, may communicate using an Object Request Broker (ORB). The program guide information may, for example, be encapsulated as component object model (COM) objects and persisted to files that are transmitted over remote access link 19. Access communications may also include, for example, HTML formatted markup language documents (e.g., Web pages), that are exchanged between remote program guide access device 24 and interactive television program guide equipment 17 via Internet service system 61, as indicated by substep 1209.

FIGS. 15-23 are flowcharts of illustrative steps involved in providing remote access to a number of specific program guide functions. Remote access to the functions may be provided in any interactive television program guide system, such as a system 10 having the arrangements of interactive television program guide equipment 17 shown in FIGS. 2a-2d and FIGS. 6a and 6b. The steps shown in FIGS. 12-14 are not shown in the flowcharts of FIGS. 15-23 to avoid over-complicating the drawings, although any suitable combination or combinations of the steps of the flowcharts of FIGS. 12-23 may be used in practice.

Figure 15:
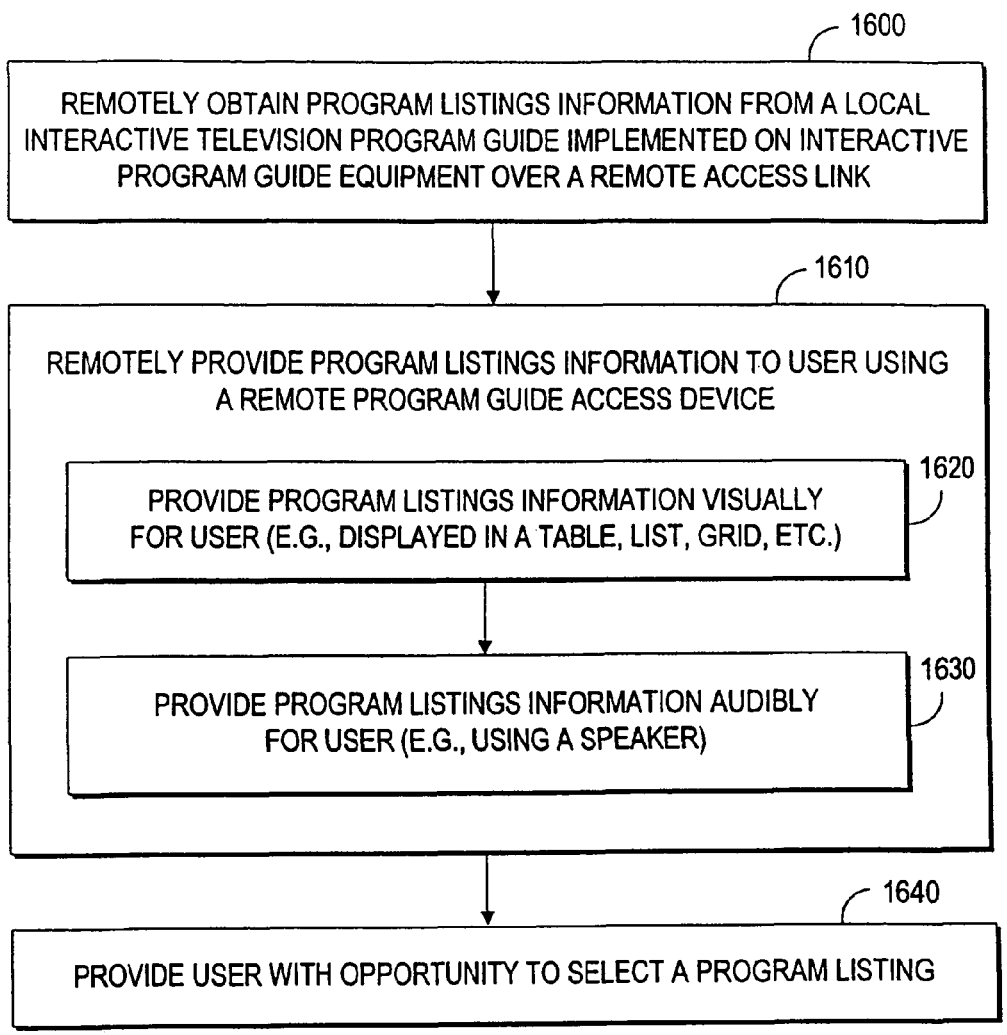

FIG. 15 shows illustrative steps involved in remotely providing program listings information to a user. At step 1600, program listings information is remotely obtained from the local interactive television program guide implemented on interactive television program guide equipment 17 via remote access link 19. The remote access program guide may, for example, obtain this information on startup, periodically, continuously, on demand in response to a suitable user command, or using any other suitable scheme using remote program guide access device 24.

At step 1610, the program listings information may be provided to the user. The program listings information may be displayed for the user by the remote access program guide in a table, listing grid, or other suitable construct, using user interface 52 (substep 1620). Alternatively, program listings information may be provided audibly for the user by using, for example, a speaker (substep 1630).

At step 1640, the remote access program guide may provide the user with the opportunity to select a program listing. In response to such a selection, the remote access program guide may provide the user with the opportunity to access other remote program guide features for the listing (e.g., displays additional info, schedule a program reminder, record, parental control, order the program if it is a pay-per-view program, etc.).

Figure 16:
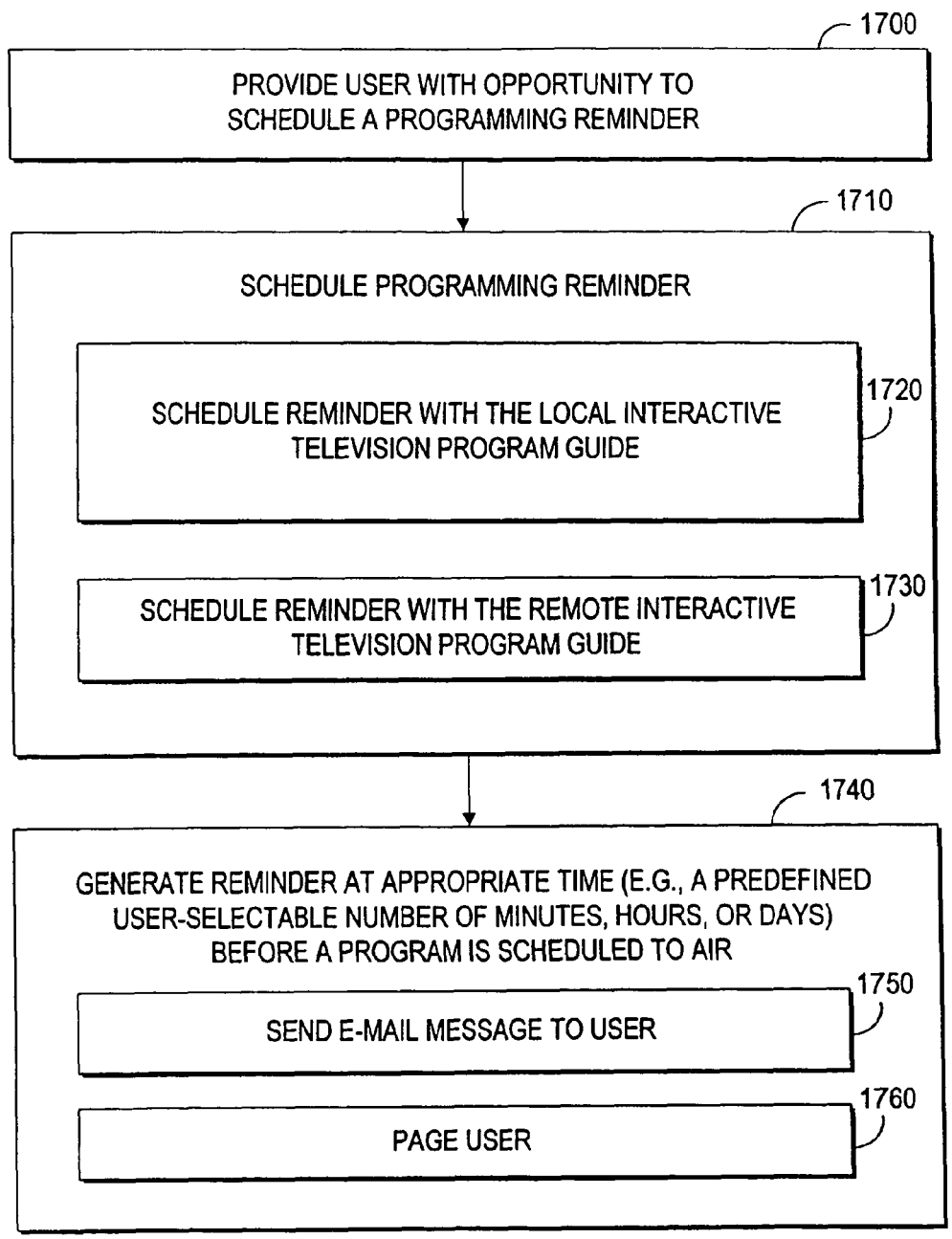

FIG. 16 shows illustrative steps involved in providing the user with remote access to the program reminder feature of a local interactive television program guide. At step 1700, a user is provided with an opportunity to schedule a programming reminder. The user may be provided with an opportunity to remotely schedule a programming reminder with the local guide or with the remote access guide. This opportunity, may, for example, be provided in response to the user selection of a program listing. At step 1710, the program reminder is scheduled by the local guide or the remote access guide. The program reminder may be scheduled with the local interactive television program guide (substep 1720), may be stored by the remote access interactive television program guide (substep 1730), or both.

At step 1740, the program reminder is generated at an appropriate time (e.g., a predefined or user-selectable number of minutes, hours, or days) before a program is scheduled to air. The reminder may be generated by the local interactive television program guide implemented on interactive television program guide equipment 17, or may be generated by the remote interactive television program guide. The program reminder may, for example, be sent to the user via e-mail or alphanumeric page, as indicated by substeps 1750 and 1760 respectively.

Figure 17:
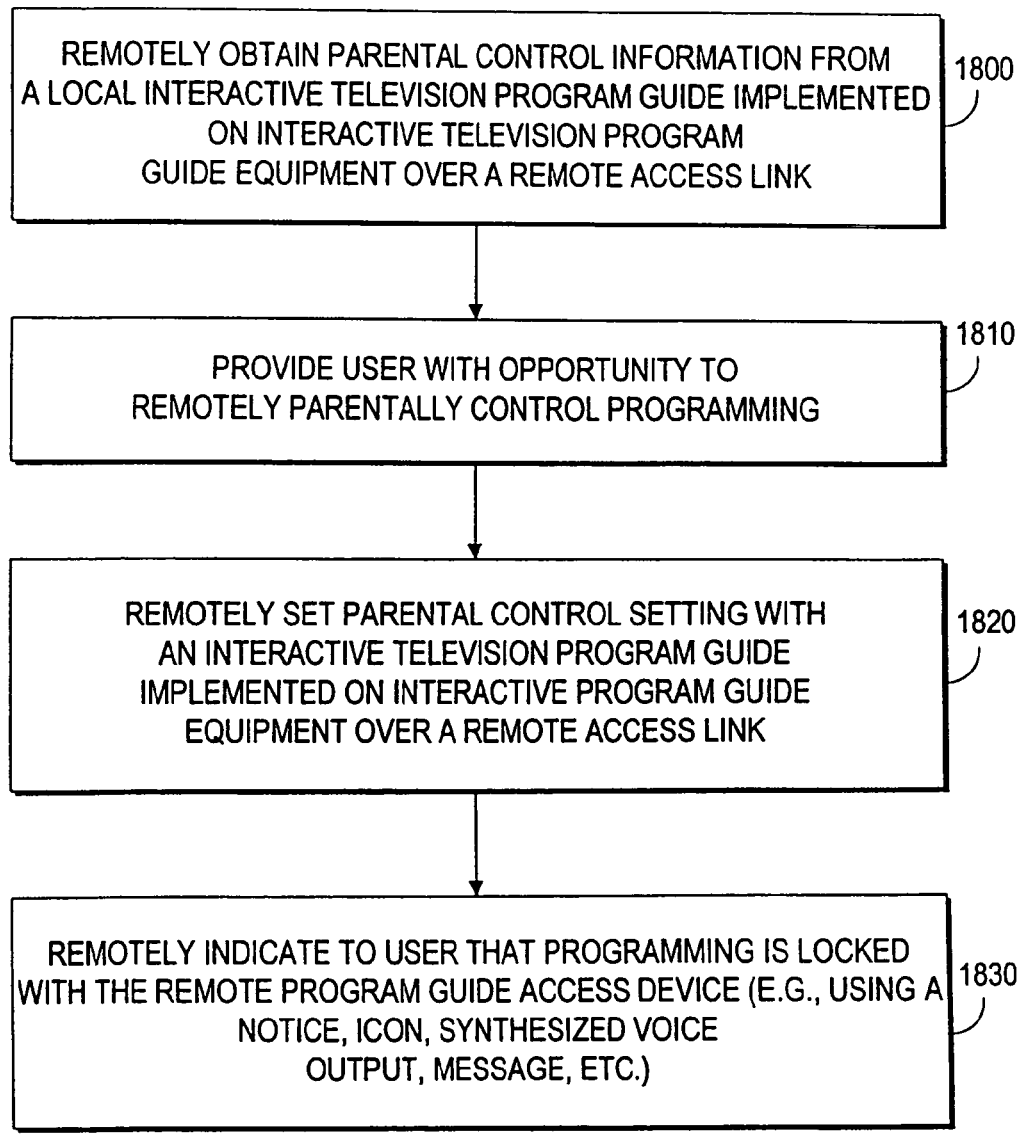

FIG. 17 shows illustrative steps involved in providing a user with remote access to the parental control features of the local interactive television program guide implemented on interactive television program guide equipment 17. At step 1800, parental control information is remotely obtained. This may occur, for example, on startup, periodically, continuously, on demand in response to a suitable user command, or using any other suitable scheme.

The remote access program guide may provide the user with the opportunity to parentally control programming (e.g., by program, channel, theme, time, etc.) in any suitable manner (step 1810). At step 1820, the remote access program guide remotely sets a parental control setting with the interactive television program guide via remote access link 19. Remote program guide access device 24 may use, for example, one or more access communications sent over remote access link 19 to exchange the parental control settings with interactive television program guide 17.

Programming may be locked locally by a user via user television equipment 22, or may have been locked remotely by the remote access program guide. The remote access program guide may indicate to a user that programming is locked (e.g., by program, channel, theme, etc.) with remote program guide access device 24 at step 1830. Remote program guide access device 24 may use, for example, a notice, icon, synthesized voice output, message, or any other suitable indicator.

Figure 18:
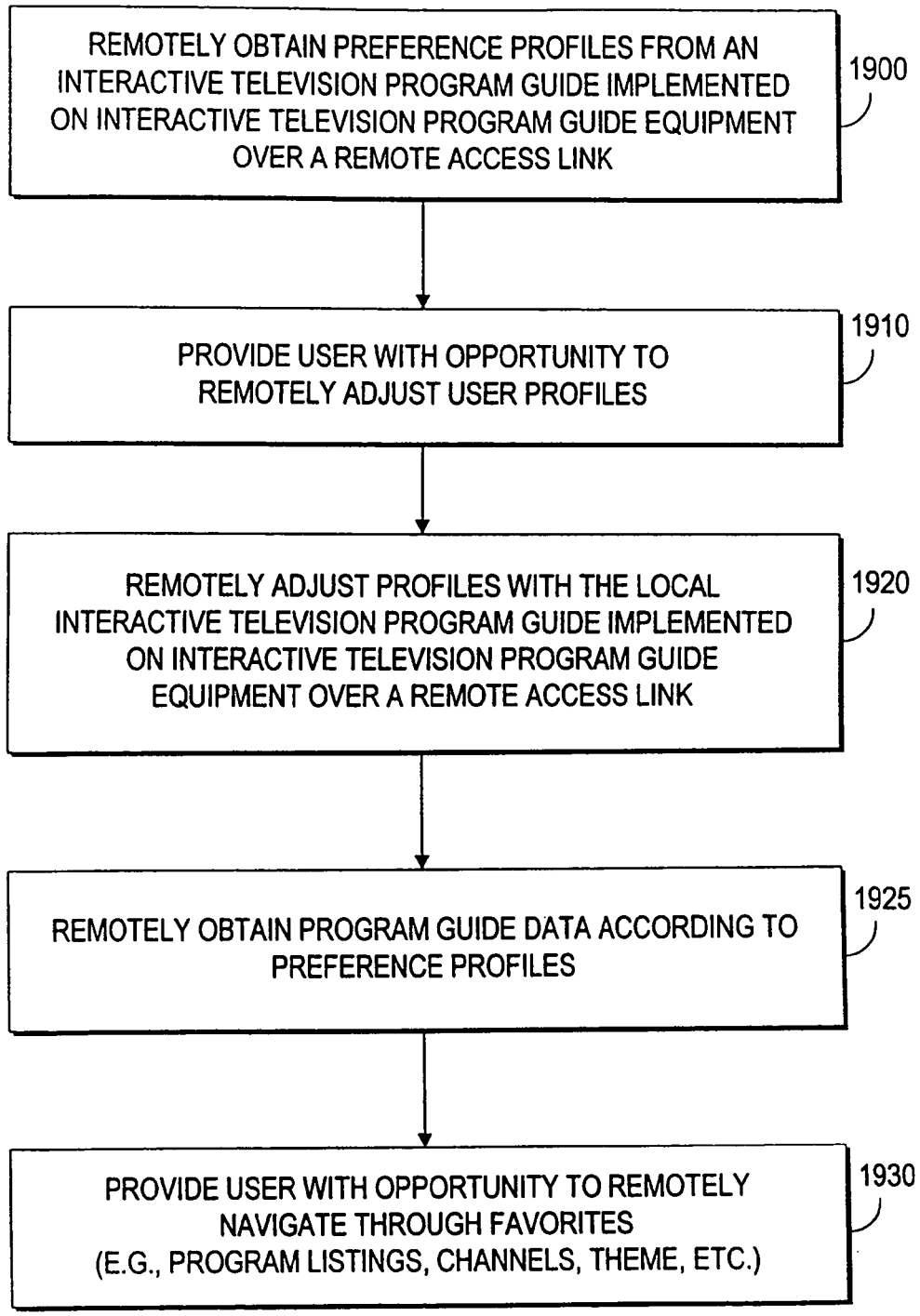

FIG. 18 shows illustrative steps involved in providing a user with remote access to the favorites and user profile functions of the interactive television program guide implemented on interactive television program guide equipment 17. At step 1900, user preference profiles are remotely obtained from the local interactive television program guide by the remote access interactive television program guide via remote access link 19. The information or profiles may be obtained, for example, on startup, periodically, continuously, on demand in response to a suitable user command, or using any other suitable scheme.

The remote access program guide may provide the user with the opportunity remotely adjust user profiles (step 1910). The user may, for example, add or delete favorite channels, themes, indicate likes or dislikes, etc. At step 1920, the remote access program guide remotely adjusts user profiles with the local interactive television program guide. This may be accomplished by, for example, remote program access device 24 exchanging one or more access communications with interactive television guide equipment 17 via remote access link 19. The one or more access communications may indicate one or more user profiles or favorites information. At step 1925, the remote program guide obtains program guide data according to the preference profiles.

At step 1930, remote program guide access device 24 may provide the user with the opportunity to remotely navigate through favorites. Remote program guide access device 24 may, for example, have obtained program listings information (step 1600, FIG. 15), sorted the information according to the favorites information, and displayed only listings for a favorite channel or theme. Alternatively, remote program guide access device 24 may, for example, display television program listings in a grid, table, or list while highlighting favorite channels. A user may be provided with the opportunity to "jump" between favorite listings or channels by issuing an appropriate command using user interface 52.

Figure 19:
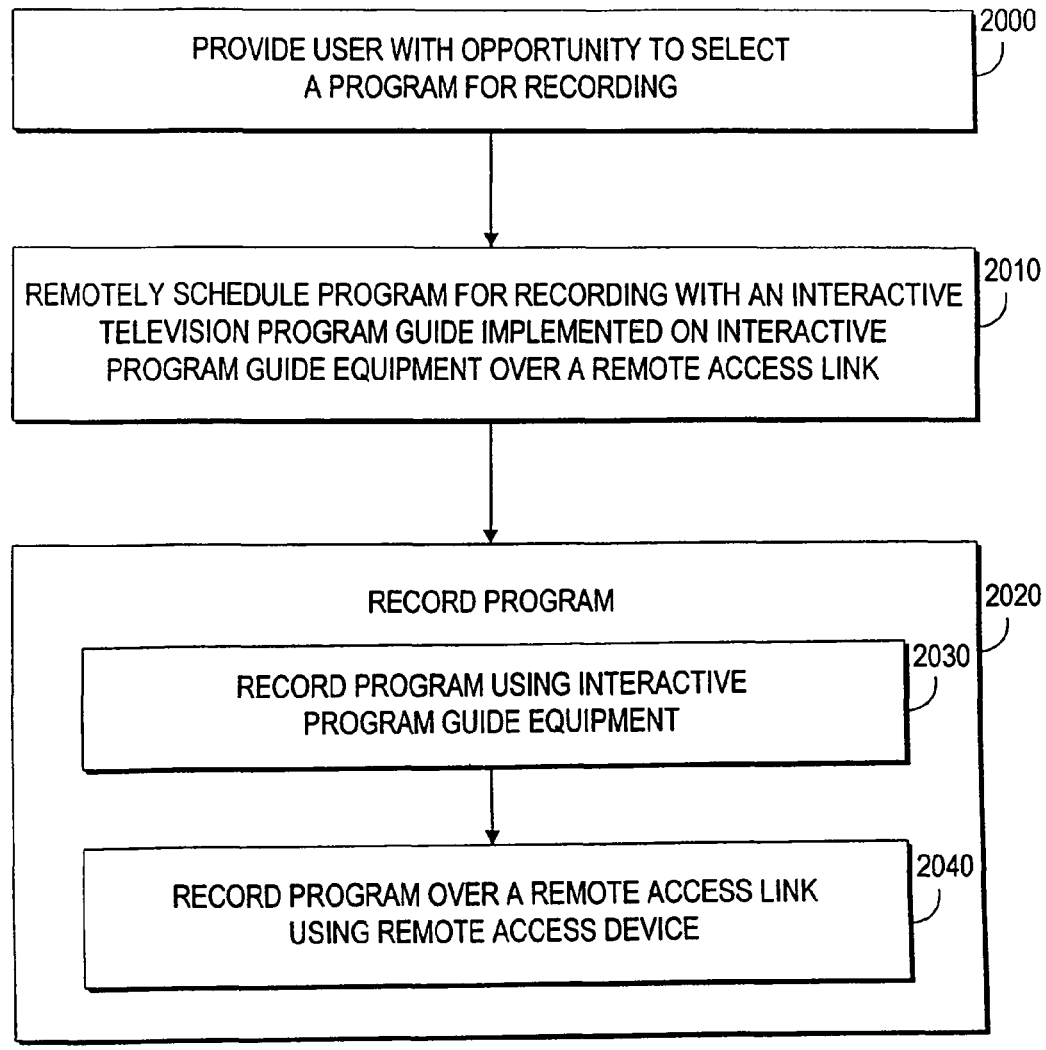

FIG. 19 shows illustrative steps involved in providing a user with remote access to program recording. At step 2000, the remote access program guide provides the user with the opportunity to select a program for recording. This opportunity may be provided in response to the user indicating a desire to record programming by, for example, selecting a program listing (step 1640, FIG. 15) and issuing a suitable command. In response, the remote access program guide remotely schedules the program for recording with the local interactive television program guide implemented on interactive television program guide equipment 17 (step 2000). Remote program guide access device 24 may exchange, for example, one or more access communications with interactive television program guide equipment 17 that are sent over remote access link 19.

At an appropriate time, the program is recorded (step 2020). As indicated by substeps 2030 and 2040, the program may be recorded by the local interactive program guide on interactive television program guide equipment 17 (e.g., digital storage device 31 or secondary storage device 32 of user television equipment 22 (FIG. 3), or on program guide server 25, or may be recorded, by remote program guide access device 24 on storage 56 (FIG. 5) or program guide server 25. If the program is recorded by remote program guide access device 24, the programming may, for example, be digitized and transmitted as a MPEG-2 data stream over remote access link 19 using access communications.

Figure 20:
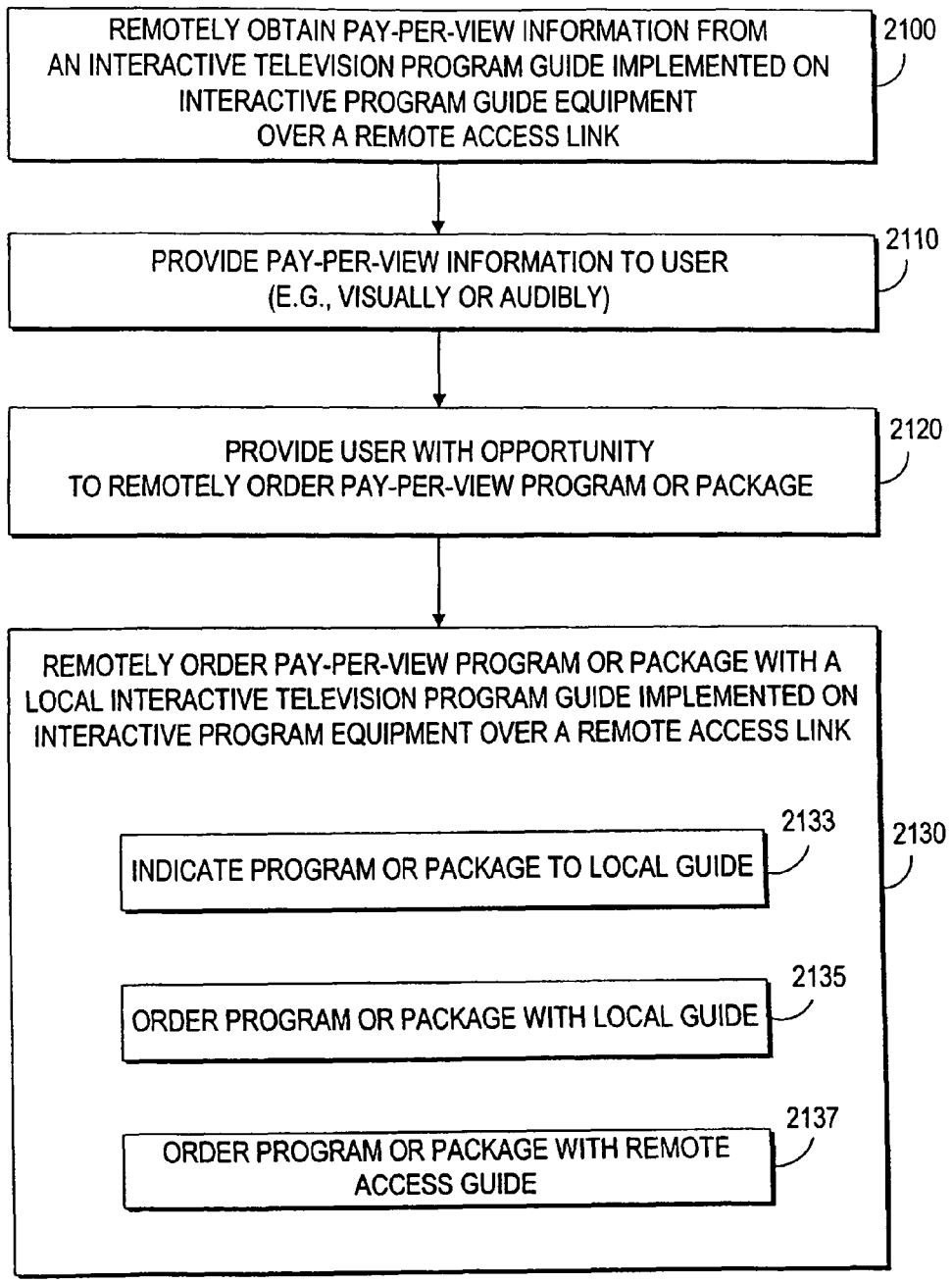

FIG. 20 shows illustrative steps involved in providing the user with remote access to remotely order pay-per-view programs and packages using the local interactive television program guide implemented on interactive television program guide equipment 17. At step 2100, the remote access program guide obtains pay-per-view information (e.g., price, ordering information, time, event code, selections in a package, etc.), from the interactive program guide implemented on interactive television program guide equipment 17 via remote access link 19. The pay-per-view information may be obtained on startup, periodically, continuously, on demand in response to a suitable user command, or using any other suitable scheme. The pay-per-view information is provided to the user by the remote access program guide using user interface 52 of remote program guide access device 24 in any suitable fashion (step 2110).

At step 2120, the remote access program guide provides the user with the opportunity to remotely order a pay-per-view program or package. This opportunity may be provided, for example, in response to the user selecting a pay-per-view program listing or package listing (e.g., step 1640, FIG. 15). At step 2130, the remote access program guide remotely orders the pay-per-view program or package by indicating the program or package to the local interactive television program guide by, for example, exchanging one or more access communications over remote access link 19 (step 2133). The access communications may contain the pay-per-view information for the selected pay-per-view program or package. The local guide may order the program or package at step 2135. Alternately, the remote access program guide may order the pay-per-view program (step 2137).

The way in which the remote access program guide orders the pay-per-view program using the local interactive television program guide may depend on the configuration of the system. If the system is configured as shown in FIGS. 2a and 2c, the remote access program guide may, for example, provide the pay-per-view information to the interactive television program guide implemented at least partially on user television equipment 22. The interactive television program guide may, in turn, order the pay-per-view program with television distribution facility 16. If the system is configured as shown in FIGS. 2b and 2d, the remote access program guide may, for example, provide the pay-per-view information to the interactive television program guide via separate communications device 27. If the system is configured as shown in FIGS. 6a and 6b, the remote access program guide may provide the pay-per-view information via Internet service system 61.

Figure 21:
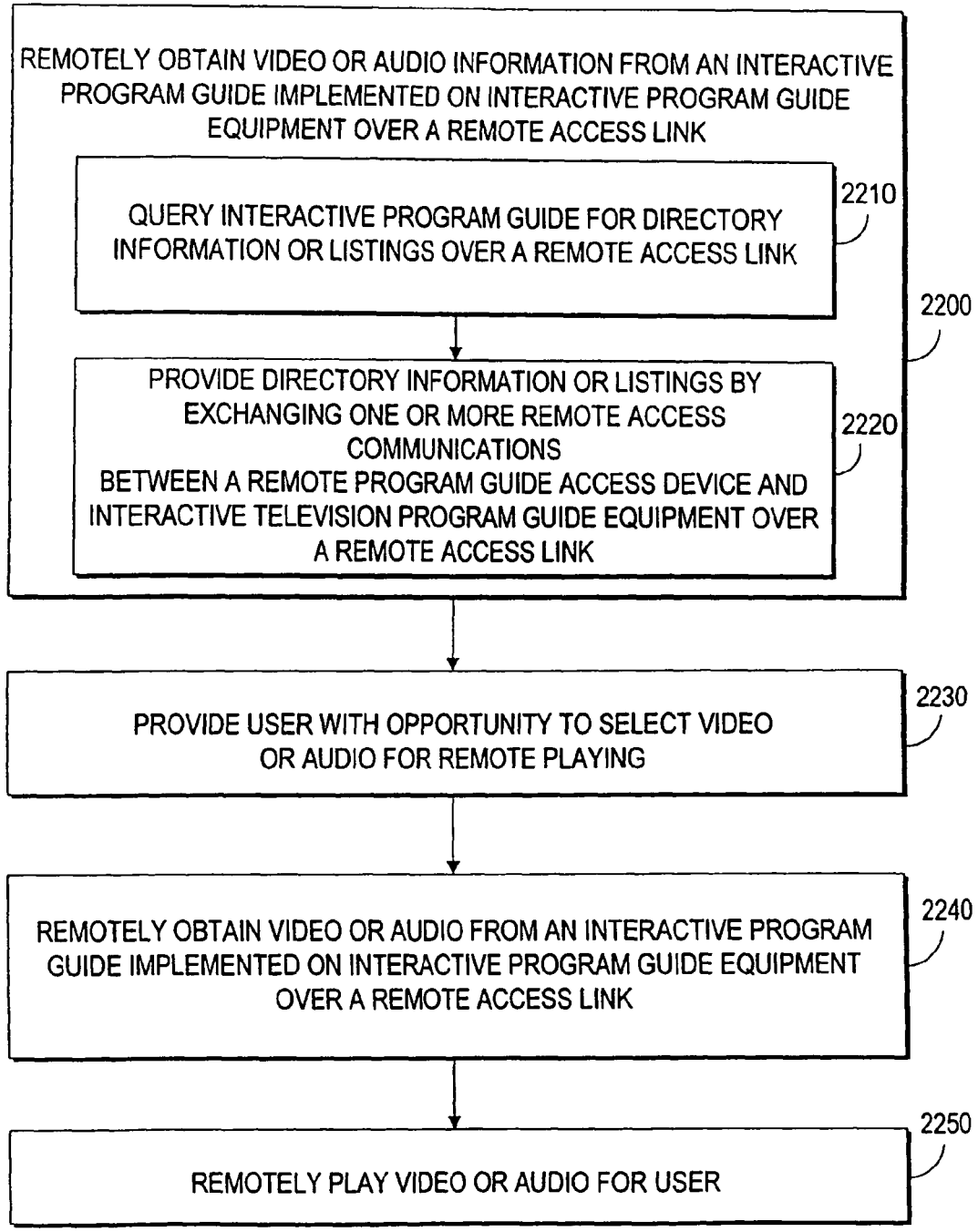

FIG. 21 shows illustrative steps involved in providing a user with access to remotely-played video or audio. At step 2200, the remote access program guide may obtain video or audio information from the interactive television program guide implemented on interactive television program guide equipment 17 via remote access link 19. This may occur, for example, in response to the user selecting a video or audio listing displayed by remote program guide access device 24.

Substeps 2210 and 2220 show illustrative steps involved in obtaining directory information used in providing a user with audio and video information. The remote access program guide may query the local interactive television program guide implemented on interactive television program guide equipment 17 for directory information using one or more access communications that are sent over remote access link 19 (step 2210). The directory information may be contained, for example, in a media library directory for a media library that is stored on user television equipment 22, or by television distribution facility 16. The directory information may be provided back to the remote access program guide by exchanging one or more remote access communications between interactive television program guide equipment 17 and remote program guide access device 24 over remote access link 19, as is indicated by substep 2220. Step 2210 may be skipped and step 2220 performed when, for example, directory information or listings are provided to the remote access guide ahead of time.

At step 2230, the remote access program guide may provide the user with the opportunity to select a video or audio for remote playing. The user may select a video or audio by, for example, selecting a listing that is indicated to the user by user interface 52. The user may be provided with an opportunity to play a program in real-time via the local and remote guides, or to play a stored program. In response, the remote access program guide may obtain the selected video or audio from the local interactive television program guide using access communications that are sent over remote access link 19. The access communications may contain the video or audio in a suitable analog or digital format. At step 2250, remote program guide access device 24 remotely plays the video or audio for the user using user interface 52. Selected video may be displayed, for example, on a suitable monitor, LCD, or other suitable display device. Selected audio may be played for the user using any suitable speaker. Audio may, for example, be played by a car stereo if remote program guide access device 24 is an automobile PC.

Figure 22:
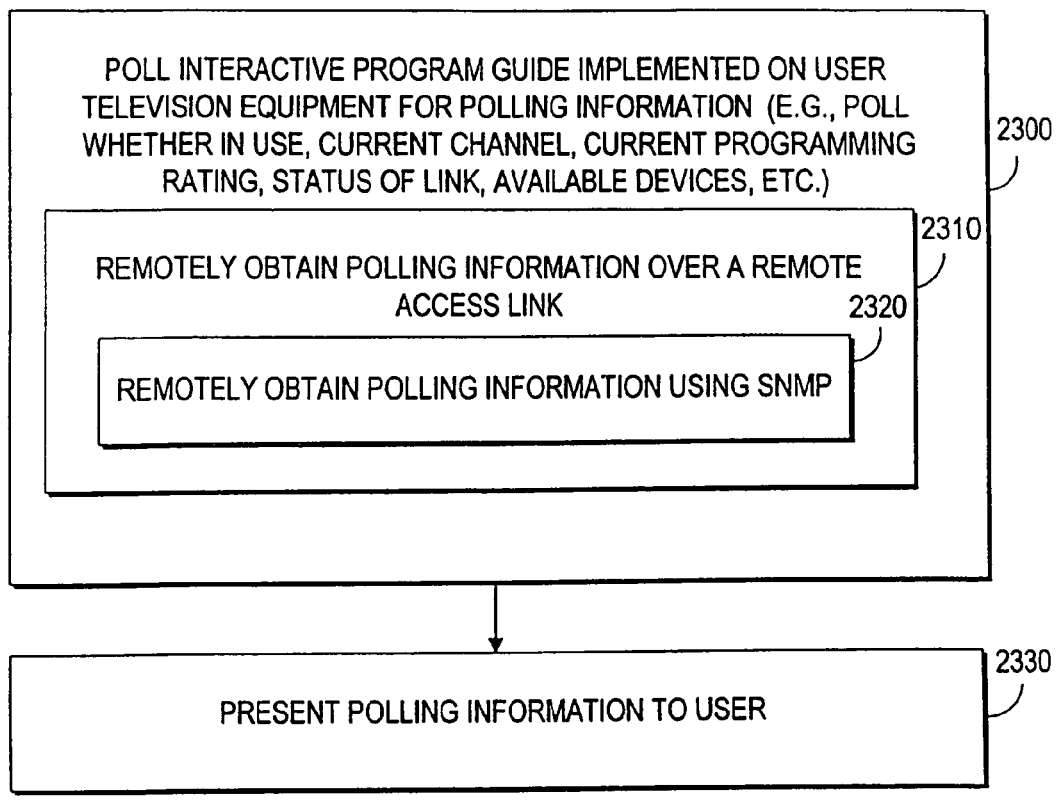

FIG. 22 shows illustrative steps involved in providing the user with the opportunity to remotely poll the local interactive television program guide implemented on interactive television program guide equipment 17. At step 2300, the remote access program guide may poll the interactive television program guide for polling information. The polling information may indicate, for example, whether user television equipment 22 is in use, the current channel user television equipment 22 is tuned to, the current programming rating, current program title, the status of remote access link 19 or communications paths 20, the available devices of user television equipment 22, or any other status related information.

Step 2300 may include substeps 2310 and 2320 for obtaining the polling information. At substep 2310, remote program guide access device 24 may obtain the polling information. Polling information may be obtained on startup, periodically, continuously, on demand in response to a suitable user command, or using any other suitable scheme. More particularly, status information may be obtained using SNMP (substep 2320), if desired. If SNMP is used to obtain polling information, for example, the access communications may include commands and protocol data units (PDUs). Other suitable network management protocols may also be used. At step 2330, remote program guide access device 24 may present the polling information to the user in any suitable method. The polling information may be displayed, for example, in a status display screen such as status display screen 200 of FIG. 11. Polling information may, for example, be output to the user via synthesized voice outputs that are played using a speaker and voice synthesis hardware and software.

Figure 23:
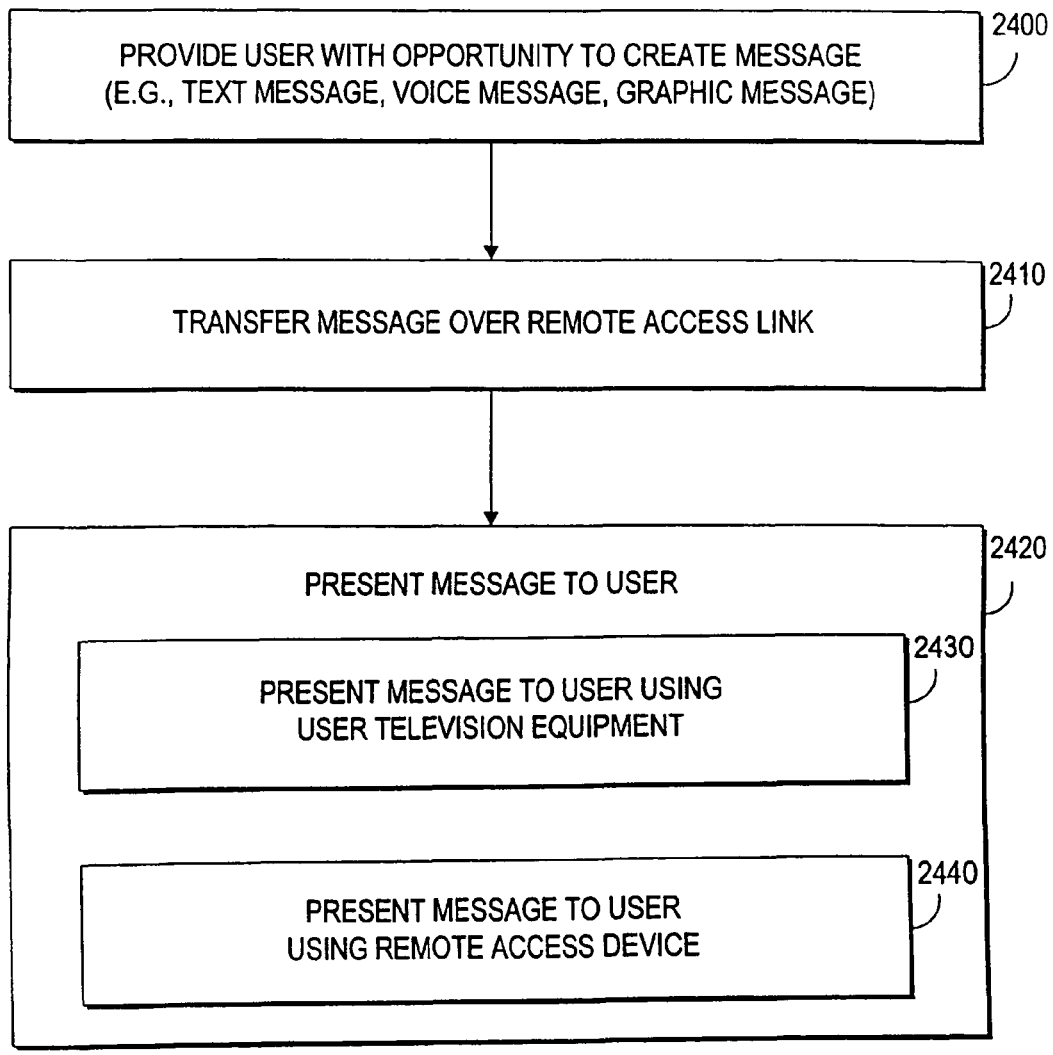

FIG. 23 shows illustrative steps involved in providing the user with the opportunity to create messages and send them between the local interactive television program guide implemented on interactive television program guide equipment 17 and the remote access program guide. At step 2400, the user is provided with the opportunity to create a message. The user may create the message with the local interactive television program guide using, for example, user interface 46 of user television equipment 22 (FIG. 4), or the user may create the message using user interface 52 of remote program guide access device 24.

The message may include any suitable text, graphics, or audio. The user may, for example, speak an audio message into a microphone. The audio message may be digitized and stored in an access communication for transfer over remote access link 19. Alternatively, the user may input a text message using a suitable text input device (e.g., a keyboard). However the message is created and whatever its content, the message is transferred over remote access link 19 using one or more access communications. The message may be transferred from the interactive television program guide to the remote access program guide, or from the remote access program guide to the local interactive television program guide, depending on where the message was created and its intended destination. At step 2410, the message may be presented to the user by user television equipment 22 (e.g., substep 2430), or by remote program guide access device 24 (e.g., substep 2440).

The discussion thus far has focused on implementing the invention with an interactive television program guide. The invention may also be applied to non-program-guide interactive television applications. Local non-program-guide applications run on user television equipment such as a set-top box and corresponding remote access non-program-guide application may run on a remote access device. Interactive television applications may be stand-alone applications, portions of an operating system, or any suitable combination thereof.

Figure 24:
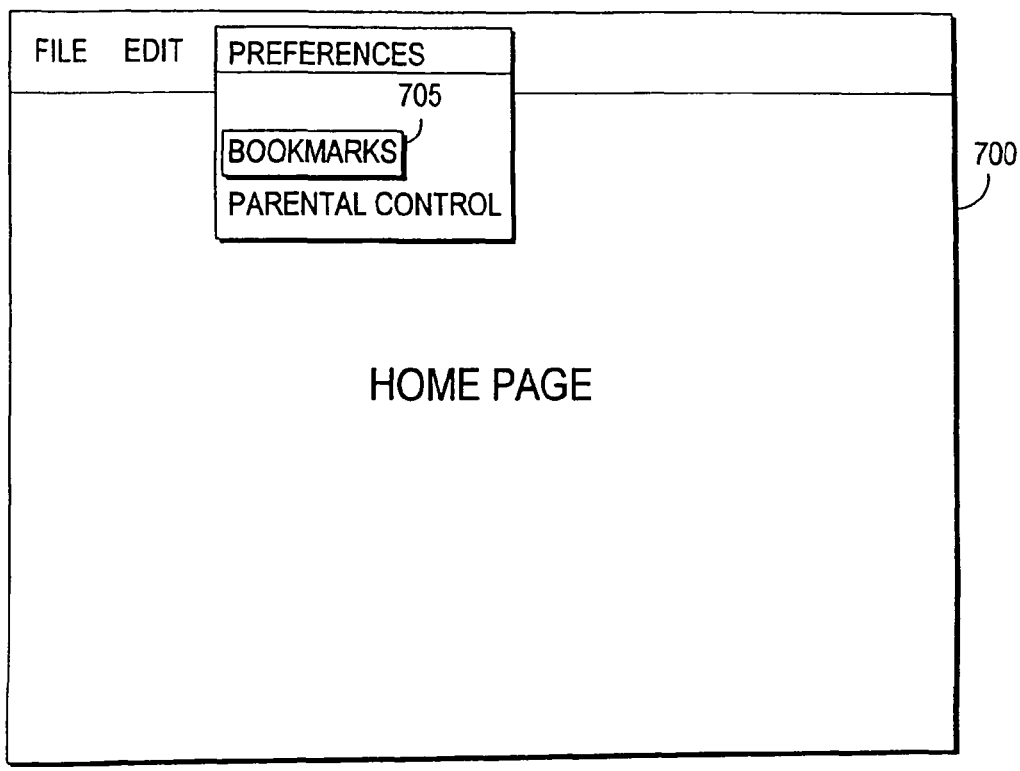
FIG. 24 is an illustrative Internet browser screen for display by a remote access device in accordance with the principles of the present invention.

One non-program-guide application that may be implemented on a set-top box in accordance with the present invention is an Internet browser. An Internet browser may have settings such as bookmarks, parental control settings, and general preferences that control how the browser functions. As shown in FIG. 24, a remote access device may provide the user with access to a browser application by displaying, for example, browser screen 700 of a remote access browser application. Browser screen 799 may have a bookmark option 705. A user may, for example, select bookmark option 705 and add a bookmark (i.e., a record of the address of the current web site that can be used to access the site). After the user adds a bookmark with a remote access Internet browser, the remote access Internet browser may exchange one or more access communications with a local Internet browser to add the bookmark to the local browser.

Figure 25:
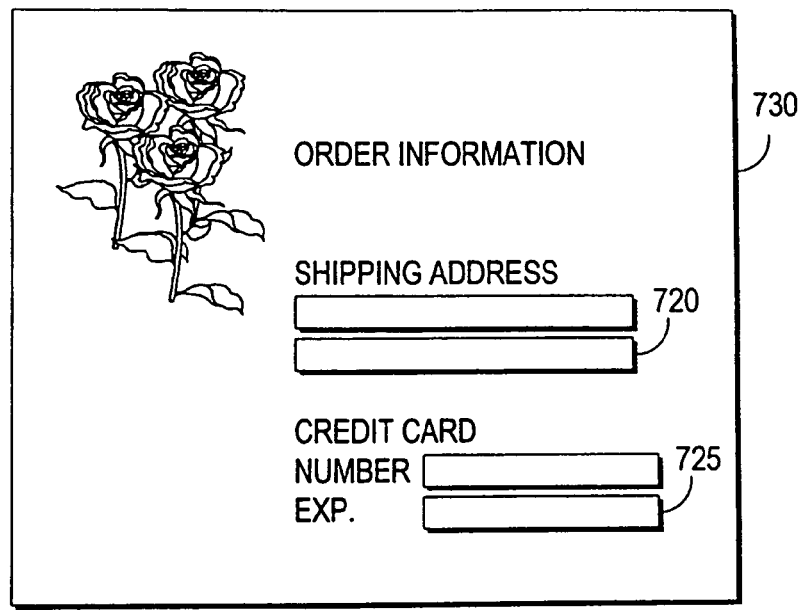
FIG. 25 is an illustrative shopping data entry screen for display by a remote access device in accordance with the principles of the present invention.

Another application that may be implemented or a set-top box in accordance with the present invention is a shopping application. A shopping application may have settings such as a default shipping address and credit card number. As shown in FIG. 25, a remote access shopping application screen 730 may have settings such as a shipping address 720, and credit card number 725. A user may, for example, add a shipping address and credit card information. After a user adds shipping and credit card information with the remote access shopping application, the remote access application may exchange one or more access communications with a local shopping application to provide the information to the local application.

Figure 26:
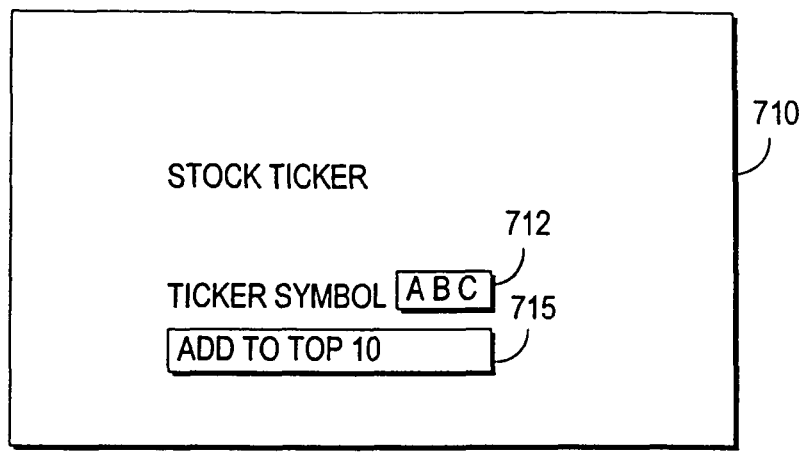
FIG. 26 is an illustrative stock ticker data entry screen for display by a remote access device in accordance with the principles of the present invention.

Another non-program-guide application that may be implemented on a set-top box and accessed via a remote access device in accordance with the present invention is a stock ticker. A stock ticker may have settings such as settings indicating the top ten stocks in which the user is interested. As shown in FIG. 26, a remote access device may display a remote access stock ticker settings screen 710. Stock ticker settings screen 710 may have, for example, ticker symbol 712 and a top ten stocks option 715. A user may, for example, add a top stock. By exchanging one or more access communications, the remote access stock ticker application can make the top ten stock settings effective on a local stock ticker application.

A chat application may be implemented on a set top box. Chat applications are services that allow users to exchange chat messages with other users in real time. A chat application may be implemented as a stand-alone chat application or as part of another application such as a program guide application. Chat applications that may be implemented on user television equipment are described in DeWeese et al. U.S. patent application Ser. No. 09/356,270, filed Jul. 16, 1999, filed concurrently herewith, which is hereby incorporated by reference herein in its entirety. A user may remotely adjust settings associated with a chat application such as the size of a chat window, an address book, or whether to filter potentially offensive messages. After the user adjusts chat settings with a remote access chat application running on a remote access device, the remote access chat application may remotely adjust the settings of a local chat application by, for example, exchanging one or more access communications with the local chat application over a remote access link.

If desired, the settings of an e-mail application running on a set-top box may be adjusted remotely. Set-top based messaging systems are described, for example, in concurrently filed McKissick et al. U.S. patent application Ser. No. 09/356,245, filed Jul. 16, 1999, which is hereby incorporated by reference herein in its entirety. Users may, for example, remotely add to or change an address book. When the user adjusts e-mail settings with a remote access e-mail application running on a remote access device, the remote access e-mail application may remotely adjust the settings of a local e-mail application by, for example, exchanging one ore more access communications with the local e-mail application over a remote access link.

Figure 27:
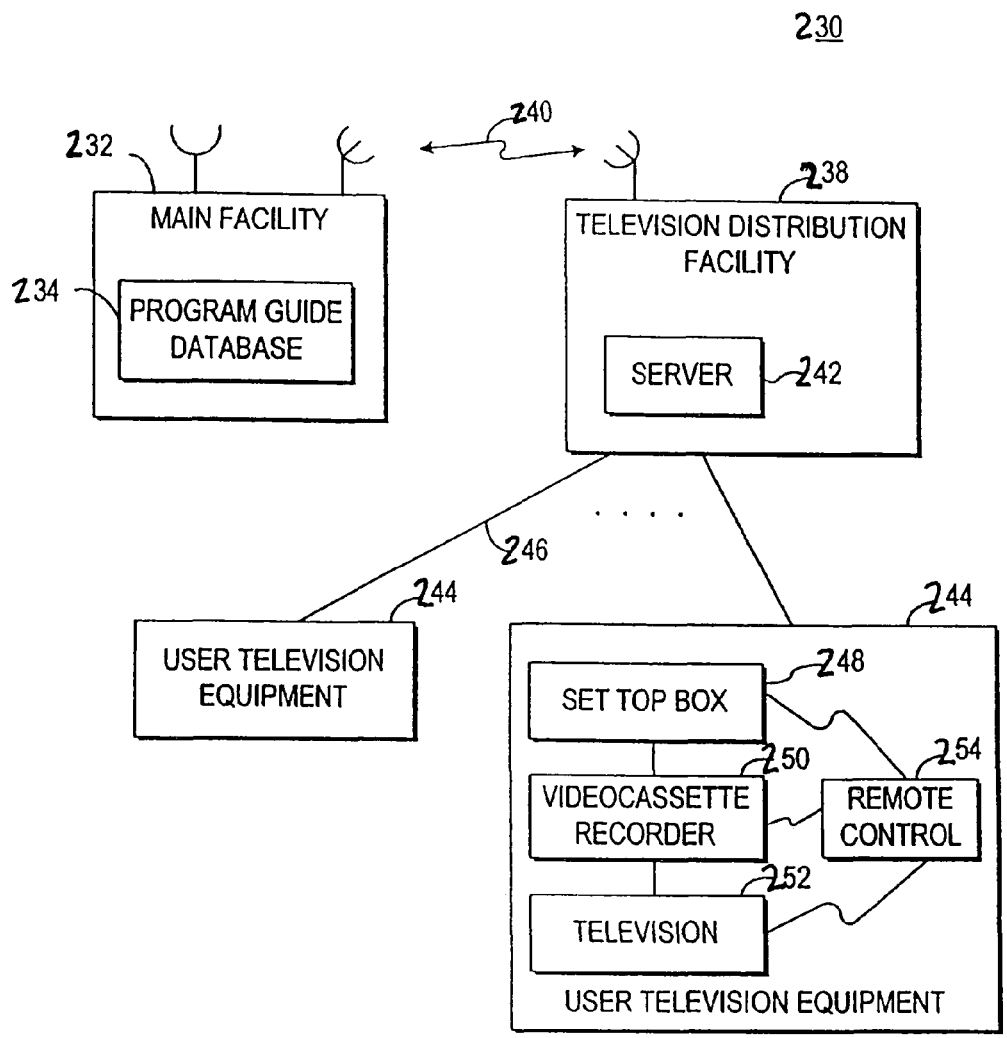
FIG. 27 is a diagram of an interactive television program guide system in accordance with the present invention.

An illustrative program guide system 230 in accordance with the present invention is shown in FIG. 27. Main facility 232 contains a program guide database 234 for storing program guide information such as television program guide program listings data, pay-per-view ordering information, television program promotional information, etc. Information from database 234 may be transmitted to multiple television distribution facilities such as television distribution facility 238 via communications links such as communications link 240. Only one such television distribution facility 238 and one communications link 240 are shown in FIG. 27 to avoid over-complicating the drawings. Link 240 may be a satellite link, a telephone network link, a cable or fiber optic link, a microwave link, a combination of such links, or any other suitable communications path. If it is desired to transmit video signals (e.g., for advertising and promotional videos) over link 240 in addition to data signals, a relatively high bandwidth link such as a satellite link is generally preferable to a relatively low bandwidth link such as a telephone line.

Television distribution facility 238 is a facility for distributing television signals to users, such as a cable system headend, a broadcast distribution facility, or a satellite television distribution facility or the like.

The program guide information transmitted by main facility 232 to television distribution facility 238 includes television program listings data such as program times, channels, titles, descriptions, etc. Transmitted program guide information may also include pay program data such as pricing information for individual programs and subscription channels, time windows for ordering programs and channels, telephone numbers for placing orders that cannot be impulse ordered, etc. If desired, some of the program guide and advertising information may be provided using data sources at facilities other than main facility 232. For example, data related to pay program order processing (e.g., billing data and the like) may be generated by an order processing and billing system that is separate from main facility 232 and separate from television distribution facility 238. Similarly, advertising information may be generated by an advertising facility that is separate from main facility 232 and television distribution facility 238.

A server 242 may be provided in television distribution facility 238 for handling data distribution tasks and for storing local information. If desired, server 242 may be used to implement a client-server based interactive television program guide system. In such a system, client functions may be performed at user television equipment 244. Server 242 may be capable of handling text, graphics, and video.

Television distribution facility 238 distributes program guide and advertising information to the user television equipment 244 of multiple users via communications paths 246. Program guide data and other information may be distributed over an out-of-band channel on paths 246 or using any other suitable distribution technique.

Each user has a receiver, which is typically a set-top box such as set-top box 248, but which may be other suitable television equipment into which circuitry similar to set-top-box circuitry has been integrated. If desired, user television equipment 244 may be an advanced television receiver or a personal computer television (PC/TV). For purposes of illustration, the present invention will generally be described in connection with user television equipment based on a set-top box arrangement. Program guide data may be distributed to set-top boxes 248 periodically and stored or may be distributed continuously and handled "on the fly.", or by request. Television distribution facility 238 may poll set-top boxes 248 periodically for certain information (e.g., pay program account information or information regarding programs that have been purchased and viewed using locally-generated authorization techniques). Main facility 232 preferably contains a processor to handle information distribution tasks. Each set-top box 248 preferably contains a processor to handle tasks associated with implementing a program guide application on the set-top box 248. Television distribution facility 238 may contain a processor for tasks associated with implementing server 242 and for handling tasks associated with the distribution of program guide and other information.

Each set-top box 248 is may connected to an optional videocassette recorder 250 or other suitable recording device (e.g., digital storage device) so that selected television programs may be recorded. Each videocassette recorder 250 may be connected to a television 252. To record a program, set-top box 248 tunes to a particular channel and sends control signals to videocassette recorder 250 (e.g., using an infrared transmitter) that direct videocassette recorder 250 to start and stop recording at the appropriate times.

During use of the interactive television program guide implemented on set-top box 248, television program listings may be displayed on television 252. Each set-top box 248, videocassette recorder 250, and television 252 may be controlled by one or more remote controls 254 or any other suitable user input interface such as a wireless keyboard, mouse, trackball, dedicated set of buttons, etc.

Communications paths 246 preferably have sufficient bandwidth to allow television distribution facility 238 to distribute scheduled television programming, pay programming, advertising and other promotional videos, and other video information to set-top boxes 244 in addition to non-video program guide data. Multiple television and audio channels (analog, digital, or both analog and digital) may be provided to set-top boxes 248 via communications paths 246. If desired, program listings and other information may be distributed by one or more distribution facilities that are similar to but separate from television distribution facility 238 using communications paths that are separate from communications paths 246.

Certain functions such as pay program purchasing may require set-top boxes 248 to transmit data to television distribution facility 238 over communications paths 246. If desired, such data may be transmitted over telephone lines or other separate communications paths. If functions such as these are provided using facilities separate from television distribution facility 238, some of the communications involving set-top boxes 248 may be made directly with the separate facilities.

Figure 28:
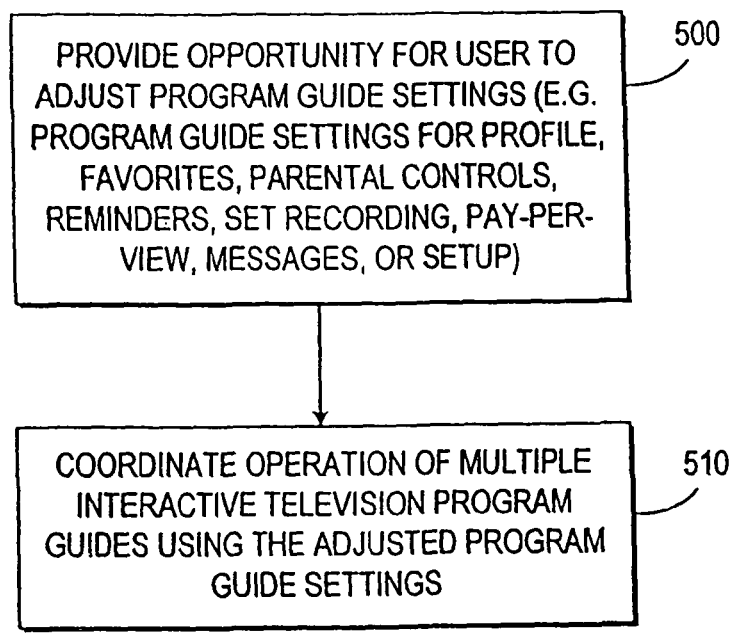
FIG. 28 is a flow chart of steps involved in adjusting user settings and applying those adjustments to desired locations in accordance with the present invention.

The present invention involves the distribution of user program guide settings to multiple program guide locations within a household. Such a household may contain multiple pieces of user television equipment. A program guide may be implemented on each piece of user television equipment. An illustrative process for distributing such settings is shown in FIG. 28. At step 500, a first program guide provides the user with an opportunity to adjust program guide settings (e.g., program guide settings for user profiles, favorites, parental controls, reminders, recording options, pay-per-view options, message options, or other setup functions). At step 510, the system coordinates the operation of the multiple interactive television program guides so that the program guide settings that were adjusted with the first interactive television program guide are effective on a second interactive television program guide and may be used by that second interactive television program guide.

The steps of FIG. 28 are preferably performed using program guides as the program guides implemented on set-top boxes 248 of FIG. 27. Certain program guide functions (particularly the display of graphics or videos) may involve the use of resources located at main facility 232 and television distribution facility 238 and other such facilities. If desired, some of the steps of FIG. 28 may be performed using an application running on set-top boxes 248 other than the interactive program guide. For clarity, the principles of the invention are described in the context of an arrangement in which the set-top-based steps of FIG. 28 are performed primarily using an interactive television program guide.

FIGS. 29, 30a, 30b, 30c, 31, and 32 show various illustrative topologies for configuring multiple program guides within a household.

Figure 29:
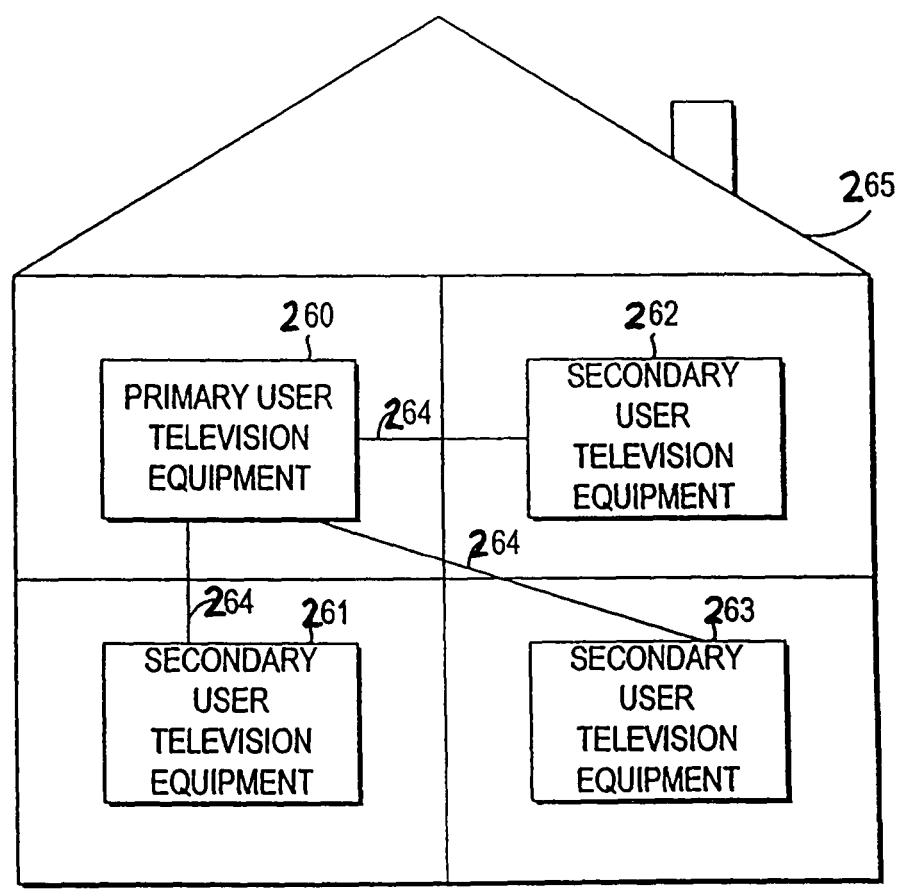
FIG. 29 is a diagram of a system in which multiple interactive television program guides are implemented in a star configuration accordance with the present invention.

FIG. 29 shows an illustrative arrangement for interconnecting various user television equipment devices in accordance with the present invention. Primary user television equipment 260 may be connected to secondary user television equipment 261, secondary user television equipment 262, and secondary user television equipment 263 via communication paths 264. Communications paths 264 may be any suitable communications path for in-home network, such as twisted pair lines, Ethernet links, fiber optics, power lines, radio-frequency (RF) links, infrared (IR) and links other wireless links, firewire (IEEE 1394) paths, dedicated cables, etc. As shown, one or more pieces of secondary user television equipment may be connected to primary user television equipment 260 in a star configuration if desired. User television equipment devices are typically located in different rooms within home 265. For example, primary user television equipment 260 may be placed in the parents' bedroom, secondary user television equipment 261 may be placed in the children's room, secondary user television equipment 262 may be placed in a living room, and secondary user television equipment 263 may be placed in a guest room. With such an arrangement, the parents' bedroom may be used as a master location to adjust user settings for the program guides on the user television equipment in the children's room and the other rooms.

Figure 30A:
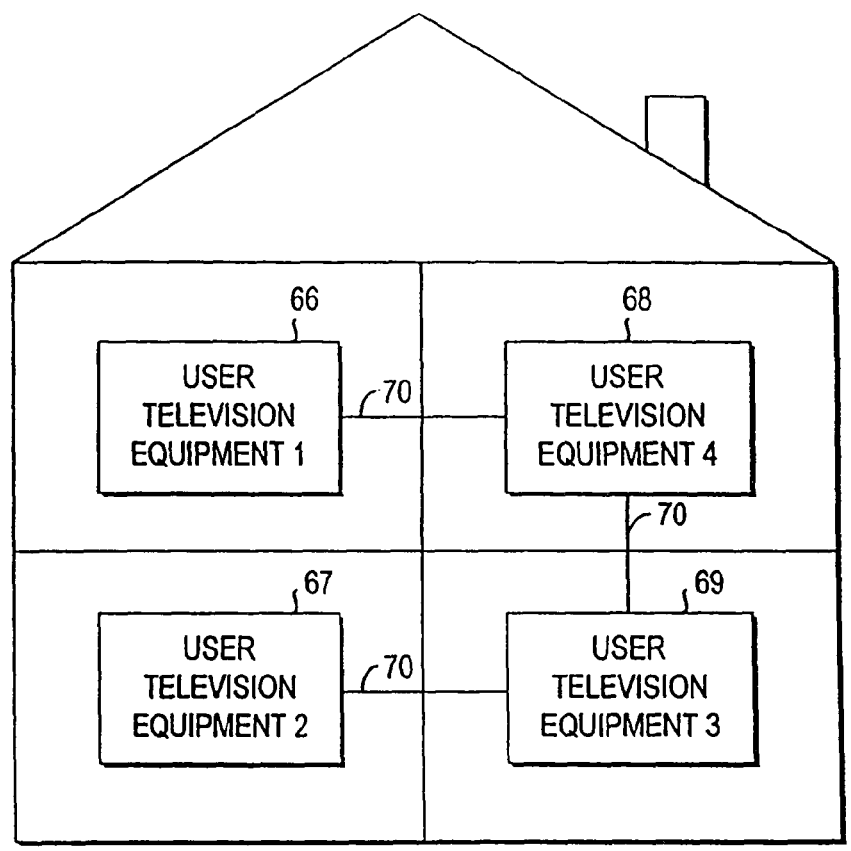
FIG. 30a is a diagram of a system in which multiple interactive television program guides are implemented in a tree configuration in accordance with the present invention.
Figure 30B:
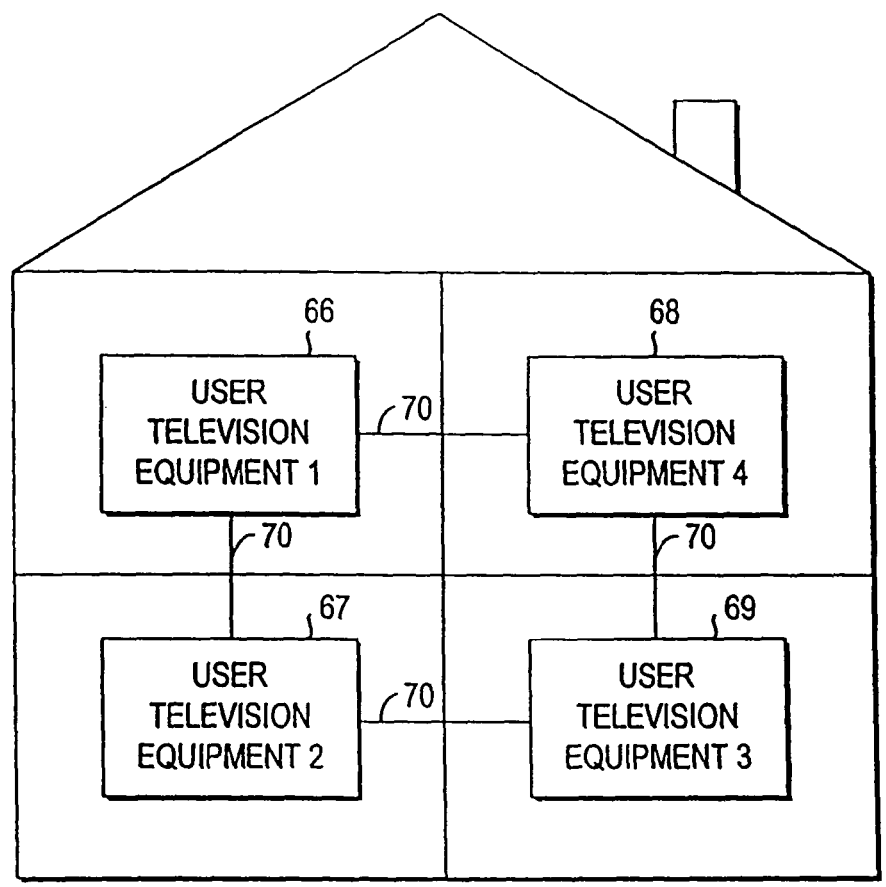
FIG. 30b is a diagram of a system in which multiple interactive television program guides are implemented in a ring configuration in accordance with the present invention.
Figure 30C:
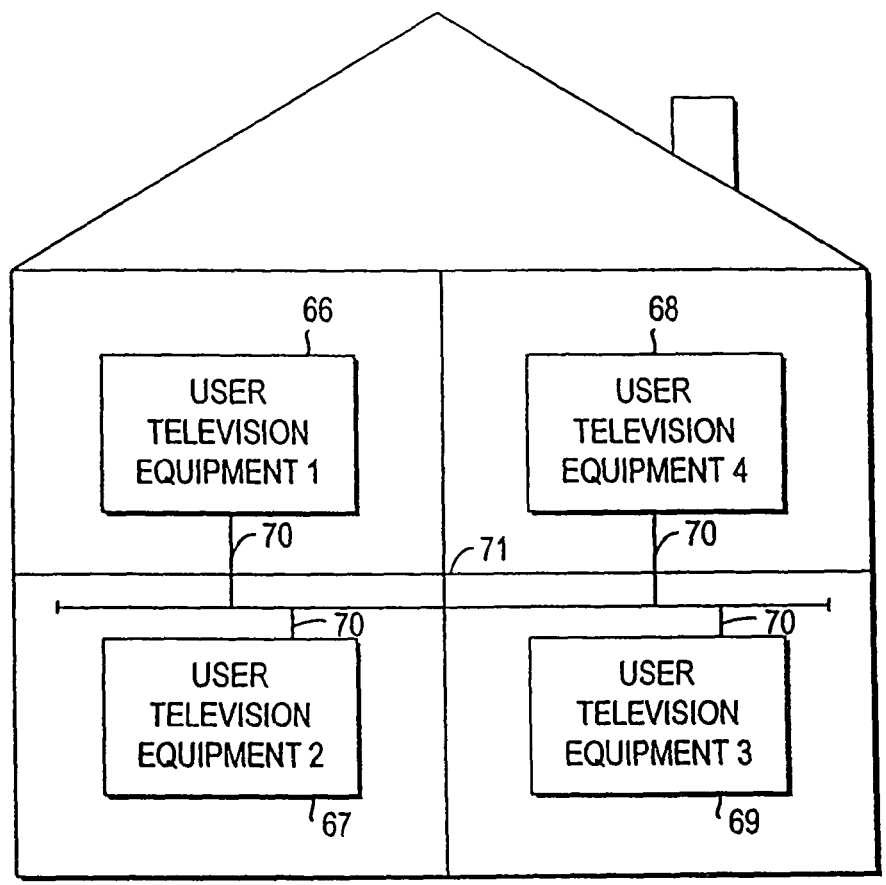
FIG. 30c is a diagram of a system in which multiple interactive television program guides are implemented in a bus configuration in accordance with the present invention.

FIG. 30a shows an illustrative tree configuration in which each piece of user television equipment is interconnected with another along a single path. User television equipment 66, 67, 68, and 69 of FIGS. 30a, 30b and 30c are connected to each of the others via communications paths 70. Communications paths 70 may be any suitable communications path for in-home network, such as twisted pair lines, Ethernet links, fiber optics, power lines, radio-frequency (RF) links, infrared (IR) and links other wireless links, firewire (IEEE 1394) paths, dedicated cables, etc. Two or more pieces of user television equipment may be connected in this way. The equipment mentioned above may be placed in various rooms within home 265. For example, user television equipment 66 may be placed in a parents' bedroom, user television equipment 67 may be placed in a children's room, user television equipment 68 may be placed in a living room, user television equipment 69 may be placed in a guest room. With the arrangement of FIG. 30a, each piece of user television equipment in home 265 may communicate with each other piece of user television equipment in home 265 over communications paths 70. FIG. 30a shows the system connected in a tree topology. If desired, this level of interconnectivity may be achieved using communications paths that are arranged in a ring configuration (FIG. 30b), bus configuration (FIG. 30c) or other suitable topology. Any of these topologies may use the types of communications paths described in connection with the arrangement of FIG. 30a.

Figure 31:
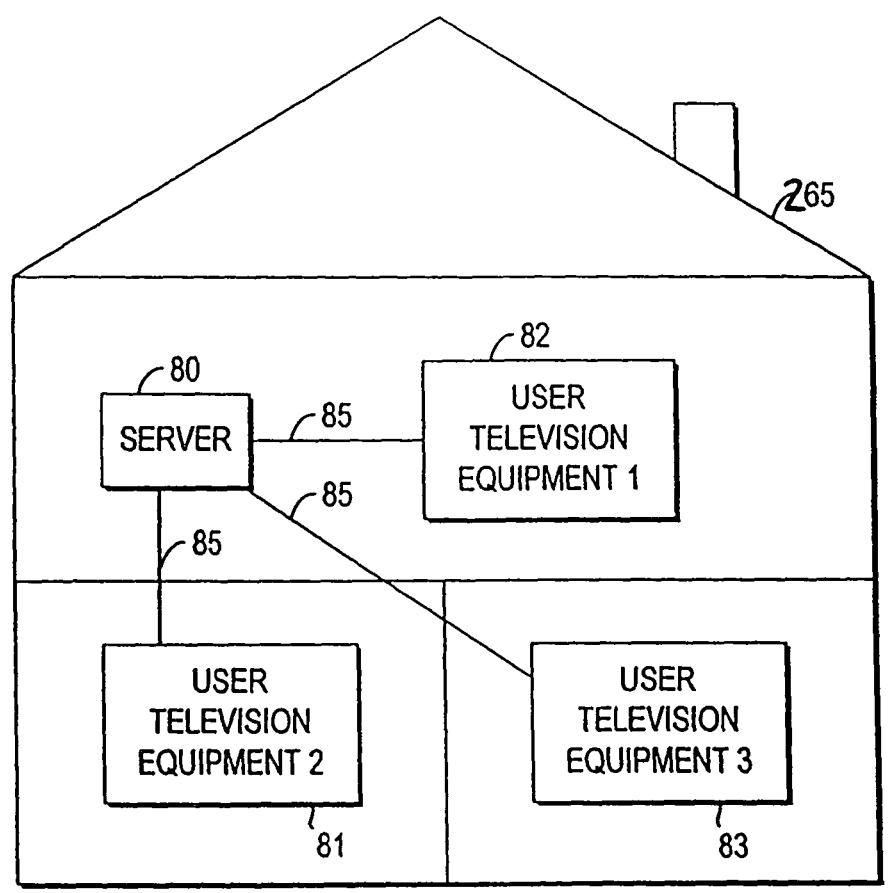
FIG. 31 is a diagram of another system in which multiple interactive television program guides are implemented in a client-server configuration in accordance with the present invention.

FIG. 31 shows an illustrative configuration based on a client-server architecture. Server 80 may be connected to user television equipment 81, 82, and 83 via communication paths 85. Equipment 81, 82, and 83 and server 80 may be placed in various rooms within home 265. For example, server 80 may be placed in a den, user television equipment 81 may be placed in a children's room, user television equipment may be placed in a living room, user television equipment 83 may be placed in a parents' room. Communication paths 85 may be any in-home network suitable to transmit video, audio and data, such as dedicated cable fiber optics, firewire links, RF links, etc. As, in the examples of FIGS. 30a, 30b, and 30c, different communications path arrangements such as buses, rings and the like, may be used to interconnect user television equipment based on a client-server architecture.

Figure 32:
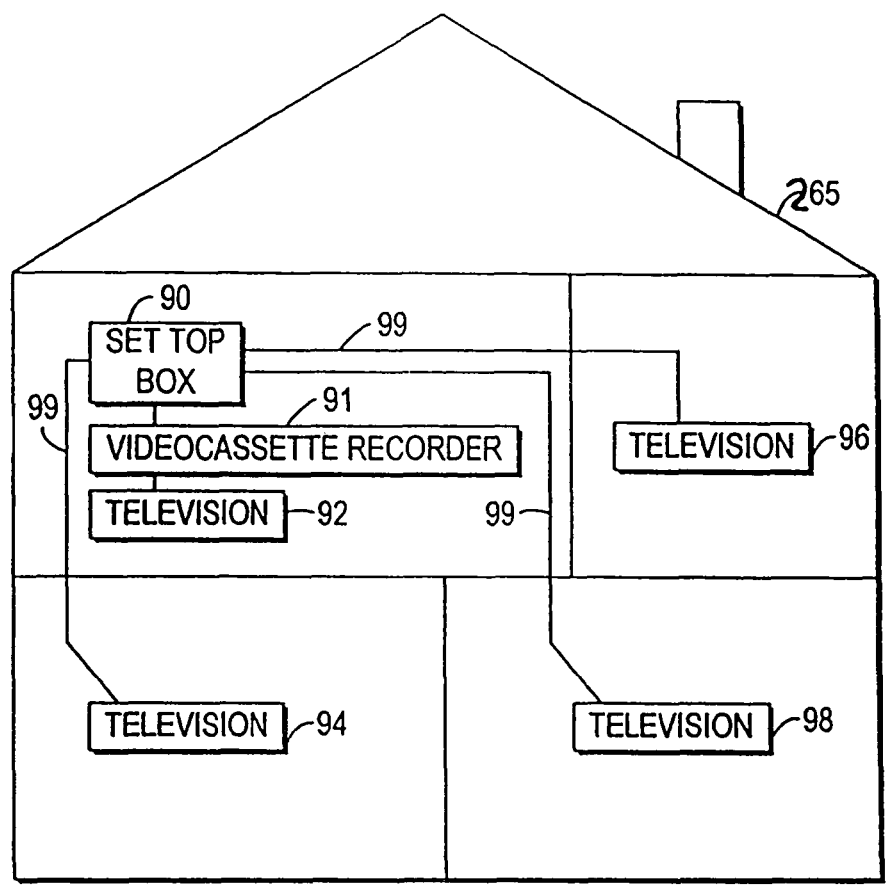
FIG. 32 is a diagram of a system in which multiple interactive television program guides are implemented in a client-server configuration and in which the set-top-box acts as the server in accordance with the present invention.

FIG. 32 shows an illustrative configuration based on a single set-top box. Set-top box 90 is connected to optional videocassette recorders 91 and televisions 94, 96, and 98 via communication paths 99. Optional videocassette recorder 91 is in turn connected to televisions 92. If desired, any combination of televisions with or without videocassette recorders and televisions may be connected in a similar manner. The set-top box, videocassette recorders and televisions of FIG. 32 may be placed in rooms within home 265. For example, set top box 90, videocassette recorder 91 and television 92 may be placed in a parent's bedroom, television 94 may be placed in a children's room, and television 96 may be placed in a living room, and television 98 may be placed in a guest room. Communication paths 99 may be any in-home network paths suitable for transmitting video, audio and data, such as, dedicated cable, fiber optics or firewire links.

FIGS. 33a 33b 33c, 34, and 35 show illustrative configurations for the connection between the home and the television distribution facility. Only one user television equipment device is shown in the households in FIGS. 33a, 33b, 33c, 34, and 35 to avoid over-complicating the drawings. However, each household 265, 101, 102, 103, 104, 301, 302 in FIGS. 33a, 33b, 33c, 34, and 35 may contain multiple pieces of user television equipment configured as shown in FIG. 29, 30a, 30b, 30c, 31, or 32.

Figure 33A:
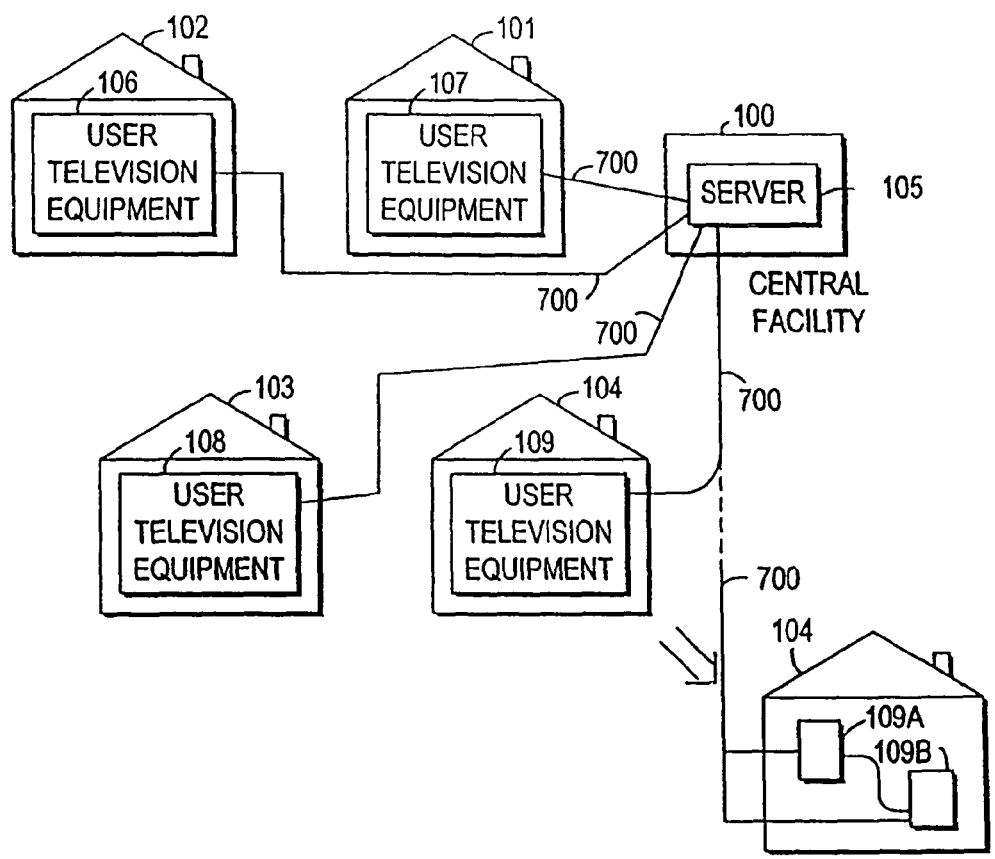
FIG. 33a is a diagram of a system similar to the system of FIG. 27 in which multiple interactive television program guides are implemented in a neighborhood node configuration in accordance with the present invention.

FIG. 33a shows an illustrative configuration in which multiple homes are handled by a common server. Server 105 may be located at central facility 100. Central facility 100 may be a private home, a commercial building, a network node, or other suitable structure that may be connected to a plurality of homes. In the example of FIG. 33a, server 105 is connected to user television equipment 106, 107, 108, and 109 that is located in homes 101, 102, 103, and 104, respectively via communication paths 700. When multiple user television equipment devices exist within a home as shown by devices 109a and 109b, each user television equipment device may communicate with the server 105 independently via communication paths 700, alternatively only one device may communicate while the other communicates via a home network.

In other words, in alternative arrangements, there are either 1) multiple connections to an outside server and each user television equipment device communicates with the server independently with no need for an in-home network, or, 2) only one connection to an outside server and each user television device communicates with each other through an in-home network.

Figure 33B:
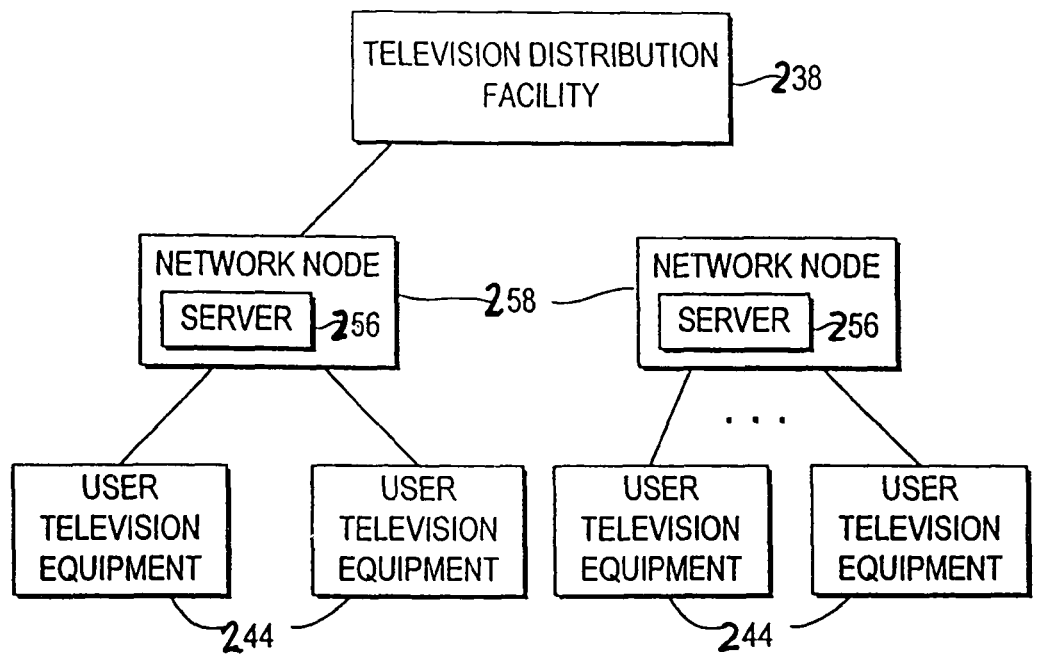
FIG. 33b is a diagram of a system similar to the system of FIG. 27 showing how servers may be located at network nodes in accordance with the present invention.

As shown in FIG. 33b, the capabilities of server 242 (FIG. 27) may be provided using servers 56 located at network nodes 258. Servers such as servers 56 may be used instead of server 242 or may be used in conjunction with a server 242 located at television distribution facility 238.

Graphics information for messages, advertisements and the like may be downloaded periodically (e.g., once per day) to set-top boxes 248 of FIG. 27 and stored locally. The graphics information may be accessed locally when needed by the program guides implemented on set-top boxes 248. Graphics information may also be provided in a continuously-looped arrangement on one or more digital channels on paths 246. With such a continuously-looped arrangement, a map indicating the location of the latest graphics information may be downloaded periodically to set-top boxes 248 (e.g., once per day) or continuously. This allows the content on the digital channels to be updated. The program guides on set-top boxes 248 may use the map to locate desired graphics information on the digital channels. Another approach involves using a server such as server 242 or servers 256 (FIG. 33b) to provide the graphics information after a set-top box 248 and that server have negotiated to set up a download operation. A bitmap or other suitable set of graphics information may then be downloaded from the server to the set-top box. If desired, the server may download instructions informing the set-top box where the desired graphics information can be located on a particular digital channel. The graphics information can be updated periodically if the server that is responsible for downloading the instructions for informing the set-top box of the location of the graphics information is also updated periodically.

Text information for messages, advertisements and the like may be provided to set-top boxes 248 using the same paths that are used for distributing program guide data. For example, advertising data from database 236 of FIG. 27 may be provided to set-top boxes 248 using link 240, television distribution facility 238, and paths 246. The text information may be stored locally in set-top boxes 248 and updated periodically (e.g., once per day).

Text information, graphics information, and videos for messages, advertisements and the like may also be distributed using a combination of these techniques or any other suitable technique.

Figure 33C:
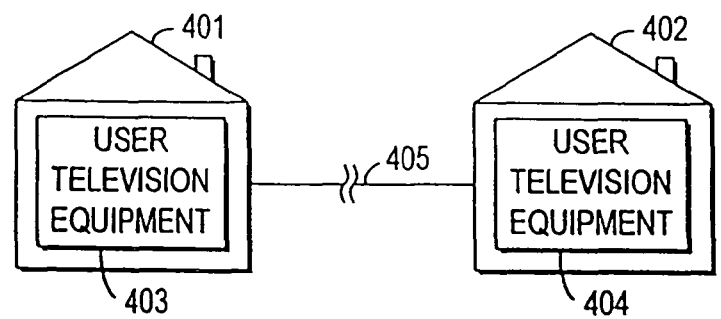
FIG. 33c is a diagram of a system similar to the system of FIG. 27 showing how homes may be connected by modem links in accordance with the present invention.

As shown in FIG. 33c, when a household has more than one home, the user television equipment in each home may be connected by modem link or other suitable link for transferring data between homes. For example, user television equipment 403 may be connected to user television equipment 404 via link 405. Link 405 may use internal or external modems, cable modems or other communications devices suitable for transmitting audio, video, and text data. In this manner, home 401 and home 402 may share program guide settings.

Figure 33D:
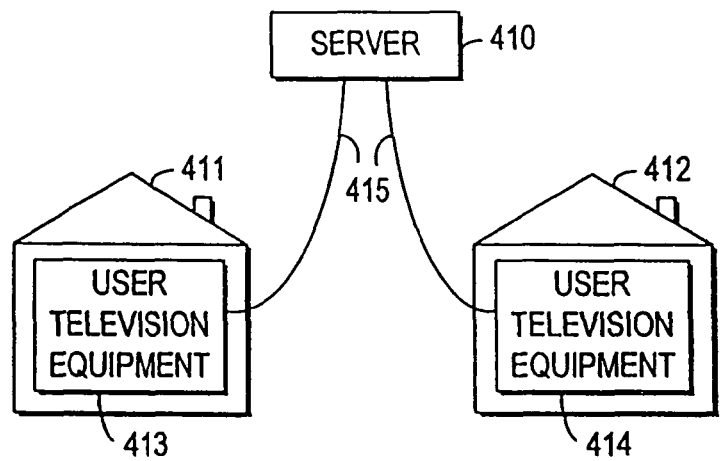
FIG. 33d is a diagram of a system similar to the system of FIG. 27 showing how homes may be connected via a server in accordance with the present invention.

As shown in FIG. 33d, when a household has more than one home, the user television equipment in each home may be connected via an outside server. For example, user television equipment 413 may be connected to user television equipment 414 via server 410. Communication paths 415 may use internal or external modems, cable modems or other communications devices suitable for transmitting audio, video, and text data. In this manner, home 411 and home 412 may share program guide settings.

Figure 34:
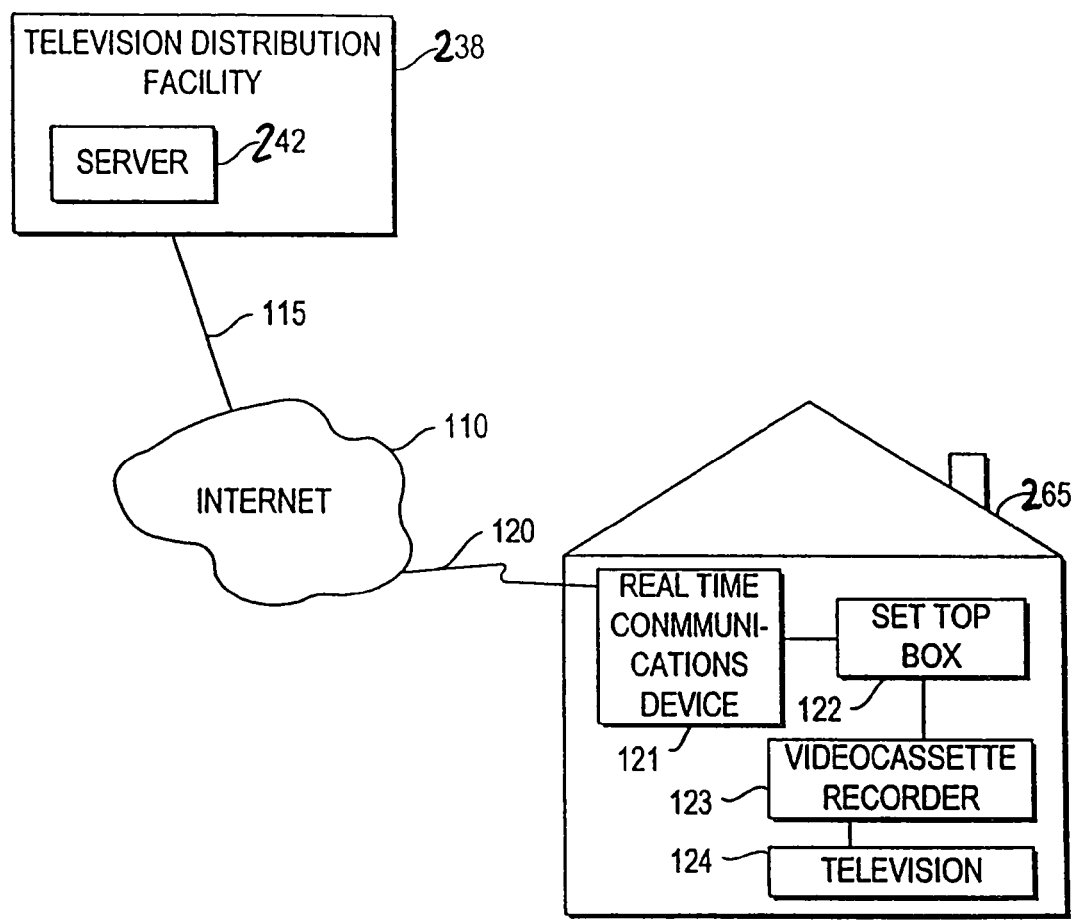
FIG. 34 is a diagram of a system in which multiple interactive television program guides are implemented and in which each such guide uses a real-time communications device connected to the Internet in accordance with the present invention.

FIG. 34 shows an illustrative configuration in which a server is connected to the home via the Internet. Set top boxes 122 are connected to the Internet 110 or other suitable data network in real time using real-time communications devices 121. Videocassette recorders 123 may be connected between set-top boxes 122 and televisions 124. Real-time communications devices 121 may be any devices suitable for maintaining a constant open connection with network 110, such as internal or external modems, cable modem, or the like. The network used to connect homes to television distribution facility 238 may be any network suitable for distributing video and audio data such as the Internet. Network 110 is connected to television distribution facility 238 by communications link 115 and is connected to real-time communications device 121 by communications links 120.

Figure 35:
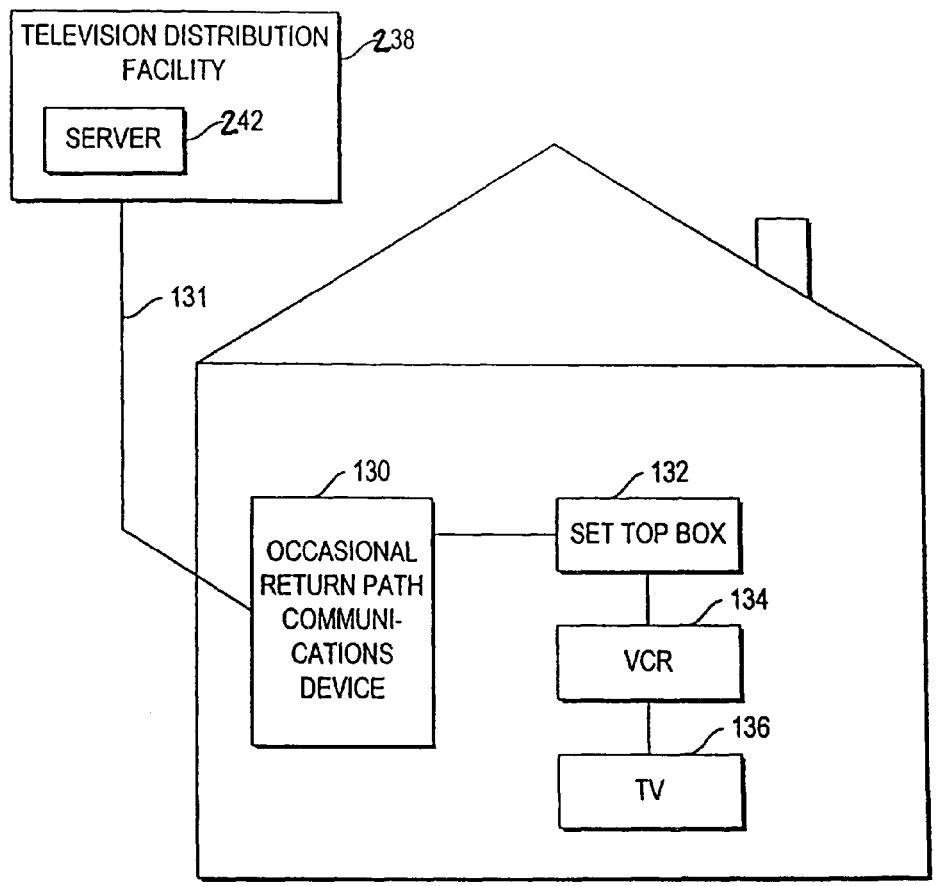
FIG. 35 is a diagram of a system in which multiple interactive television program guides are implemented with an occasional return path communications device in accordance with the present invention.

FIG. 35 shows an illustrative configuration in which user television equipment is linked to a server outside the home via an occasional return path. Set top box 132 is connected to occasional return path communications device 130 and videocassette recorder 134. Videocassette recorder 134 may be connected to television 136. Occasional return path communications device 130 may be any device suitable for connecting set-top box 132 to a server for the transfer of video and audio data, such as an internal or external modem, cable modem, or the like. Occasional return path communications device 130 server 42 which may or may not be connected to television distribution facility 238 using a communications path 131. Communications path 131 may be, for example, a telephone link or other non-dedicated communications path suitable for providing an occasional return path to home 265 from server 242.

Figure 36:
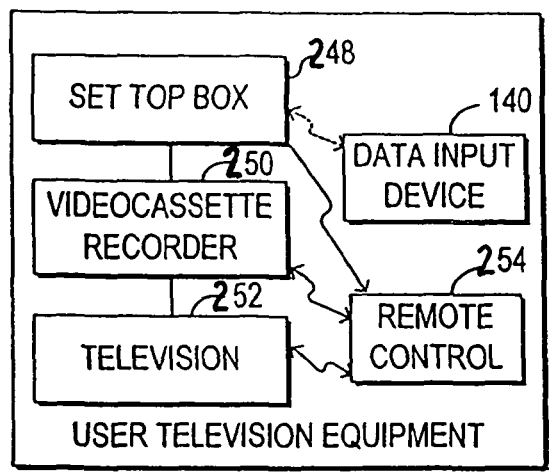
FIG. 36 is a diagram of illustrative user television equipment with an optional data input device in accordance with the present invention.

FIG. 36 shows illustrative components for user television equipment 244 (FIG. 27). In the arrangement of FIG. 36, set top box 248 is connected to data input device 140. Data input device 140 may be a keyboard, keypad, or any device suitable for inputting text (wired or wireless), audio or video. Videocassette recorder 250 is connected to set-top box 248 and television 252. Remote control 254 is used to control the operation of set-top box 248, videocassette recorder 250, and television 252.

Further aspects of the invention are described in detail below. For clarity, the principles of the invention described below are described in the context of the device configuration shown in FIG. 29 and the steps illustrated of FIG. 28, except where noted. However, the principles of the present invention also apply to configurations such as those shown in FIGS. 30a-35. Also, the foregoing description is merely illustrative of the principles of this invention and various modifications can be made by those skilled in the art without departing from the scope and spirit of the invention.

In any of the above arrangements, an interactive television program guide on each user television equipment device may provide various features for displaying television program listings information for the user and for providing various program guide functions such as parental control, favorites, pay-per-view purchasing, etc. For example, if the user presses the appropriate buttons on remote control 254, the user may be presented with a time-ordered or channel-ordered grid or table of television program listings or other such programming information.

With one suitable approach, the user may select one of the user television equipment devices to be a master or primary device. Adjusting the program guide settings of the master device controls these settings for all other devices in the household. For example, with the arrangement of FIG. 29, the user may set primary user television equipment 260 to be the master device. Primary user television equipment 260 may be located in the parents' bedroom. This allows the head of the household to control the program guide settings for all of the program guides in the household from a single location.

The system may provides the user with an opportunity to assign a master device, such as user television equipment 260, that will coordinate its program guide settings with other devices such as secondary user television equipment 261, 262, and 263. The system also provides the user with an opportunity to assign secondary devices.

Figure 37:
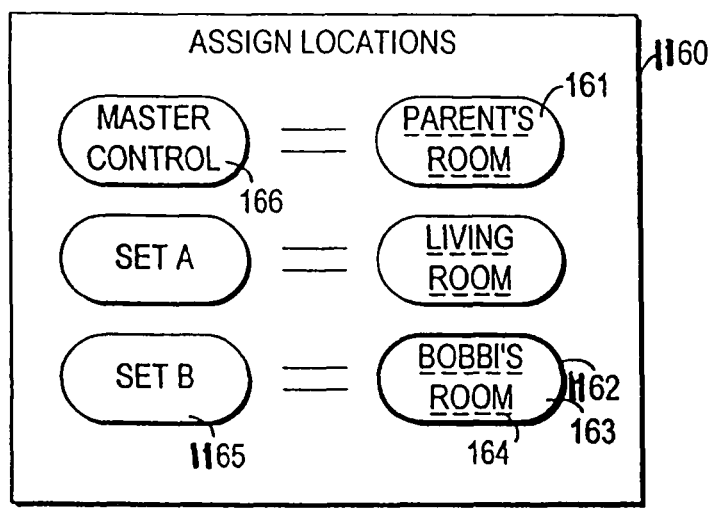
FIG. 37 is a depiction of an illustrative location selection screen in accordance with the present invention.
Figure 38:
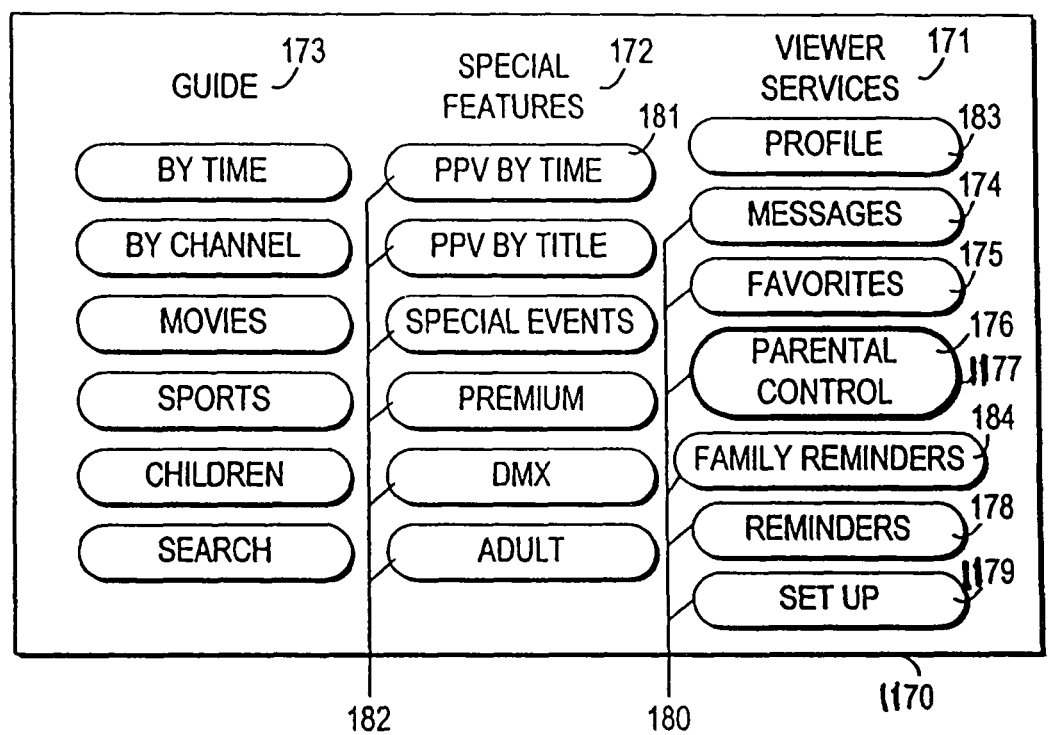
FIG. 38 is a depiction of an illustrative main menu screen in accordance with the present invention.

One suitable way in which the system may allow the user to assign devices as primary (master) and secondaries is for at least one of the program guides (e.g., the program guide running on set-top box 260) to provide an assign locations screen such as assign locations screen 1160 of FIG. 37. Screen 1160 may be accessed, for example, by first accessing main screen 1170 of FIG. 38 (by pressing, e.g., a suitable key on remote control 254). After accessing screen 1170, the user can use remote control 254 to move highlight region 1177 to the setup option 1179 and select setup option 1179 by pressing a select key, enter key, "OK" key, or other such key (sometimes referred to herein as simply an enter key) on remote control 254.

Figure 43:
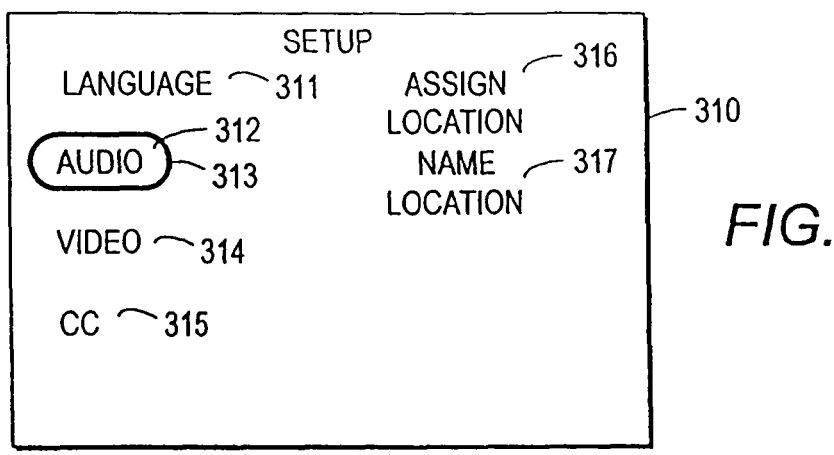
FIG. 43 is a depiction of an illustrative setup screen in accordance with the present invention.

Selecting setup option 1179 directs the program guide to display a setup screen such as setup screen 310 of FIG. 43. The user can select assign location option 316 on setup screen 310 by moving highlight region 312 and pressing the enter key. Selecting assign location option 316 directs the program guide to display assign locations screen 1160 of FIG. 37. The user can then move highlight region 1162 to set B option 1165. Selecting option 1165, directs the program guide to provide the user with an opportunity to enter a name to assign to set B. For example, the user may use data input device 140 or remote control 254 to enter the letters associated with the selected name. The program guide may use such user-defined device names when the relationship between devices is set up. For example, the user may designate the "parents room" location as a master location and may designate the "children's room" location as a slave location.

The names of locations may be pre-set by a service provider and simply assigned by the user. Alternately the user (or an installation technician), may have the ability to assign locations from the home. The location name may be chosen from a list as above or typed in by the user (or an installation technician.)

In the alternative arrangements shown in FIGS. 30*a*, 30*b*, and 30*c*, each piece of user television equipment 66, 67, 68, and 69 is a peer. The user can assign names to each such user television equipment device in much the same way that names may be assigned to the secondary devices in the FIG. 29 arrangement.

Figure 39:
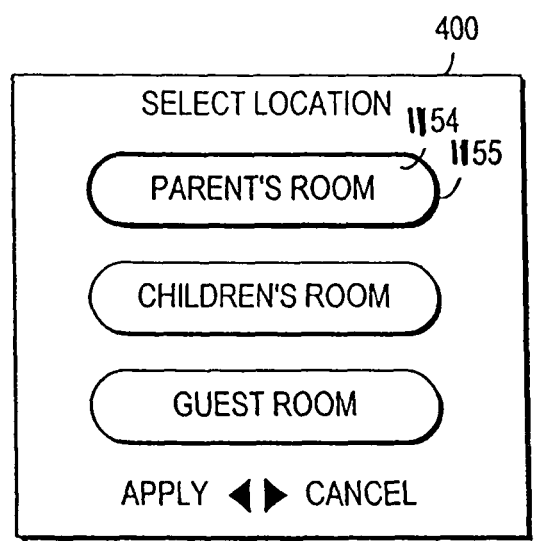
FIG. 39 is a depiction of another illustrative location selection screen in accordance with the present invention.
Figure 40:
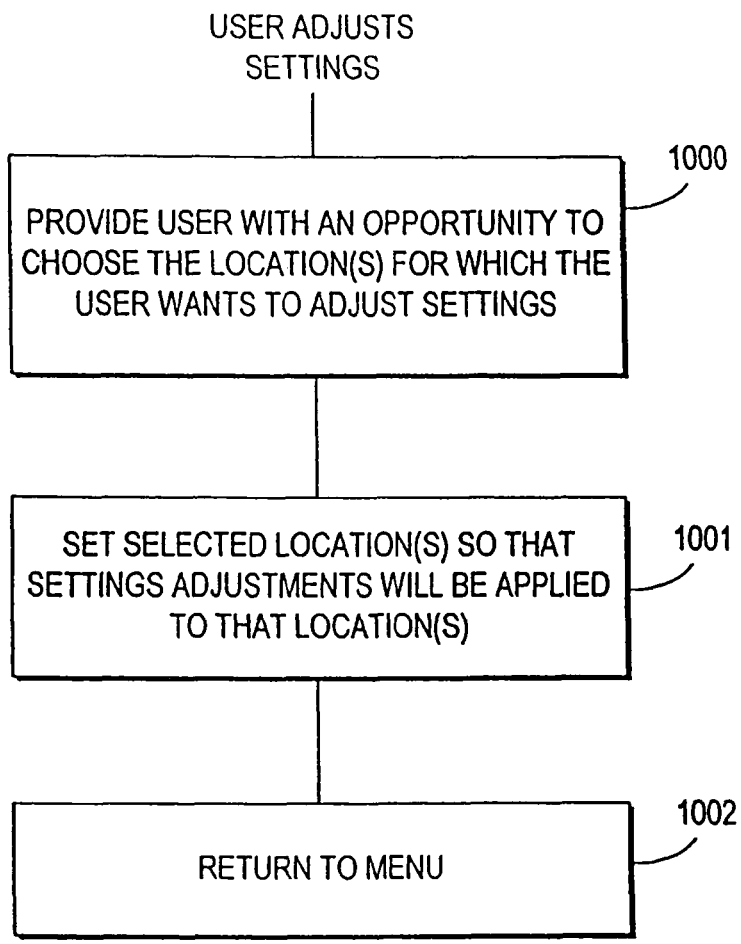
FIG. 40 is a flow chart showing steps involved in an illustrative approach for selecting a location for which to adjust settings in accordance with the present invention.

As shown in FIG. 40, at step 1000, the program guide may provide the user with an opportunity to select the devices or locations for which the user desires to adjust settings. Step 1000 may, for example, involve providing a screen such as select location screen 400 of FIG. 39. At step 1001 of FIG. 40, after the user has made a selection by moving highlight region 1155 (FIG. 40) to the desired device (e.g., parents' room option 1154) and pressed the enter key, the program guide sets the selected locations. The guide may also default to a particular location based on the type of setting that is changed. (e.g., if a setting for the recording of a program is changed, the guide may default to location with a videocassette recorder.) The guide may default to any combination of locations based on the type of setting that is changed. There are also "other factors" that may be used by the guide to determine at which location the settings will be effective. These include: the current location of the user making the adjustment, whether a location to be adjusted is currently being used, the state of other settings, etc.

The program guide may allow a unique number to be assigned to a user so that he or she is able to access his or her program guide settings at a location outside the home. For example, a user may visit a neighbors home to housesit while the neighbor is out of town. This user has the ability to log on to the program guide at the neighbors home and access his or her personal program guide settings.

Figure 41:
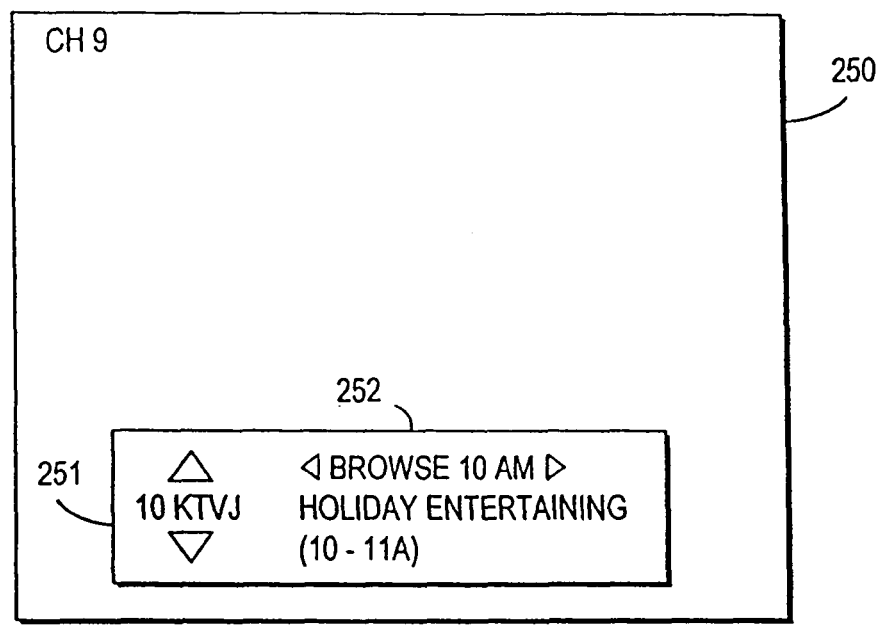
FIG. 41 is a depiction of an illustrative browse screen in accordance with the present invention.
Figure 42:
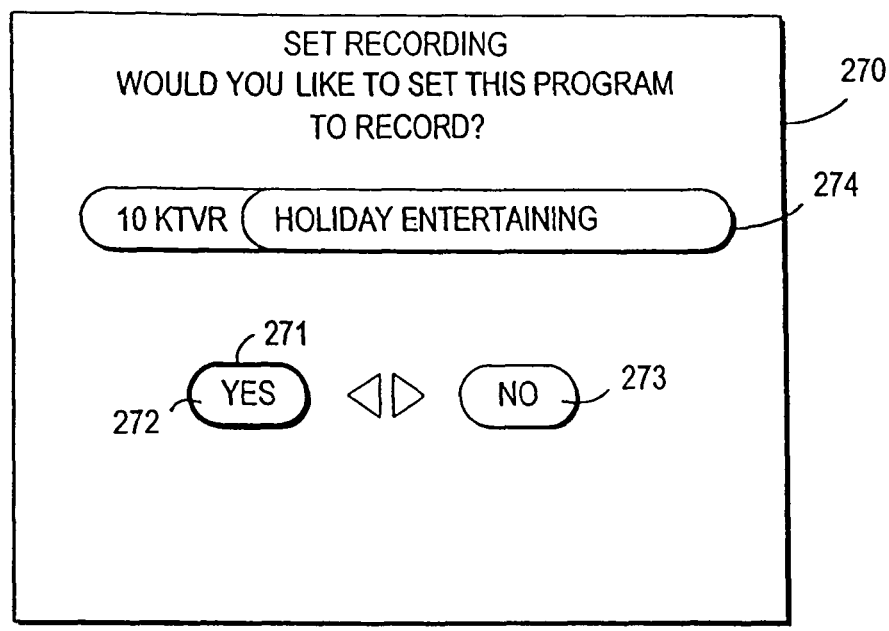
FIG. 42 is a depiction of an illustrative set recording screen in accordance with the present invention.

The user may be provided with an opportunity to select programs for recording at a later time. For example, if the user presses an appropriate button (e.g., a "record" button) after having used a browse feature to navigate to a program listing for "Holiday Entertaining" as shown in FIG. 41, the program guide at the user's location may present the user with a set recording screen such as set recording screen 270 of FIG. 42. Set recording screen 270 allows the user to set a selected program 274 (Holiday Entertaining) for recording by the program guide by selecting yes option 272 with highlight region 271. If the user selects no option 273, set recording screen 270 is canceled.

If a household has only one videocassette recorder 250, there will only be one location that will make all recordings, regardless of which location the recordings are set from. If there are multiple videocassette recorders, the user may be presented with select location screen 400 of FIG. 39 after selecting the yes option 272, that provides the user with an opportunity to select the location that will make the recording. If desired multiple locations may be selected. The guide may choose which VCR is used based on which VCR is busy or based on other factors.

At the scheduled broadcast time of the program to be recorded, the program guide at each selected location causes videocassette recorder 250 to begin recording. After the scheduled completion of the broadcast of the recorded program, each program guide causes its videocassette recorder 250 to stop recording. The guides may cause videocassette recorders 250 to stop and start recording by sending an IR signal to the videocassette recorders IR input or by, any other suitable method for transmitting a signal to a videocassette recorder.

A series recording option may also be provided that allows users to record program series. Series recording is described in the above-mentioned Knudson et al. U.S. patent application Ser. No. 09/330,792, filed Jun. 11, 1999.

The discussion thus far has focused on implementing the invention with an interactive television program guide. The invention may also be applied to non-program-guide applications. These non-program-guide applications run on user television equipment such as a set-top box. For example, an Internet browser may be run on a set-top box connected to a television. Internet application settings can be coordinated among televisions and/or set-top boxes within a household in the same way that program guide settings are coordinated among program guides in the house.

One non-program-guide application that may be implemented in accordance with the present invention is an Internet browser. An Internet browser may have settings such as bookmarks, parental control settings, and general preferences that control how the browser functions. As shown in FIG. 24, a browser application screen 700, may have a bookmark option 705. After adding a bookmark, the system allows the bookmark and other settings to be effective on other locations in the household. For example, a user may select bookmark option 705 and add a bookmark (i.e., a record of the address of the current web site that can be used to access the site). Through a network, in accordance with the present invention, the application can make the bookmark effective on other locations in the household. Accordingly, the user can choose to apply settings adjustments to all locations by selecting an apply to all option or may opt to apply the adjustments to a specific location or locations by selecting a select locations option from the options provided by the program guide. The guide may apply the settings to a default location or to a location determined by other factors as described above.

Another application that may be implemented in accordance with the present invention is an shopping application. A shopping application may have settings such as a default shipping address, and credit card number. As shown in FIG. 25, a shopping application screen 730, has settings such as a shipping address 720, and credit card number 725. After adding a shipping and credit card information, the system allows the shipping address, credit card number and other settings to be effective on other locations in the household. For example, a user can add a shipping address. Through a network, in accordance with the present invention, the application can make the shipping address effective on other locations in the household. Accordingly, the user can choose to apply settings adjustments to all locations by selecting an apply to all option or may opt to apply the adjustments to a specific location or locations by selecting a select locations option from the options provided by the program guide. The guide may apply the settings to a default location or to a location determined by other factors as described above.

Another non-program-guide application that may be implemented on user television equipment and coordinated with other such applications in accordance with the present invention is a stock ticker. A stock ticker may have settings such as settings indicating the top 10 stocks in which the user is interested. As shown in FIG. 26, a stock ticker settings screen 710 has a ticker symbol 712 and a top 10 stocks option 715. For example, a user may add a top stock. Then, through a network, in accordance with the present invention, the application can make the top 10 stock settings effective on other locations in the household. Accordingly, the user can choose to apply the adjustments to all locations by selecting an apply to all option or may opt to apply the adjustments to a specific location or locations by selecting a select locations option from the options provided by the program guide. The guide may apply the settings to a default location or to a location determined by other factors as described above.

A chat application may be implemented on user television equipment such as a set top box. Chat applications are services that allow users to exchange chat messages with other users in real time. A chat application may be implemented as a stand-alone chat application or as part of another application such as a program guide application. A user may adjust settings associated with a chat application such as the size of a chat window or whether to filter potentially offensive messages. Chat applications that may be implemented on user television equipment are described in McKissick et al. U.S. patent application Ser. No. 09/356,270, filed Jul. 16, 1999, filed concurrently herewith, which is hereby incorporated by reference herein in its entirety. After the user adjusts chat settings, the user can choose to apply the chat settings adjustments to all locations by selecting an apply to all option or may opt to apply the adjustments to a specific location or locations by selecting a select locations option. Settings may be coordinated between the chat applications using options provided by the chat application. The chat application may apply the settings to a default location or to a location determined by other factors as described above.

If desired, the settings of an e-mail application running on different user television equipment devices in the household may be coordinated. When the user adjusts the e-mail settings associated with one user television equipment device, the system coordinates the operation of the other e-mail applications so that the adjusted e-mail settings may be used by the other e-mail applications.

The foregoing is merely illustrative of the principles of this invention and various modifications can be made by those skilled in the art without departing from the scope and spirit of the invention.

What is claimed is:

1. A system for selecting videos over a remote access link comprising an Internet communications path for recording, the system comprising:
a mobile device for:
receiving first data including information corresponding to a first plurality of sequences of video frames, wherein the first data are processed by control circuitry of the mobile device to identify content of the first plurality of sequences of video frames to generate a first graphical user interface;
processing the first data to generate, based on the processed first data, the first graphical user interface of a first plurality of identifiers of content, each of the first plurality of identifiers of content corresponding to respective ones of a second plurality of sequences of video frames of the first plurality of sequences of video frames, the first plurality of identifiers of content for display on the mobile device using a remote access interactive program guide implemented on the mobile device, the mobile device being capable of displaying the first plurality of identifiers of content concurrently with a local interactive program guide equipment displaying a second plurality of identifiers of content, wherein:
the local interactive program guide equipment receives, from a source, second data including information corresponding to a third plurality of sequences of video frames, wherein the second data are processed by control circuitry of the local interactive program guide equipment to identify content of the third plurality of sequences of video frames to generate a second graphical user interface, and
the second data are processed to generate, based on the processed second data, the second graphical user interface of the second plurality of identifiers of content, each of the second plurality of identifiers of content corresponding to respective ones of a fourth plurality of sequences of video frames of the third plurality of sequences of video frames, each of the sequences of video frames in the third plurality of sequences of video frames scheduled for transmission to a plurality of users at a first scheduled time, the third plurality of sequences of video frames being transmitted over a plurality of content sources to the plurality of users while the second plurality of identifiers of content is being presented using the second graphical user interface, the second plurality of identifiers of content for display on a display device using a local interactive program guide, wherein the local interactive program guide is implemented on the local interactive program guide equipment;
detecting an input, at the remote access interactive program guide, indicating a user selection of an identifier of content of the first plurality of identifiers of content, wherein the identifier of content is selected by the user while the local interactive program guide equipment receives one of the third plurality of sequences of video frames over a first of the plurality of content sources from the source;

identifying for recording based on the detecting, a first sequence of video frames of the second plurality of sequences of video frames corresponding to the identifier of content selected by the user based on the input;

generating an electrical signal corresponding to the first sequence of video frames; and transmitting the electrical signal to the local interactive program guide over the Internet communications path, wherein the first sequence of video frames corresponding to the selected identifier of content is stored, responsive to processing the electrical signal at the local interactive program guide, using the local interactive program guide equipment, when the first sequence of video frames is received over a second of the content sources at a second scheduled time.

2. The system of claim 1, wherein the local interactive television program guide records the first sequence of video frames at a television distribution facility.

3. The system of claim 1, wherein each of the respective ones of the third plurality of sequences of video frames corresponding to the second plurality of identifiers of content is formatted based on a characteristic of the display device.

4. The system of claim 1, wherein the remote access interactive program guide obtains a user profile from the local interactive program guide.

5. The system of claim 1, wherein the first data are a subset of the second data.

6. The system of claim 1, wherein the local interactive guide equipment includes a video recorder.

7. The system of claim 1, wherein the first sequence of video frames is a previously scheduled first sequence of video frames.

8. The system of claim 1, wherein the recording comprises scheduling the first sequence of video frames for recording using the local interactive program guide.

9. The system of claim 1, wherein the remote access interactive program guide obtains the first data based on a user profile.

10. A method for selecting videos over a remote access link comprising an Internet communications path for recording, the method comprising:

receiving, at a mobile device, first data including information corresponding to a first plurality of sequences of video frames, wherein the first data are processed by control circuitry of the mobile device to identify content of the first plurality of sequences of video frames to generate a first graphical user interface;

processing the first data to generate, based on the processed first data, the first graphical user interface of a first plurality of identifiers of content, each of the first plurality of identifiers of content corresponding to respective ones of a second plurality of sequences of video frames of the first plurality of sequences of video frames, the first plurality of identifiers of content for display on the mobile device using a remote access interactive program guide implemented on the mobile device, the mobile device being capable of displaying the first plurality of identifiers of content concurrently with a local interactive program guide equipment displaying a second plurality of identifiers of content, wherein:

the local interactive program guide equipment receives, from a source, second data including information corresponding to a third plurality of sequences of video frames, wherein the second data are processed by control circuitry of the local interactive program guide equipment to identify content of the third plurality of sequences of video frames to generate a second graphical user interface, and the second data are processed to generate, based on the processed second data, the second graphical user interface of the second plurality of identifiers of content, each of the second plurality of identifiers of content corresponding to respective ones of a fourth plurality of sequences of video frames of the third plurality of sequences of video frames, each of the sequences of video frames in the third plurality of sequences of video frames scheduled for transmission to a plurality of users at a first scheduled time, the third plurality of sequences of video frames being transmitted over a plurality of content sources to the plurality of users while the second plurality of identifiers of content is being presented using the second graphical user interface, the second plurality of identifiers of content for display on a display device using a local interactive program guide, wherein the local interactive program guide is implemented on the local interactive program guide equipment, and wherein each of the respective ones of the third plurality of sequences of video frames corresponding to the second plurality of identifiers of content is formatted based on a characteristic of the display device;

detecting an input, at the remote access interactive program guide, indicating a user selection of an identifier of content of the first plurality of identifiers of content, wherein the identifier of content is selected by the user while the local interactive program guide equipment receives one of the third plurality of sequences of video frames over a first of the plurality of content sources from the source;

identifying for recording based on the detecting, a first sequence of video frames of the second plurality of sequences of video frames corresponding to the identifier of content selected by the user based on the input;

generating an electrical signal corresponding to the first sequence of video frames; and transmitting the electrical signal to the local interactive program guide over the Internet communications path, wherein the first sequence of video frames corresponding to the selected identifier of content is stored, responsive to processing the electrical signal at the local interactive program guide, using the local interactive program guide equipment, when the first sequence of video frames is received over a second of the content sources at a second scheduled time.

11. The method of claim 10, wherein the local interactive television program guide records the first sequence of video frames at a television distribution facility.

12. The method of claim 10, wherein the remote access interactive program guide obtains a user profile from the local interactive program guide.

13. The method of claim 10, wherein the first data are a subset of the second data.

14. The method of claim 10, wherein the local interactive guide equipment includes a video recorder.

15. The method of claim 10, wherein the first sequence of video frames is a previously scheduled first sequence of video frames.

16. The method of claim 10, wherein the recording comprises scheduling the first sequence of video frames for recording using the local interactive program guide.

17. The method of claim 10, wherein the remote access interactive program guide obtains the first data based on a user profile.

18. A method for selecting videos over a remote access link comprising an Internet communications path for recording, the method comprising:

receiving, at a mobile device, first data including information corresponding to a first plurality of sequences of video frames, wherein the first data are processed by control circuitry of the mobile device to identify content of the first plurality of sequences of video frames to generate a first graphical user interface;

processing the first data to generate, based on the processed first data, the first graphical user interface of a first plurality of identifiers of content, each of the first plurality of identifiers of content corresponding to respective ones of a second plurality of sequences of video frames of the first plurality of sequences of video frames, the first plurality of identifiers of content for display on the mobile device using a remote access interactive program guide implemented on the mobile device, the mobile device being capable of displaying the first plurality of identifiers of content concurrently with a local interactive program guide equipment displaying a second plurality of identifiers of content, wherein:

the local interactive program guide equipment receives, from a source, second data including information corresponding to a third plurality of sequences of video frames, wherein the second data are processed by control circuitry of the local interactive program guide equipment to identify content of the third plurality of sequences of video frames to generate a second graphical user interface, and the second data are processed to generate, based on the processed second data, the second graphical user interface of the second plurality of identifiers of content, each of the second plurality of identifiers of content corresponding to respective ones of a fourth plurality of sequences of video frames of the third plurality of sequences of video frames, each of the sequences of video frames in the third plurality of sequences of video frames scheduled for transmission to a plurality of users at a first scheduled time, the third plurality of sequences of video frames being transmitted over a plurality of content sources to the plurality of users while the second plurality of identifiers of content is being presented using the second graphical user interface, the second plurality of identifiers of content for display on a display device using a local interactive program guide, wherein the local interactive program guide is implemented on the local interactive program guide equipment;

detecting an input, at the remote access interactive program guide, indicating a user selection of an identifier of content of the first plurality of identifiers of content, wherein the identifier of content is selected by the user while the local interactive program guide equipment receives one of the third plurality of sequences of video frames over a first of the plurality of content sources from the source;

identifying for recording based on the detecting, a first sequence of video frames of the second plurality of sequences of video frames corresponding to the identifier of content selected by the user based on the input;

generating an electrical signal corresponding to the first sequence of video frames; and transmitting the electrical signal to the local interactive program guide over the Internet communications path, wherein the first sequence of video frames corresponding to the selected identifier of content is stored, responsive to processing the electrical signal at the local interactive program guide, using the local interactive program guide equipment, when the first sequence of video frames is received over a second of the content sources at a second scheduled time.

\* \* \* \* \*